(12) United States Patent
Nakada

(10) Patent No.: US 9,075,406 B2
(45) Date of Patent: Jul. 7, 2015

(54) CONTROL DEVICE FOR INTERNAL COMBUSTION ENGINE

(75) Inventor: Hayato Nakada, Minamitsuru-gun (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 461 days.

(21) Appl. No.: 13/697,208

(22) PCT Filed: May 10, 2010

(86) PCT No.: PCT/JP2010/058243
§ 371 (c)(1),
(2), (4) Date: Nov. 9, 2012

(87) PCT Pub. No.: WO2011/142038
PCT Pub. Date: Nov. 17, 2011

(65) Prior Publication Data
US 2013/0060448 A1 Mar. 7, 2013

(51) Int. Cl.
F02D 28/00 (2006.01)
F02D 45/00 (2006.01)
G05B 13/04 (2006.01)
G05B 13/02 (2006.01)
F02D 41/00 (2006.01)
F02D 41/14 (2006.01)

(52) U.S. Cl.
CPC .......... *G05B 13/026* (2013.01); *F02D 41/0007* (2013.01); *F02D 41/005* (2013.01); *F02D 41/1401* (2013.01); *F02D 2041/1412* (2013.01); *G05B 2219/2623* (2013.01); *Y02T 10/144* (2013.01); *Y02T 10/47* (2013.01)

(58) Field of Classification Search
CPC ............. F02D 41/005; F02D 41/0007; F02D 41/0052; Y02T 10/47; Y02T 10/144; G05B 13/026
USPC .................................................. 701/102, 103
See application file for complete search history.

(56) References Cited

U.S. PATENT DOCUMENTS

| 4,987,888 A | * | 1/1991 | Funabashi et al. ............. 701/110 |
| 5,682,864 A | * | 11/1997 | Shirakawa ................ 123/568.21 |
| 6,502,061 B1 | * | 12/2002 | Segawa ........................ 702/181 |
| 6,856,891 B2 | * | 2/2005 | Yasui ............................ 701/109 |

(Continued)

FOREIGN PATENT DOCUMENTS

| JP | 05-127701 A | 5/1993 |
| JP | 2005-276169 A | 10/2005 |
| JP | 2009-024550 A | 2/2009 |

*Primary Examiner* — Hieu T Vo
*Assistant Examiner* — Arnold Castro
(74) *Attorney, Agent, or Firm* — Sughrue Mion, PLLC

(57) ABSTRACT

A control device for internal combustion engine including: a corrector for correcting an target value of each object to be controlled; a predictor for predicting a future state of each of the objects when the objects are controlled according to an initial-target-value or a corrected-target-value of each object; and a determiner for determining whether or not the future state of each object satisfies a constraint condition for the internal combustion engine, wherein the correction of the target value of each object, the prediction of the future state of each object based on the corrected target value corrected by the correction, and the determination whether or not the predicted future state of each object satisfies the constraint condition are repeated until determined so that the predicted future state satisfies the constraint condition. Furthermore, the state of the object to be predicted is the state in the future after a limited predetermined period.

8 Claims, 15 Drawing Sheets

(56) References Cited

U.S. PATENT DOCUMENTS

| | | | |
|---|---|---|---|
| 2005/0131620 A1* | 6/2005 | Bowyer | 701/108 |
| 2005/0192681 A1 | 9/2005 | Matsunaga et al. | |
| 2006/0137346 A1* | 6/2006 | Stewart et al. | 60/605.2 |
| 2013/0054110 A1* | 2/2013 | Sata | 701/102 |
| 2014/0174412 A1* | 6/2014 | Tanaka et al. | 123/568.11 |

* cited by examiner

CONTROL DEVICE FOR INTERNAL COMBUSTION ENGINE

CROSS REFERENCE TO RELATED APPLICATIONS

This application is a National Stage of International Application No. PCT/JP2010/058243, filed on Nov. 12, 2010, the contents of all of which are incorporated herein by reference in their entirety.

TECHNICAL FIELD

The present invention relates to a control device for an internal combustion engine.

BACKGROUND ART

A temperature control device, which controls the temperature of a heating panel on which semiconductor wafers are to be mounted, is disclosed in Patent Literature 1. The heating panel is heated by a heater in this temperature control device, so that the semiconductor wafers mounted on the heating panel are heated. Further, this temperature control device controls the heating operation of the heater so that the temperature of the heating panel becomes a target temperature.

Meanwhile, when a heating panel is affected by a disturbance in the temperature control device disclosed in Patent Literature 1, the temperature of the heating panel exceeds or becomes lower than a target temperature (hereinafter, this target temperature is referred to as an "initial target temperature"). That is, when the heating panel is affected by a disturbance, the temperature of the heating panel is changed.

Here, if the target temperature of the heating panel is temporarily lower than the initial target temperature when the temperature of the heating panel is to exceed the initial target temperature, then the amount of heat applied to the heating panel from the heater is reduced. Accordingly, the excess of the temperature of the heating panel over the initial target temperature is suppressed. Conversely, if the target temperature of the heating panel is temporarily higher than the initial target temperature when the temperature of the heating panel is to become lower than the initial target temperature, the amount of heat applied to the heating panel from the heater is increased. Accordingly, the lowering of the temperature of the heating panel below the initial target temperature is suppressed. Therefore, if the target temperature of the heating panel is made to change contrary to the change of the temperature of the heating panel that will occur if the target temperature of the heating panel is maintained at the initial target temperature when the heating panel is affected by a disturbance, the temperature of the heating panel is maintained at the initial target temperature even though the heating panel is affected by a disturbance.

Meanwhile, in the device disclosed in Patent Literature 1, a disturbance is forcibly applied to the heating panel while the temperature of the heating panel is controlled to the initial target temperature and a temperature change pattern of heating panel at this time is measured. Further, a temperature change pattern, which is contrary to the temperature change pattern of the heating panel at this time, is acquired as a target temperature change pattern of the heating panel when the heating panel is affected by the disturbance. Furthermore, when the heating panel is affected by the same disturbance as the above-mentioned disturbance, the target temperature of the heating panel is changed according to the acquired target temperature change pattern so that the temperature of the heating panel is maintained at the initial target temperature.

As described above, Patent Literature 1 discloses an idea for maintaining the temperature of the heating panel at the initial target temperature by changing the target temperature itself of the heating panel from an initial target temperature according to a target temperature change pattern when the heating panel is affected by a disturbance.

CITATION LIST

Patent Literature 1: JP 2005-276169 A

SUMMARY OF INVENTION

1. Technical Problem

Meanwhile, in the temperature control device disclosed in Patent Literature 1, target temperature change patterns of the heating panel corresponding to all kinds of disturbances need to be acquired in order to maintain the temperature of the heating panel at the initial target temperature in a suitable control mode even though the heating panel is affected by any kind of disturbance. However, since the number of the kinds of disturbances affecting the heating panel is large, the number of the target temperature change patterns of the heating panel to be acquired is also large. Considering this, it is impossible to actually acquire the target temperature change patterns of the heating panel corresponding to all kinds of disturbances. If the target temperature change patterns of the heating panel corresponding to all kinds of disturbances are to be nevertheless acquired, much labor is required for acquiring the target temperature change patterns of the heating panel and large memory is also required for storing the acquired large number of the target temperature change patterns of the heating panel. However, if the target temperature change patterns of the heating panel corresponding to all kinds of disturbances are not acquired, it is certain that the temperature of the heating panel cannot be maintained at the initial target temperature in a suitable control mode when the heating panel is affected by a kind of disturbance corresponding to a target temperature change pattern of the heating panel that is not acquired.

At any rate, in the temperature control device disclosed in Patent Literature 1, it is difficult to maintain the temperature of the heating panel at the initial target temperature in a suitable control mode even if the temperature of the heating panel is to be maintained at the initial target temperature when the heating panel is affected by a disturbance. More generally, in the idea disclosed in Patent Literature 1, it may be said that it is difficult to maintain a control amount of an object to be controlled at an initial target value in a suitable control mode even if the control amount of the object to be controlled is to be maintained at the initial target value when the object to be controlled is affected by a disturbance.

Further, in the temperature control device disclosed in Patent Literature 1, it is preferable that the temperature of the heating panel be controlled at a changed initial target temperature in a suitable control mode when the initial target temperature itself of the heating panel is changed. Here, in a case where the idea disclosed in Patent Literature 1 is applied to the control of the temperature of the heating panel when the initial target temperature itself of the heating panel is changed, for example, a target temperature change pattern corresponding to a changed initial target temperature is acquired in advance and the target temperature of the heating panel is changed according to the target temperature change pattern that corresponds to the changed initial target temperature when the initial target temperature of the heating panel is changed. However, it is difficult to control the temperature of the heating panel to the changed initial target temperature in a suitable control mode according to this due to the same reason as the above-mentioned reason. More generally, in the idea disclosed in Patent Literature 1, it may be said that it is difficult to control the temperature of the heating panel to the initial target temperature in a suitable control mode even if the temperature of the heating panel is to be controlled to the changed initial target temperature when the initial target temperature itself of the heating panel is changed.

Furthermore, when the heating panel is affected by a disturbance in the temperature control device disclosed in Patent Literature 1 and the temperature of the heating panel is changed based on a target temperature to which temperature can be changed according to a target temperature change pattern corresponding to this disturbance, the temperature of the heating panel may not be maintained at the initial target temperature in a suitable control mode in some states of the entire system including the heating panel (hereinafter, this system is referred to as a "heating system"). Accordingly, it may not be said that the control of the temperature of the heating panel at this time is a suitable control mode in the heating system. Moreover, even when the initial target temperature itself of the heating panel is changed in the temperature control device disclosed in Patent Literature 1 and the temperature of the heating panel is changed based on a target temperature to which temperature can be changed according to a target temperature change pattern corresponding to this changed initial target temperature, the temperature of the heating panel may not be controlled to the changed initial target temperature in a suitable control mode in some states of the heating system. Accordingly, it may not be said that the control of the temperature of the heating panel at this time is a suitable control mode in the heating system.

As described above, the states of the entire system including the heating panel are not considered in the temperature control device disclosed in Patent Literature 1 when the temperature of the heating panel is maintained at the initial target value or is controlled.

Accordingly, more generally, in the idea disclosed in Patent Literature 1, a control amount of an object to be controlled is not maintained at or controlled to an initial target value in a suitable control mode, or the control of the control amount of the object to be controlled is not a suitable control mode in the entire system including the object to be controlled in some states of the entire system including the object to be controlled, even if the control amount of the object to be controlled is to be maintained at the initial target value or is to be controlled to the initial target value.

Further, when the temperature control device disclosed in Patent Literature 1 includes other objects to be controlled than the heating panel, that is, a plurality of objects to be controlled, the control amounts of the respective objects to be controlled are not maintained or controlled to initial target values in suitable control modes due to the same reason as the above-mentioned reason or the controls of the control amounts of the respective objects to be controlled are not suitable control modes in the entire system including these objects to be controlled, if the control amounts of the respective objects to be controlled are to be maintained at or controlled to the initial target values in suitable control modes when the respective objects to be controlled are affected by disturbances.

Meanwhile, in order to maintain or control the control amounts of the objects to be controlled at or to the initial target values in the suitable control modes; future states of the objects to be controlled when the control amounts of the objects to be controlled will be controlled according to the initial target values (hereinafter, these states are referred to as "future controlled-object-states") are predicted before the control amounts of the objects to be controlled are actually controlled according to the initial target values; whether or not the control amounts of the objects to be controlled are controlled in suitable control modes is determined based on these predicted future controlled-object-states; and the controls of the control amounts of the objects to be controlled should be changed so that the control amounts of the objects to be controlled are controlled in suitable control modes, if the control amounts of the objects to be controlled are not controlled in suitable control modes.

However, the device disclosed in Patent Literature 1 does not perform the prediction of the future controlled-object-states.

Accordingly, an object of the invention is to predict a future state of an objects to be controlled at the time when a control amount of the object to be controlled is controlled to a specific target value before the control amount of the object to be controlled is actually controlled to the specific target value when the control amount of the object to be controlled is to be controlled to a specific target value, to set a target value of the control amount of the object to be controlled by using the predicted future state of the object to be controlled, so that the control amount of the object to be controlled is controlled to the target value in a suitable control mode, and to control the control amount of the object to be controlled according to the set target value.

2. Solution to Problem

A first invention of this application relates to a control device for internal combustion engine comprising: an initial-target-value determining means for determining: a target value of a control amount of a first object to be controlled in the internal combustion engine as a first initial-target-value; and a target value of a control amount of a second object to be controlled in the internal combustion engine as a second initial-target-value; an operation amount determining means for determining: an operation amount to be input to the first object as a first operation amount depending on a first control-target-value that is a target value for controlling the control amount of the first object; and an operation amount to be input to the second object as a second operation amount depending on a second control-target-value that is a target value for controlling the control amount of the second object; a first operation-controlling means for controlling an operation of the first object according to the first operation amount determined by the operation amount determining means; and a second operation-controlling means for controlling the operation of the second object according to the second operation amount determined by the operation amount determining means. Here, the control amounts of the respective objects are controlled due to a control that the respective operation-controlling means controls the operations of the respective corresponding objects.

This invention further includes: a corrected-target-value outputting means for correcting the first initial-target-value and the second initial-target-value according to a predetermined rule and outputting the corrected initial-target-values respectively as first corrected-target-value and second corrected-target-value; a controlled-object-state predicting means for performing prediction calculation to predict future states of the first object and the second object as future controlled-object-states through calculation when the control amount of the first object and the control amount of the second object are controlled according to the first operation amount and the second operation amount determined by the operation amount determining means by employing the first initial-target-value and the second initial-target-value respectively as the first control-target-value and the second control-target-value; and a constraint-condition-satisfaction determining means for determining whether or not the future controlled-object-states predicted by the controlled-object-state predicting means satisfies a constraint condition for the internal combustion engine.

Further, in this invention, in the case of the constraint-condition-satisfaction determining means determining as the future controlled-object-states predicted by the controlled-object-state predicting means satisfies the constraint condition for the internal combustion engine, then the first initial-target-value and second initial-target-value are input to the operation amount determining means as the first control-target-value and second control-target-value.

Meanwhile, in this invention, in the case of the constraint-condition-satisfaction determining means determines that the future controlled-object-states predicted by the controlled-object-state predicting means do not satisfy the constraint conditions for the internal combustion engine, then the first initial-target-value and second initial-target-value are corrected according to the predetermined rule by the corrected-target-value outputting means; the corrected initial-target-values are output respectively as the first corrected-target-value and the second corrected-target-value; the future states of the first object and the second object are predicted again as future controlled-object-states when the control amount of the first object and the control amount of the second object are controlled according to the first operation amount and the second operation amount determined by the operation amount determining means by employing the first initial-target-value and the second initial-target-value respectively as the first control-target-value and the second control-target-value; the constraint-condition-satisfaction determining means determines again whether or not the future controlled-object-states predicted again by the controlled-object-state predicting means satisfies the constraint condition for the internal combustion engine.

Moreover, in this invention, the first corrected-target-value and second corrected-target-value are input to the operation amount determining means as the first control-target-value and second control-target-value, when the constraint-condition-satisfaction determining means determines that the future controlled-object-states predicted again by the controlled-object-state predicting means satisfy the constraint condition for the internal combustion engine.

Meanwhile, in this invention, in the case of the constraint-condition-satisfaction determining means determines that the future controlled-object-states predicted again by the controlled-object-state predicting means do not satisfy the constraint condition for the internal combustion engine, then the corrections of the first corrected-target-value and the second corrected-target-value by the corrected-target-value outputting means, the prediction calculation by the controlled-object-state predicting means based on the first corrected-target-value and the second corrected-target-value corrected by the correction, and the determination by the constraint-condition-satisfaction determining means based on the future controlled-object-states predicted by the prediction calculation are repeated until determined that the future controlled-object-states predicted by the controlled-object-state predicting means satisfy the constraint condition.

Then, in the invention, the controlled-object-state predicting means predicts states of the objects in the future after a limited predetermined period through calculation.

Furthermore, in the present invention, the prediction calculation performed by the controlled-object-state predicting means is continued after the limited predetermined period is shortened when a calculation load of the control device is larger than an allowable load value in view of calculation capacity of the control device.

According to this invention, the future states of the objects to be controlled in the future after a limited predetermined period in the prediction calculation performed by the controlled-object-state predicting means, and the following effects are obtained. That is, since the future controlled-object-states in the future after a limited predetermined period in the prediction calculation performed by the control object predicting means, the future controlled-object-states to be predicted in the prediction calculation are limited within a limited time. For this reason, it is possible to quickly and accurately predict the future controlled-object-states. That is, even though the future controlled-object-states obtained by the prediction calculation are future controlled-object-states in the future after a limited length, the future controlled-object-states to be obtained are quickly and accurately predicted. Accordingly, the future states of the objects to be controlled in the future after a limited predetermined period in the prediction calculation performed by the controlled-object-state predicting means, so that an effect of quickly predicting accurate future controlled-object-states is obtained.

According to this invention, if the constraint conditions for the internal combustion engine are satisfied when the control amounts of the respective objects to be controlled are controlled according to the operation amounts determined by using the initial target values as the control-target-values, the initial target values become the control-target-values. Meanwhile, if the constraint conditions for the internal combustion engine are not satisfied when the control amounts of the respective objects to be controlled are controlled according to the operation amounts determined by using the initial target values as the control-target-values, the initial target values are repeatedly corrected according to a predetermined rule until the constraint conditions for the internal combustion engine are satisfied, the corrected initial target values are output as corrected-target-values, and the output corrected-target-values become the control-target-values. That is, according to this invention, instead of using correction patterns to correct the initial target values acquired for every situation in advance so that the constraint conditions for the internal combustion engine are satisfied in any situation (that is, so that the control of the control amount of each object to be controlled becomes a control mode suitable for the state of the internal combustion engine), the initial target values are corrected repeatedly using a specific predetermined rule so that the constraint conditions for the internal combustion engine are satisfied. As described above, according to this invention, instead of using the correction patterns acquired for every situation in advance in the correction of the initial target values, a specific predetermined rule is used. Accordingly, when the control amount of each object to be controlled is maintained at a constant initial target value (that is, when the control of the control amount of each object to be controlled is in a steady state), the control amount of each object to be controlled is maintained at the initial target value in a suitable control mode (that is, in a state where the constraint conditions for the internal combustion engine are satisfied) while where the control amount of each object to be controlled is maintained at a constant initial target value. Further, when the initial target value itself is changed and the control amount of each object to be controlled is controlled to the changed initial target value (that is, the control of the control amount of each object to be controlled is in a transient state), the control amount of each object to be controlled is controlled to the changed initial target value in a suitable control mode (that is, in a state where the constraint conditions for the internal combustion engine are satisfied) while the control amount of each object to be controlled is controlled to the changed initial target value.

Moreover, according to this invention, if the constraint conditions for the internal combustion engine are satisfied when the control amounts of the respective objects to be controlled are controlled according to the operation amounts determined by using the initial target values as the control-target-values, the initial target values become the control-target-values. If the constraint conditions for the internal combustion engine are not satisfied when the control amounts of the respective objects to be controlled are controlled according to the operation amounts determined by using the initial target values as the control-target-values, the initial target values, which are corrected so that the constraint conditions for the internal combustion engine are satisfied, become the control-target-values. Accordingly, the control amount of each object to be controlled is controlled in a state where the constraint conditions for the internal combustion engine are satisfied in connection with the controls of the control amounts of both the objects to be controlled. For this reason, even though the controls of the control amounts of the respective objects to be controlled interfere with each other, the control amount of each object to be controlled is maintained at or controlled to the initial target value in a state where the constraint conditions for the internal combustion engine (that is, in a control mode suitable for the state of the internal combustion engine).

In a second invention of this application, in the first invention, the prediction calculation performed by the controlled-object-state predicting means is continued after the limited predetermined period being shortened, when a calculation load of the control device is larger than an allowable load value in view of calculation capacity of the control device.

According to this invention, if the calculation load on the control device is larger than an allowable load value in view of calculation capacity of the control device, the predetermined period defining the predicted range of the future controlled-object-state is shortened. For this reason, the calculation load on the control device is reduced, so that the significant excess of the calculation load on the control device over the allowable load value is suppressed. Accordingly, the prediction calculation performed by the control device maintains a high accuracy.

In a second invention of this application, in the first invention, the control device further includes a model selecting means for performing a model selecting calculation to select a state space model suitable for the present state of the internal combustion engine from a plurality of state space models prepared according to states of the internal combustion engine. Further, in this invention, the controlled-object-state predicting means predicts the future controlled-object-states by using the state space model selected by the model selecting means. Furthermore, in the invention, in the case of states of the internal combustion engine is changed during the prediction calculation performed by the controlled-object-state predicting means and future controlled-object-states that has already been predicted by the controlled-object-state predicting means at that time point is future controlled-object-states in the future after an allowable period from the present time point or in the future later of the allowable period, then the prediction calculation performed by the controlled-object-state predicting means is ended. On the other hand, in the invention, in the case of states of the internal combustion engine is changed during the prediction calculation performed by the controlled-object-state predicting means and future controlled-object-states that has already been predicted by the controlled-object-state predicting means at that time point is future controlled-object-states in the future before the allowable period from the present time point, then the prediction calculation performed by the controlled-object-state predicting means is continued.

According to this invention, the following effect is obtained. When the model selecting calculation is performed, the calculation load on the control device is increased with a relatively great amount. In this invention, if when the states of the internal combustion engine are changed, the future controlled-object-states that were already predicted by the controlled-object-state predicting means at that time point are future controlled-object-states ahead by an allowable period or ahead of the allowable period from the present time point, and sufficient future controlled-object-states are obtained even though the prediction calculation is ended, the prediction calculation is ended. Accordingly, in this case, sufficient future controlled-object-states are obtained while the relatively great increase of the calculation load on the control device is suppressed. Moreover, in this invention, if when states of the internal combustion engine are changed, the future controlled-object-states that were already predicted at that time point are future controlled-object-states behind the allowable period from the present time point, and sufficient future controlled-object-states are not obtained when the prediction calculation is ended at this time point, the prediction calculation is continued. Accordingly, in this case, sufficient future controlled-object-states are obtained when the prediction calculation is ended afterward.

In a third invention of this application, in the first invention, the control device further includes a model selecting means for performing a model selecting calculation to select a state space model suitable for the present state of the internal combustion engine from a plurality of state space models prepared according to states of the internal combustion engine. Further, in the invention, the controlled-object-state predicting means predicts the future controlled-object-states by using the state space model selected by the model selecting means. Furthermore, in the invention, in the case of states of the internal combustion engine is changed during the prediction calculation performed by the controlled-object-state predicting means and future controlled-object-states that has already been predicted by the controlled-object-state predicting means at that time point is future controlled-object-states in the future after an allowable period from the present time point or in the future later of the allowable period, then the prediction calculation performed by the controlled-object-state predicting means is ended regardless of the calculation load of the control device.

Meanwhile, in this invention, in the case of states of the internal combustion engine is changed during the prediction calculation performed by the controlled-object-state predicting means, future controlled-object-states that has already been predicted by the controlled-object-state predicting means at that time point is future controlled-object-states in the future before the allowable period from the present time point, and the calculation load of the control device is larger than an allowable load value in view of a calculation load of the model selecting calculation by the model selecting means, then the prediction calculation performed by the controlledobject-state predicting means is ended. On the other hand, in the invention, in the case of states of the internal combustion engine is changed during the prediction calculation performed by the controlled-object-state predicting means, future controlled-object-states that has already been predicted by the controlled-object-state predicting means at that time point is future controlled-object-states in the future before the allowable period from the present time point, and the calculation load of the control device is equal to or smaller than the allowable load value in view of the calculation load of the model selecting calculation by the model selecting means, then the prediction calculation performed by the controlled-object-state predicting means is continued.

According to this invention, the following effect is obtained. When the model selecting calculation is performed, the calculation load on the control device is increased with a relatively great amount. In this invention, if when the states of the internal combustion engine are changed, the future controlled-object-states that were already predicted at that time point are future controlled-object-states ahead by an allowable period or ahead of the allowable period from the present time point, and sufficient future controlled-object-states are obtained even though the prediction calculation is ended at that time point, the prediction calculation is ended regardless of the calculation load on the control device. Accordingly, in this case, sufficient future controlled-object-states are obtained while the relatively great increase of the calculation load on the control device is suppressed. Moreover, in this invention, if when the states of the internal combustion engine are changed, the future controlled-object-states that were already predicted at that time point are future controlled-object-states behind the allowable period from the present time point, the calculation load on the control device is larger than the allowable load value for the calculation load of the model selecting calculation, and at the same time, if a possibility that the calculation load on the control device may exceed the allowable calculation load value is high when the model selecting calculation is performed, the prediction calculation performed is ended. Accordingly, in this case, the excess of the calculation load on the control device over the allowable calculation load is suppressed. Further, in this invention, if when the states of the internal combustion engine are changed, the future controlled-object-states that were already predicted by the controlled-object-state predicting means at that time point are future controlled-object-states behind the allowable period from the present time point, and at the same time, if the calculation load on the control device is equal to or smaller than the allowable load value for the calculation load of the model selecting calculation, and if a possibility that the calculation load on the control device may exceed the allowable calculation load is low even though the model selecting calculation is performed, the prediction calculation is continued. Accordingly, in this case, intended future controlled-object-states are obtained when the prediction calculation is ended afterward.

In a fourth invention of this application, in the first invention, the control device further includes a model selecting means for performing a model selecting calculation to select a state space model suitable for the present state of the internal combustion engine from a plurality of state space models prepared according to states of the internal combustion engine. Further, the controlled-object-state predicting means predicts the future controlled-object-states by using the state space model selected by the model selecting means. Furthermore, in the case of states of the internal combustion engine is changed during the prediction calculation performed by the controlled-object-state predicting means and future controlled-object-states that has already been predicted by the controlled-object-state predicting means at that time point is future controlled-object-states in the future after an allowable period from the present time point or in the future later of the allowable period, then the prediction calculation performed by the controlled-object-state predicting means is ended regardless of the calculation load of the control device.

Meanwhile, in this invention, in the case of states of the internal combustion engine is changed during the prediction calculation performed by the controlled-object-state predicting means, future controlled-object-states that has already been predicted by the controlled-object-state predicting means at that time point is future controlled-object-states in the future before the allowable period from the present time point, and the calculation load of the control device is larger than an allowable load value in view of a calculation load of the model selecting calculation by the model selecting means, then the prediction calculation performed by the controlled-object-state predicting means is continued after the limited predetermined period is shortened. On the other hand, in the invention, in the case of states of the internal combustion engine is changed during the prediction calculation performed by the controlled-object-state predicting means, future controlled-object-states that has already been predicted by the controlled-object-state predicting means at that time point is future controlled-object-states in the future before the allowable period from the present time point, and the calculation load of the control device is equal to or smaller than the allowable load value in view of a calculation load of the model selecting calculation by the model selecting means, then the prediction calculation performed by the controlled-object-state predicting means is continued after the limited predetermined period is maintained at the value thereof at that time point.

According to this invention, the following effect is obtained. When the model selecting calculation is performed, the calculation load on the control device is increased with a relatively great amount. In this invention, if when the states of the internal combustion engine are changed, the future controlled-object-states that were already predicted at that time point are future controlled-object-states ahead by an allowable period or ahead of the allowable period from the present time point, and sufficient future controlled-object-states are obtained even though the prediction calculation is ended at that time point, the prediction calculation is ended regardless of the calculation load on the control device. Accordingly, in this case, sufficient future controlled-object-states are obtained while the relatively great increase of the calculation load on the control device is suppressed. Further, in this invention, if when the states of the internal combustion engine are changed, the future controlled-object-states that were already predicted at that time point are future controlled-object-states behind the allowable period from the present time point, and at the same time, the calculation load on the control device is larger than the allowable load value for the calculation load of the model selecting calculation, and if a possibility that the calculation load on the control device may exceed the allowable load value is high, the prediction calculation is continued after the limited predetermined period is shortened. Accordingly, in this case, sufficient future controlled-object-states are obtained when the prediction calculation is ended afterward while the excess of the calculation load on the control device over the allowable calculation load is suppressed. Furthermore, in this invention, if when the states of the internal combustion engine are changed, the future controlled-object-states that were already predicted at that time point are future controlled-object-states behind the allowable period from the present time point, the calculation load on the control device is equal to or smaller than the allowable load value for the calculation load of the model selecting calculation, and if a possibility that the calculation load on the control device may exceed the allowable load value is low, the prediction calculation is continued after the limited predetermined period is maintained at the value thereof at that time point. Accordingly, in this case, intended future controlled-object-states are obtained when the prediction calculation is ended afterward.

In a fifth invention of this application, in the first invention, the control device further includes a model selecting means for performing a model selecting calculation to select a state space model suitable for the present state of the internal combustion engine from a plurality of state space models prepared according to states of the internal combustion engine. Further, in the invention, the controlled-object-state predicting means predicts the future controlled-object-states by using the state space model selected by the model selecting means.

Further, in this invention, in the case of states of the internal combustion engine is changed during the prediction calculation performed by the controlled-object-state predicting means and the calculation load of the control device is larger than an allowable load value in view of a calculation load of the model selecting calculation by the model selecting means, then the prediction calculation performed by the controlled-object-state predicting means is ended. On the other hand, in the case of states of the internal combustion engine is changed during the prediction calculation performed by the controlled-object-state predicting means and the calculation load of the control device is equal to or smaller than the allowable load value in view of a calculation load of the model selecting calculation by the model selecting means, then the prediction calculation performed by the controlled-object-state predicting means is continued.

According to this invention, the following effect is obtained. When the model selecting calculation is performed, the calculation load on the control device is increased with a relatively great amount. In this invention, if when the states of the internal combustion engine are changed, the calculation load on the control device is larger than the allowable load value for the calculation load of the model selecting calculation, and if a possibility that the calculation load on the control device may exceed the allowable calculation load is high, the prediction calculation is ended. Accordingly, in this case, the excess of the calculation load on the control device over the allowable calculation load is suppressed. Further, in this invention, if when the states of the internal combustion engine are changed, the calculation load on the control device is equal to or smaller than the allowable load value for the calculation load of the model selecting calculation, and if a possibility that the calculation load on the control device may exceed the allowable calculation load is low, the prediction calculation is continued. Accordingly, in this case, intended future controlled-object-states are obtained when the prediction calculation is ended afterward.

In a sixth invention of this application, in the first invention, the control device further includes a model selecting means for performing a model selecting calculation to select a state space model suitable for the present state of the internal combustion engine from a plurality of state space models prepared according to states of the internal combustion engine. Further, the controlled-object-state predicting means predicts the future controlled-object-states by using the state space model selected by the model selecting means.

Furthermore, in this invention, in the case of states of the internal combustion engine is changed during the prediction calculation performed by the controlled-object-state predicting means and the calculation load of the control device is larger than an allowable load value in view of a calculation load of the model selecting calculation by the model selecting means, then the prediction calculation performed by the controlled-object-state predicting means is continued after the limited predetermined period is shortened. On the other hand, in the case of states of the internal combustion engine is changed during the prediction calculation performed by the controlled-object-state predicting means and the calculation load of the control device is equal to or smaller than the allowable load value in view of a calculation load of the model selecting calculation by the model selecting means, then the prediction calculation performed by the controlled-object-state predicting means is continued after the limited predetermined period is maintained at the value thereof at that time point.

According to this invention, the following effect is obtained. When the model selecting calculation is performed, the calculation load on the control device is increased with a relatively great amount. In this invention, if when the states of the internal combustion engine are changed, the calculation load on the control device is larger than the allowable load value for the calculation load of the model selecting calculation, and if a possibility that the calculation load on the control device may exceed the allowable calculation load is high, the prediction calculation is continued after the limited predetermined period is shortened. Accordingly, in this case, while the relatively great increase of the calculation load on the control device is suppressed, sufficient future controlled-object-states are obtained when the prediction calculation is ended afterward. Meanwhile, in this invention, if when the states of the internal combustion engine are changed, the calculation load on the control device is equal to or smaller than the allowable load value for the calculation load of the model selecting calculation, and if a possibility that the calculation load on the control device may exceed the allowable calculation load is low, the prediction calculation is continued after the limited predetermined period is maintained at the value thereof at that time point. Accordingly, in this case, intended future controlled-object-states are obtained when the prediction calculation is ended afterward.

Like the first invention, in a seventh invention of this application relates to a control device for an internal combustion engine including initial-target-value determining means, operation amount determining means, first operation-controlling means, and second operation-controlling means. The respective operation-controlling means control the operations of the respective corresponding objects to be controlled, so that the control amounts of the respective objects to be controlled are controlled.

Like the first invention, this invention further includes corrected-target-value outputting means, controlled-object-state predicting means, and constraint-condition-satisfaction determining means.

Further, as in the first invention, in this invention, in the case of the constraint-condition-satisfaction determining means determines that the future controlled-object-states predicted by the controlled-object-state predicting means satisfies the constraint condition for the internal combustion engine, then the first initial-target-value and second initial-target-value are input to the operation amount determining means as the first control-target-value and second control-target-value.

On the other hand, as in the first invention, in this invention, in the case of the constraint-condition-satisfaction determining means determines as the future controlled-object-states predicted by the controlled-object-state predicting means do not satisfy the constraint conditions for the internal combustion engine, then the first initial-target-value and second initial-target-value are corrected according to the predetermined rule by the corrected-target-value outputting means; the corrected initial-target-values are output respectively as the first corrected-target-value and the second corrected-target-value; the future states of the first object and the second object are predicted again as future controlled-object-states when the control amount of the first object and the control amount of the second object are controlled according to the first operation amount and the second operation amount determined by the operation amount determining means by employing the first initial-target-value and the second initial-target-value respectively as the first control-target-value and the second control-target-value; the constraint-condition-satisfaction determining means determines again whether or not the future controlled-object-states predicted again by the controlled-object-state predicting means satisfies the constraint condition for the internal combustion engine.

Moreover, as in the first invention, in this invention, the first corrected-target-value and second corrected-target-value are input to the operation amount determining means as the first control-target-value and second control-target-value, when the constraint-condition-satisfaction determining means determines that the future controlled-object-states predicted again by the controlled-object-state predicting means satisfies the constraint condition for the internal combustion engine.

Meanwhile, as in the first invention, in this invention, in the case of the constraint-condition-satisfaction determining means determining as the future controlled-object-states predicted again by the controlled-object-state predicting means do not satisfy the constraint condition for the internal combustion engine, then the corrections of the first corrected-target-value and the second corrected-target-value by the corrected-target-value outputting means, the prediction calculation by the controlled-object-state predicting means based on the first corrected-target-value and the second corrected-target-value corrected by the correction, and the determination by the constraint-condition-satisfaction determining means based on the future controlled-object-states predicted by the prediction calculation are repeated until determined that the future controlled-object-states predicted by the controlled-object-state predicting means satisfy the constraint condition.

As in the second invention, this invention further includes model selecting means. Further, as in the second invention, in this invention, the control device further includes a model selecting means for performing a model selecting calculation to select a state space model suitable for the present state of the internal combustion engine from a plurality of state space models prepared according to states of the internal combustion engine. Furthermore, as in the second invention, in this invention, in the case of states of the internal combustion engine is changed during the prediction calculation performed by the controlled-object-state predicting means and future controlled-object-states that has already been predicted by the controlled-object-state predicting means at that time point is future controlled-object-states in the future after an allowable period from the present time point or in the future later of the allowable period, then the prediction calculation performed by the controlled-object-state predicting means is ended. Meanwhile, as in the second invention, in this invention, in the case of states of the internal combustion engine is changed during the prediction calculation performed by the controlled-object-state predicting means and future controlled-object-states that has already been predicted by the controlled-object-state predicting means at that time point is future controlled-object-states in the future before the allowable period from the present time point, then the prediction calculation performed by the controlled-object-state predicting means is continued.

According to this invention, the following effect is obtained. When the model selecting calculation is performed, the calculation load on the control device is increased with a relatively great amount. In this invention, if when the states of the internal combustion engine are changed, the future controlled-object-states that were already predicted at that time point are future controlled-object-states ahead by an allowable period or ahead of the allowable period from the present time point, and sufficient future controlled-object-states are obtained even though the prediction calculation is ended, the prediction calculation is ended. Accordingly, in this case, sufficient future controlled-object-states are obtained while the relatively great increase of the device-calculation load is suppressed. Moreover, in this invention, if when the states of the internal combustion engine are changed, the future controlled-object-states that were already predicted at that time point are future controlled-object-states behind the allowable period from the present time point, and sufficient future controlled-object-states are not obtained when the prediction calculation is ended at this time point, the prediction calculation is continued. Accordingly, in this case, sufficient future controlled-object-states are obtained when the prediction calculation is ended afterward.

Like the first invention, a eighth invention of this application relates to a control device for an internal combustion engine including an initial-target-value determining means, an operation amount determining means, a first operation-controlling means, and a second operation-controlling means. The respective operation-controlling means control the operations of the respective corresponding objects to be controlled, so that the control amounts of the respective objects to be controlled are controlled.

Like the first invention, this invention further includes a corrected-target-value outputting means, a controlled-object-state predicting means, and a constraint-condition-satisfaction determining means.

Further, as in the first invention, in this invention, in the case of the constraint-condition-satisfaction determining means determines that the future controlled-object-states predicted by the controlled-object-state predicting means satisfy the constraint condition for the internal combustion engine, then the first initial-target-value and second initial-target-value are input to the operation amount determining means as the first control-target-value and second control-target-value.

Meanwhile, as in the first invention, in this invention, in the case of the constraint-condition-satisfaction determining means determines that the future controlled-object-states predicted by the controlled-object-state predicting means do not satisfy the constraint conditions for the internal combustion engine, then the first initial-target-value and second initial-target-value are corrected according to the predetermined rule by the corrected-target-value outputting means; the corrected initial-target-values are output respectively as the first corrected-target-value and the second corrected-target-value; the future states of the first object and the second object being predicted again as future controlled-object-states upon the control amount of the first object and the control amount of the second object are controlled according to the first operation amount and the second operation amount determined by the operation amount determining means by employing the first initial-target-value and the second initial-target-value respectively as the first control-target-value and the second control-target-value; the constraint-condition-satisfaction determining means determines again whether or not the future controlled-object-states predicted again by the controlled-object-state predicting means satisfies the constraint condition for the internal combustion engine.

Moreover, as in the first invention, in this invention, the first corrected-target-value and second corrected-target-value are input to the operation amount determining means as the first control-target-value and second control-target-value when the constraint-condition-satisfaction determining means determines that the future controlled-object-states predicted again by the controlled-object-state predicting means satisfy the constraint condition for the internal combustion engine.

Meanwhile, as in the first invention, in this invention, in the case of the constraint-condition-satisfaction determining means determines that the future controlled-object-states predicted again by the controlled-object-state predicting means do not satisfy the constraint condition for the internal combustion engine, then the corrections of the first corrected-target-value and the second corrected-target-value by the corrected-target-value outputting means, the prediction calculation by the controlled-object-state predicting means based on the first corrected-target-value and the second corrected-target-value corrected by the correction, and the determination by the constraint-condition-satisfaction determining means based on the future controlled-object-states predicted by the prediction calculation are repeated until determined that the future controlled-object-states predicted by the controlled-object-state predicting means satisfy the constraint condition.

As in the third invention, this invention further includes a model selecting means. As in the third invention, in this invention, future controlled-object-states are predicted using the state space model, which has been selected by the model selecting means, by the controlled-object-state predicting means. Further, as in the third invention, in this invention, in the case of states of the internal combustion engine is changed during the prediction calculation performed by the controlled-object-state predicting means and future controlled-object-states that has already been predicted by the controlled-object-state predicting means at that time point is future controlled-object-states in the future after an allowable period from the present time point or in the future later of the allowable period, then the prediction calculation performed by the controlled-object-state predicting means is ended regardless of the calculation load of the control device.

Meanwhile, as in the third invention, in this invention, in the case of states of the internal combustion engine is changed during the prediction calculation performed by the controlled-object-state predicting means, future controlled-object-states that has already been predicted by the controlled-object-state predicting means at that time point is future controlled-object-states in the future before the allowable period from the present time point, and the calculation load of the control device is larger than an allowable load value in view of a calculation load of the model selecting calculation by the model selecting means, then the prediction calculation performed by the controlled-object-state predicting means is ended. On the other hand, in the case of states of the internal combustion engine is changed during the prediction calculation performed by the controlled-object-state predicting means, future controlled-object-states that has already been predicted by the controlled-object-state predicting means at that time point is future controlled-object-states in the future before the allowable period from the present time point, and the calculation load of the control device is equal to or smaller than the allowable load value in view of the calculation load of the model selecting calculation by the model selecting means, then the prediction calculation performed by the controlled-object-state predicting means is continued.

According to this invention, the following effect is obtained. When the model selecting calculation is performed, the calculation load on the control device is increased with a relatively great amount. In this invention, if when the states of the internal combustion engine are changed, the future controlled-object-states that were already predicted at that time point are future controlled-object-states ahead by an allowable period or ahead of the allowable period from the present time point, and sufficient future controlled-object-states are obtained even though the prediction calculation is ended at this time point, the prediction calculation is ended regardless of the calculation load on the control device. Accordingly, in this case, sufficient future controlled-object-states are obtained while the relatively great increase of the calculation load on the control device is suppressed. Moreover, in this invention, if when the states of the internal combustion engine are changed, the future controlled-object-states that were already predicted at that time point are future controlled-object-states behind the allowable period from the present time point, the calculation load on the control device is larger than the allowable load value for the calculation load of the model selecting calculation, and if a possibility that the calculation load on the control device may exceed the allowable calculation load is high when the model selecting calculation is performed, the prediction calculation performed is ended. Accordingly, in this case, the excess of the calculation load on the control device over the allowable calculation load is suppressed. Further, in this invention, if when the states of the internal combustion engine are changed, the future controlled-object-states that were already predicted at that time point are future controlled-object-states behind the allowable period from the present time point, the calculation load on the control device is equal to or smaller than the allowable load value for the calculation load of the model selecting calculation, and if a possibility that the calculation load on the control device may exceed the allowable calculation load is low even though the model selecting calculation is performed, the prediction calculation performed is continued. Accordingly, in this case, intended future controlled-object-states are obtained when the prediction calculation is ended afterward.

Like the first invention, a ninth invention of this application relates to a control device for an internal combustion engine including an initial-target-value determining means, an operation amount determining means, a first operation-controlling means, and a second operation-controlling means. The respective operation-controlling means control the operations of the respective corresponding objects to be controlled, so that the control amounts of the respective objects to be controlled are controlled.

Like the first invention, this invention further includes a corrected-target-value outputting means, a controlled-object-state predicting means, and a constraint-condition-satisfaction determining means.

Further, as in the first invention, in this invention, in the case of the constraint-condition-satisfaction determining means determines that the future controlled-object-states predicted by the controlled-object-state predicting means satisfy the constraint condition for the internal combustion engine, then the first initial-target-value and second initial-targetvalue are input to the operation amount determining means as the first control-target-value and second control-target-value.

Meanwhile, as in the first invention, in this invention, in the case of the constraint-condition-satisfaction determining means determines that the future controlled-object-states predicted by the controlled-object-state predicting means do not satisfy the constraint conditions for the internal combustion engine, then the first initial-target-value and second initial-target-value are corrected according to the predetermined rule by the corrected-target-value outputting means; the corrected initial-target-values are output respectively as the first corrected-target-value and the second corrected-target-value; the future states of the first object and the second object are predicted again as future controlled-object-states when the control amount of the first object and the control amount of the second object are controlled according to the first operation amount and the second operation amount determined by the operation amount determining means by employing the first initial-target-value and the second initial-target-value respectively as the first control-target-value and the second control-target-value; the constraint-condition-satisfaction determining means determines again whether or not the future controlled-object-states predicted again by the controlled-object-state predicting means satisfies the constraint condition for the internal combustion engine.

Moreover, as in the first invention, in this invention, the first corrected-target-value and second corrected-target-value are input to the operation amount determining means as the first control-target-value and second control-target-value when the constraint-condition-satisfaction determining means determine that the future controlled-object-states predicted again by the controlled-object-state predicting means satisfy the constraint condition for the internal combustion engine.

Meanwhile, as in the first invention, in this invention, in the case of the constraint-condition-satisfaction determining means determines that the future controlled-object-states predicted again by the controlled-object-state predicting means do not satisfy the constraint condition for the internal combustion engine, then the corrections of the first corrected-target-value and the second corrected-target-value by the corrected-target-value outputting means, the prediction calculation by the controlled-object-state predicting means based on the first corrected-target-value and the second corrected-target-value corrected by the correction, and the determination by the constraint-condition-satisfaction determining means based on the future controlled-object-states predicted by the prediction calculation are repeated until determined that the future controlled-object-states predicted by the controlled-object-state predicting means satisfy the constraint condition.

As in the fourth invention, this invention further includes a model selecting means. Further, as in the fourth invention, in this invention, future controlled-object-states are predicted using the state space model, which has been selected by the model selecting means, by the controlled-object-state predicting means. Furthermore, as in the fourth invention, in this invention, in the case of states of the internal combustion engine is changed during the prediction calculation performed by the controlled-object-state predicting means and future controlled-object-states that has already been predicted by the controlled-object-state predicting means at that time point are future controlled-object-states in the future after an allowable period from the present time point or in the future later of the allowable period, then the prediction calculation performed by the controlled-object-state predicting means is ended regardless of the calculation load of the control device.

Meanwhile, as in the fourth invention, in this invention, in the case of states of the internal combustion engine is changed during the prediction calculation performed by the controlled-object-state predicting means, future controlled-object-states that has already been predicted by the controlled-object-state predicting means at that time point is future controlled-object-states in the future before the allowable period from the present time point, and the calculation load of the control device is larger than an allowable load value in view of a calculation load of the model selecting calculation by the model selecting means, then the prediction calculation performed by the controlled-object-state predicting means is continued after the limited predetermined period being shortened. On the other hand, in the case of states of the internal combustion engine is changed during the prediction calculation performed by the controlled-object-state predicting means, future controlled-object-states that has already been predicted by the controlled-object-state predicting means at that time point is future controlled-object-states in the future before the allowable period from the present time point, and the calculation load of the control device is equal to or smaller than the allowable load value in view of a calculation load of the model selecting calculation by the model selecting means, then the prediction calculation performed by the controlled-object-state predicting means is continued after the limited predetermined period is maintained at the value thereof at that time point.

According to this invention, the following effect is obtained. When the model selecting calculation is performed, the calculation load on the control device is increased with a relatively great amount. In this invention, if when the states of the internal combustion engine are changed, the future controlled-object-states that were already predicted at that time point are future controlled-object-states ahead by an allowable period or ahead of the allowable period from the present time point, and sufficient future controlled-object-states are obtained even though the prediction calculation is ended at this time point, the prediction calculation is ended regardless of the calculation load on the control device. Accordingly, in this case, sufficient future controlled-object-states are obtained while the relatively great increase of the calculation load on the control device is suppressed. Further, in this invention, if when the states of the internal combustion engine are changed, the future controlled-object-states that were already predicted at that time point are future controlled-object-states behind the allowable period from the present time point, and the calculation load on the control device is larger than the allowable load value for the calculation load of the model selecting calculation, and if a possibility that the calculation load on the control device may exceed the allowable load value is high when the model selecting calculation is performed, the prediction calculation is continued after the limited predetermined period is shortened. Accordingly, in this case, sufficient future controlled-object-states are obtained when the prediction calculation is ended afterward while the excess of the calculation load on the control device over the allowable calculation load is suppressed. Furthermore, in this invention, if when the states of the internal combustion engine are changed, the future controlled-object-states that were already predicted at that time point are future controlled-object-states behind the allowable period from the present time point, the calculation load on the control device is equal to or smaller than the allowable load value for the calculation load of the model selecting calculation, and if a possibility that the calculation load on the control device may exceed the allowable calculation load is low even though the model selecting calculation is performed, the prediction calculation is continued after the limited predetermined period is maintained at the value thereof at that time point. Accordingly, in this case, intended future controlled-object-states are obtained when the prediction calculation is ended afterward.

Like the first invention, a tenth invention of this application relates to a control device for an internal combustion engine including an initial-target-value determining means, an operation amount determining means, a first operation-controlling means, and a second operation-controlling means. The respective operation-controlling means control the operations of the respective corresponding objects to be controlled, so that the control amounts of the respective objects to be controlled are controlled.

Like the first invention, this invention further includes a corrected-target-value outputting means, a controlled-object-state predicting means, and a constraint-condition-satisfaction determining means.

Further, as in the first invention, in this invention, in the case of the constraint-condition-satisfaction determining means determines that the future controlled-object-states predicted by the controlled-object-state predicting means satisfy the constraint condition for the internal combustion engine, then the first initial-target-value and second initial-target-value are input to the operation amount determining means as the first control-target-value and second control-target-value.

Meanwhile, as in the first invention, in this invention, in the case of the constraint-condition-satisfaction determining means determines that the future controlled-object-states predicted by the controlled-object-state predicting means do not satisfy the constraint conditions for the internal combustion engine, then the first initial-target-value and second initial-target-value are corrected according to the predetermined rule by the corrected-target-value outputting means; the corrected initial-target-values are output respectively as the first corrected-target-value and the second corrected-target-value; the future states of the first object and the second object are predicted again as future controlled-object-states upon the control amount of the first object and the control amount of the second object are controlled according to the first operation amount and the second operation amount determined by the operation amount determining means by employing the first initial-target-value and the second initial-target-value respectively as the first control-target-value and the second control-target-value; the constraint-condition-satisfaction determining means determines again whether or not the future controlled-object-states predicted again by the controlled-object-state predicting means satisfies the constraint condition for the internal combustion engine.

Moreover, as in the first invention, in this invention, the first corrected-target-value and second corrected-target-value are input to the operation amount determining means as the first control-target-value and second control-target-value when the constraint-condition-satisfaction determining means determines that the future controlled-object-states predicted again by the controlled-object-state predicting means satisfy the constraint condition for the internal combustion engine.

Meanwhile, as in the first invention, in this invention, in the case of the constraint-condition-satisfaction determining means determines that the future controlled-object-states predicted again by the controlled-object-state predicting means do not satisfy the constraint condition for the internal combustion engine, then the corrections of the first corrected-target-value and the second corrected-target-value by the corrected-target-value outputting means, the prediction calculation by the controlled-object-state predicting means based on the first corrected-target-value and the second corrected-target-value corrected by the correction, and the determination by the constraint-condition-satisfaction determining means based on the future controlled-object-states predicted by the prediction calculation are repeated until determined that the future controlled-object-states predicted by the controlled-object-state predicting means satisfy the constraint condition.

As in the fifth invention, this invention further includes a model selecting means. Further, as in the fifth invention, in this invention, future controlled-object-states are predicted using the state space model, which has been selected by the model selecting means, by the controlled-object-state predicting means.

Furthermore, as in the fifth invention, in this invention, in the case of states of the internal combustion engine is changed during the prediction calculation performed by the controlled-object-state predicting means and the calculation load of the control device is larger than an allowable load value in view of a calculation load of the model selecting calculation by the model selecting means, then the prediction calculation performed by the controlled-object-state predicting means is ended. On the other hand, as in the fifth invention, in this invention, in the case of states of the internal combustion engine is changed during the prediction calculation performed by the controlled-object-state predicting means and the calculation load of the control device is equal to or smaller than the allowable load value in view of a calculation load of the model selecting calculation by the model selecting means, then the prediction calculation performed by the controlled-object-state predicting means is continued.

According to this invention, the following effect is obtained. When the model selecting calculation is performed, the calculation load on the control device is increased with a relatively great amount. In this invention, if when the states of the internal combustion engine are changed, the calculation load on the control device is larger than the allowable load value for the calculation load of the model selecting calculation, and if a possibility that the calculation load of the object to be controlled may exceed the allowable calculation load is high when the model selecting calculation is performed, the prediction calculation is ended. Accordingly, in this case, the excess of the calculation load of the object to be controlled over the allowable calculation load is suppressed. Further, in this invention, if when the states of the internal combustion engine are changed, the calculation load on the control device is equal to or smaller than the allowable load value for the calculation load of the model selecting calculation, and if a possibility that the calculation load on the control device may exceed the allowable calculation load is low even though the model selecting calculation is performed, the prediction calculation is continued. Accordingly, in this case, intended future controlled-object-states are obtained when the prediction calculation is ended afterward.

Like the first invention, an eleventh invention of this application relates to a control device for an internal combustion engine including an initial-target-value determining means, an operation amount determining means, a first operation-controlling means, and a second operation-controlling means. The respective operation-controlling means control the operations of the respective corresponding objects to be controlled, so that the control amounts of the respective objects to be controlled are controlled.

Like the first invention, this invention further includes a corrected-target-value outputting means, a controlled-object-state predicting means, and a constraint-condition-satisfaction determining means.

Further, as in the first invention, in this invention, in the case of the constraint-condition-satisfaction determining means determines that the future controlled-object-states predicted by the controlled-object-state predicting means satisfies the constraint condition for the internal combustion engine, then the first initial-target-value and second initial-target-value are input to the operation amount determining means as the first control-target-value and second control-target-value.

Meanwhile, as in the first invention, in this invention, in the case of the constraint-condition-satisfaction determining means determining as the future controlled-object-states predicted by the controlled-object-state predicting means do not satisfy the constraint conditions for the internal combustion engine, then the first initial-target-value and second initial-target-value are corrected according to the predetermined rule by the corrected-target-value outputting means; the corrected initial-target-values are output respectively as the first corrected-target-value and the second corrected-target-value; the future states of the first object and the second object are predicted again as future controlled-object-states when the control amount of the first object and the control amount of the second object are controlled according to the first operation amount and the second operation amount determined by the operation amount determining means by employing the first initial-target-value and the second initial-target-value respectively as the first control-target-value and the second control-target-value; the constraint-condition-satisfaction determining means determines again whether or not the future controlled-object-states predicted again by the controlled-object-state predicting means satisfy the constraint condition for the internal combustion engine.

Moreover, as in the first invention, in this invention, the first corrected-target-value and second corrected-target-value are input to the operation amount determining means as the first control-target-value and second control-target-value when the constraint-condition-satisfaction determining means determine that the future controlled-object-states predicted again by the controlled-object-state predicting means satisfy the constraint condition for the internal combustion engine.

Meanwhile, as in the first invention, in this invention, in the case of the constraint-condition-satisfaction determining means determine that the future controlled-object-states predicted again by the controlled-object-state predicting means do not satisfy the constraint condition for the internal combustion engine, then the corrections of the first corrected-target-value and the second corrected-target-value by the corrected-target-value outputting means, the prediction calculation by the controlled-object-state predicting means based on the first corrected-target-value and the second corrected-target-value corrected by the correction, and the determination by the constraint-condition-satisfaction determining means based on the future controlled-object-states predicted by the prediction calculation are repeated until determined as the future controlled-object-states predicted by the controlled-object-state predicting means satisfy the constraint condition.

As in the sixth invention, this invention further includes a model selecting means. Further, as in the sixth invention, in this invention, the controlled-object-state predicting means predicts the future controlled-object-states by using the state space model selected by the model selecting means.

Furthermore, as in the sixth invention, in this invention, in the case of states of the internal combustion engine is changed during the prediction calculation performed by the controlled-object-state predicting means and the calculation load of the control device is larger than an allowable load value in view of a calculation load of the model selecting calculation by the model selecting means, then the prediction calculation performed by the controlled-object-state predicting means is continued after the limited predetermined period being shortened. On the other hand as in the sixth invention, in this invention, in the case of states of the internal combustion engine is changed during the prediction calculation performed by the controlled-object-state predicting means and the calculation load of the control device is equal to or smaller than the allowable load value in view of a calculation load of the model selecting calculation by the model selecting means, then the prediction calculation performed by the controlled-object-state predicting means is continued after the limited predetermined period is maintained at the value thereof at that time point.

According to this invention, the following effect is obtained. When the model selecting calculation is performed, the calculation load on the control device is increased with a relatively great amount. In this invention, if when the states of the internal combustion engine are changed, the calculation load on the control device is larger than the allowable load value for the calculation load of the model selecting calculation, and if a possibility that the calculation load on the control device may exceed the allowable calculation load is high when the model selecting calculation is performed, the prediction calculation is continued after the limited predetermined period is shortened. Accordingly, in this case, sufficient future controlled-object-states are obtained when the prediction calculation is ended afterward while the excessive calculation load on the control device over the allowable calculation load is suppressed. Furthermore, in this invention, if when the states of the internal combustion engine are changed, the calculation load on the control device is equal to or smaller than the allowable load value for the calculation load of the model selecting calculation, and if a possibility that the calculation load on the control device may exceed the allowable calculation load is low even though the model selecting calculation is performed, the prediction calculation is continued after the limited predetermined period is maintained at the value thereof at that time point. Accordingly, in this case, intended future controlled-object-states are obtained when the prediction calculation is ended afterward.

DESCRIPTION OF EMBODIMENTS

Embodiments of a control device for an internal combustion engine of the present invention will be described below with reference to the drawings. The embodiments to be described below are embodiments when a control device of the present invention is applied to an internal combustion engine illustrated in FIG. 1.

Figure 1:
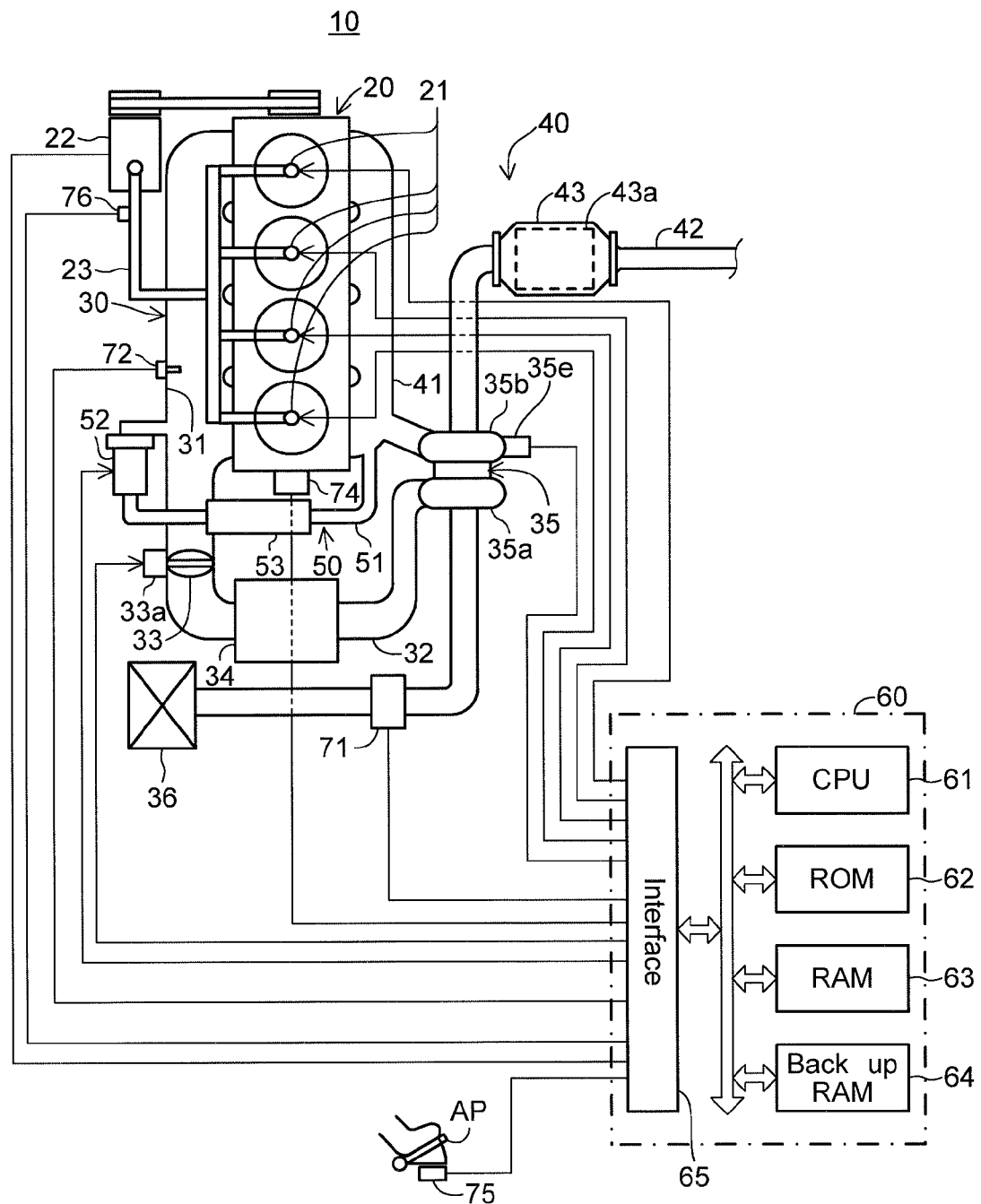
FIG. 1 is a schematic view of an internal combustion engine to which a control device of the present invention is applied.

An internal combustion engine 10 illustrated in FIG. 1 includes a body (hereinafter, referred to as an "engine body") 20 of the internal combustion engine, fuel injection valves 21 that are disposed so as to correspond to four combustion chambers of the engine body 20, respectively, and a fuel pump 22 that supplies fuel to the fuel injection valves 21 through a fuel supply pipe 23. Further, the internal combustion engine 10 includes an intake system 30 that supplies air to the combustion chambers from the outside, and an exhaust system 40 that discharges exhaust gas discharged from the combustion chambers to the outside. Furthermore, the internal combustion engine 10 is a compression self-ignition internal combustion engine (so-called diesel engine).

The intake system 30 includes an intake branch pipe 31 and an intake pipe 32. One end portion (that is, a branch portion) of the intake branch pipe 31 is connected to intake ports (not illustrated) that are formed in the engine body 10 so as to correspond to the respective combustion chambers. Meanwhile, the other end portion of the intake branch pipe 31 is connected to the intake pipe 32. A throttle valve 33, which controls the amount of air flowing in the intake pipe 32, is disposed in the intake pipe 32. An actuator (hereinafter, referred to as a "throttle valve actuator") 33a, which controls the opening of the throttle valve 33, is mounted on the throttle valve 33. Moreover, an intercooler 34, which cools the air flowing in the intake pipe 32, is disposed on the intake pipe 32. In addition, an air cleaner 36 is disposed at an end portion of the intake pipe 32 that faces the outside.

Meanwhile, the exhaust system 40 includes an exhaust branch pipe 41 and an exhaust pipe 42. One end portion (that is, a branch portion) of the exhaust branch pipe 41 is connected to exhaust ports (not illustrated) that are formed in the engine body 10 so as to correspond to the respective combustion chambers. Meanwhile, the other end portion of the exhaust branch pipe 41 is connected to the exhaust pipe 42. A catalyst converter 43 in which an exhaust gas purifying catalyst 43a purifying a specific ingredient of the exhaust gas is built is disposed on the exhaust pipe 42.

Figure 2:
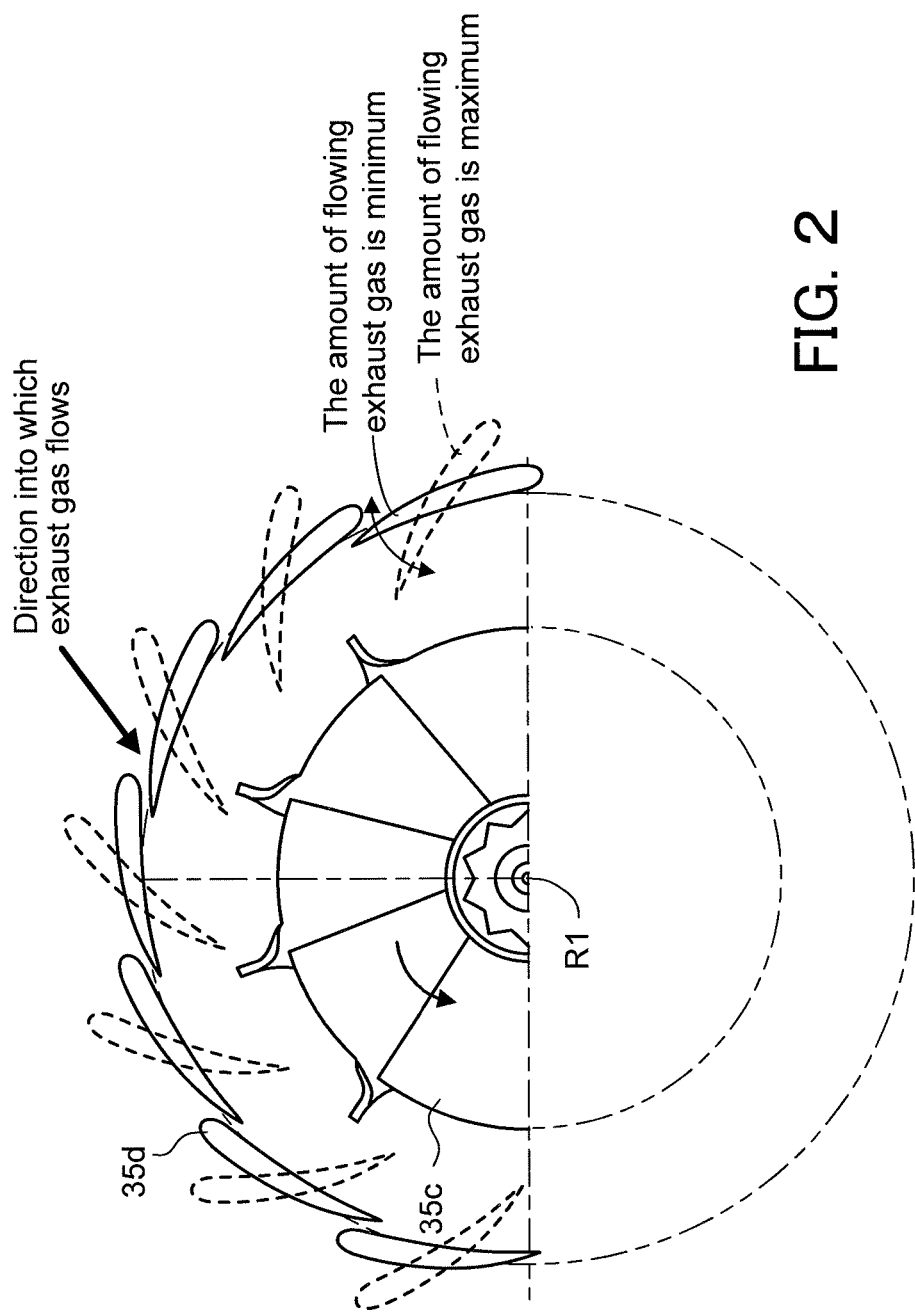
FIG. 2 is a view illustrating the inside of an exhaust turbine of a supercharger of the internal combustion engine illustrated in FIG. 1.

Further, the internal combustion engine 10 includes a supercharger 35. The supercharger 35 includes a compressor 35a that is disposed in the intake pipe 32 on the upstream of the intercooler 34 and an exhaust turbine 35b that is disposed in the exhaust pipe 42 on the upstream of the catalyst converter 43. As illustrated in FIG. 2, the exhaust turbine 35b includes an exhaust turbine body 35c and a plurality of wing-like vanes 35d.

The exhaust turbine body 35c is connected to the compressor 35a by a shaft (not illustrated). When the exhaust turbine body 35c is rotated by exhaust gas, the rotation of the exhaust turbine body is transmitted to the compressor 35a by the shaft. Accordingly, the compressor 35a is rotated.

Meanwhile, the vanes 35d are radially disposed at the same angular interval around a rotation center axis R1 of the exhaust turbine body 35c so as to surround the exhaust turbine body 35c. Further, each of the vanes 35d is disposed so as to be capable of rotating about an axis that corresponds to each of the vanes and is denoted in FIG. 2 by a reference numeral R2. Furthermore, when a direction where each of the vanes 35d extends, that is, a direction that is denoted in FIG. 2 by a reference numeral E is referred to as an "extending direction" and a line that connects the rotation center axis R1 of the exhaust turbine body 35c with the rotation axis R2 of the vane 35d, that is, a line that is denoted in FIG. 2 by a reference numeral A is referred to as a "reference line," each vane 35d is rotated so that an angle between the extending direction E of the vane and the reference line A corresponding to the vane is the same about all the vanes 35d. Moreover, if each vane 35d is rotated so that the angle between the extending direction E of the vane and the reference line A corresponding to the vane is reduced, that is, so that the flow passage area between the adjacent vanes 35d is reduced, the flow rate of exhaust gas supplied to the exhaust turbine body 35c is increased. As a result, the rotational speed of the exhaust turbine body 35c is increased, so that the rotational speed of the compressor 35a is also increased. Accordingly, the air flowing in the intake pipe 32 is greatly compressed by the compressor 35a. For this reason, as the angle between the extending direction E of each vane 35d and the reference line corresponding to the vane 35d (hereinafter, this angle is referred to as a "vane opening") is reduced, the degree of the compression of the air, which flows in the intake pipe 32 and is compressed by the compressor 35a, is increased.

Meanwhile, each vane 35d is rotated by an actuator (hereinafter, referred to as a "vane actuator") 35e.

Further, the internal combustion engine 10 includes an exhaust gas recirculation device (hereinafter, this is referred to as an "EGR device") 50. The EGR device 50 includes an exhaust gas recirculation pipe (hereinafter, this is referred to as an "EGR pipe") 51. One end of the EGR pipe 51 is connected to the exhaust branch pipe 41. Meanwhile, the other end of the EGR pipe 51 is connected to the intake branch pipe 31. Furthermore, an exhaust gas recirculation control valve (hereinafter, this exhaust gas recirculation control valve is referred to as an "EGR control valve") 52, which controls the flow rate of exhaust gas flowing in the EGR pipe 51, is disposed on the EGR pipe 51. The EGR control valve 52 is operated by an actuator (not illustrated) (hereinafter, this is referred to as an "EGR control valve actuator"). In the internal combustion engine 10, the flow rate of exhaust gas flowing in the EGR pipe 51 is increased as the opening of the EGR control valve 52 (hereinafter, this opening is referred to as an "EGR control valve opening") is increased. In addition, an exhaust gas recirculation cooler 53, which cools exhaust gas flowing in the EGR pipe 51, is disposed on the EGR pipe 51.

Further, an air flow meter 71, which detects the flow rate of air flowing in the intake pipe 32, is mounted on the intake pipe 32 on the downstream of the air cleaner 36 and on the upstream of the compressor 35a. Furthermore, a pressure sensor (hereinafter, referred to as an "intake pressure sensor") 72, which detects pressure in the intake branch pipe 31, is mounted on the intake branch pipe 31.

Moreover, the internal combustion engine 10 includes an electronic control device 60. The electronic control device 60 includes a microprocessor (CPU) 61, a read-only memory (ROM) 62, a random access memory (RAM) 63, a back-up RAM 64, and an interface 65. Since the fuel injection valves 21, the fuel pump 22, the throttle valve actuator 33a, the vane actuator 35e, and the EGR control valve actuator are connected to the interface 65, control signals for controlling the operations of these are given from the electronic control device 60 through the interface 65. Further, the air flow meter 71, the intake pressure sensor 72, and an accelerator opening sensor 75 detecting the stepping amount of an accelerator pedal AP are also connected to the interface 65. Accordingly, a signal corresponding to the flow rate that is detected by the air flow meter 71, a signal corresponding to the pressure that is detected by the intake pressure sensor 72, and a signal corresponding to the stepping amount of the accelerator pedal AP that is detected by the accelerator opening sensor 75 are input to the interface 65.

Meanwhile, air flowing in the intake pipe 32 is compressed by the compressor 35a of the supercharger 35 in this embodiment as described above. Further, it is possible to control the pressure of air when air is compressed by the compressor 35a (hereinafter, this pressure is referred to as a "supercharging pressure") by controlling the rotational positions of the vanes 35d (that is, vane opening) of the exhaust turbine 35b. Accordingly, if other conditions other than the vane opening are the same, a supercharging pressure is increased as the vane opening is reduced. Furthermore, as described above, in this embodiment, exhaust gas (hereinafter, this exhaust gas is referred to as "EGR gas") is introduced into the air, which flows in the intake pipe 32, by the EGR device 50. Here, it is possible to control the amount of the EGR gas (hereinafter, this amount is referred to as an "EGR gas amount") by controlling the opening of the EGR control valve 52, that is, the EGR control valve opening. Accordingly, if other conditions other than the EGR control valve opening are the same, the EGR gas amount is increased as the EGR control valve opening is increased.

Meanwhile, a target value of a supercharging pressure (hereinafter, this target value is referred to as a "target supercharging pressure") is set in the control device of this embodiment, and the vane opening is controlled so that an actual supercharging pressure becomes the target supercharging pressure. Moreover, in the control device of this embodiment, a ratio of the EGR gas amount to the total amount of gas sucked into the combustion chambers (hereinafter, this ratio is referred to as an "EGR rate") is employed as a parameter that represents the EGR gas amount, a target value of this EGR rate (hereinafter, this target value is referred to as a "target EGR rate") is set, and the EGR control valve opening is controlled so that an actual EGR rate becomes the target EGR rate. Next, the control of the supercharging pressure and the EGR rate will be described.

When the target supercharging pressure is set, a deviation of an actual supercharging pressure from the target supercharging pressure (hereinafter, this deviation is referred to as a "supercharging pressure deviation") is calculated in the electronic control device 60. Here, since the pressure detected by the intake pressure sensor 72 corresponds to a supercharging pressure, the pressure detected by the intake pressure sensor 72 is used as an actual supercharging pressure in this embodiment. Further, the setting of the target supercharging pressure will be described in detail below.

When the supercharging pressure deviation is calculated, this supercharging pressure deviation is converted according to a predetermined conversion rule (in other words, a predetermined control rule) in the electronic control device 60. Accordingly, a control signal is generated. The control signal, which is generated here, is a control signal that is given to the vane actuator 35e from the electronic control device 60 to allow the vane actuator 35e to operate the vanes 35d. Further, the predetermined conversion rule (hereinafter, this conversion rule is referred to as a "supercharging pressure deviation conversion rule") is to convert the supercharging pressure deviation into a control signal that allows the vane actuator 35e to operate the vanes 35d so that the supercharging pressure deviation is reduced.

When the control signal (hereinafter, this control signal is referred to as a "vane control signal") generated through the conversion of the supercharging pressure deviation is given to the vane actuator 35e from the electronic control device 60, the vane actuator 35e operates the vanes 35e according to the vane control signal. That is, the vane actuator 35e inputs an operation amount (hereinafter, this operation amount is referred to as a "vane operation amount"), which corresponds to the vane control signal, to the vanes 35e.

Here, when the supercharging pressure deviation has a positive value, that is, when an actual supercharging pressure is lower than a target supercharging pressure, the vane actuator 35e operates the vanes 35d so that the vane opening is reduced. Accordingly, an actual supercharging pressure is increased. Meanwhile, when the supercharging pressure deviation has a negative value, that is, when an actual supercharging pressure is higher than a target supercharging pressure, the vane actuator 35e operates the vanes 35d so that the vane opening is increased. Accordingly, an actual supercharging pressure is reduced.

Meanwhile, when a target EGR rate is set, a deviation of an actual EGR rate from the target EGR rate (hereinafter, this deviation is referred to as an "EGR rate deviation") is calculated in the electronic control device 60.

When the EGR rate deviation is calculated, this EGR rate deviation is converted according to a predetermined conversion rule (in other words, a predetermined control rule) in the electronic control device 60. Accordingly, a control signal is generated. The control signal, which is generated here, is a control signal that is given to the EGR control valve actuator to allow the EGR control valve actuator to operate the EGR control valve 52. Further, the predetermined conversion rule (hereinafter, this conversion rule is referred to as an "EGR rate deviation conversion rule") is to convert the EGR rate deviation into a control signal that allows the EGR control valve actuator to operate the EGR control valve 52 so that the EGR rate deviation is reduced.

When the control signal (hereinafter, this control signal is referred to as an "EGR control valve control signal") generated through the conversion of the EGR rate deviation is given to the EGR control valve actuator from the electronic control device 60, the EGR control valve actuator operates the EGR control valve 52 according to the EGR control valve control signal. That is, the EGR control valve actuator inputs an operation amount (hereinafter, this operation amount is referred to as an "EGR control valve-operation amount"), which corresponds to the EGR control valve control signal, to the EGR control valve 52.

Here, when the EGR rate deviation has a positive value, that is, when an actual EGR rate is lower than a target EGR rate, the EGR control valve actuator operates the EGR control valve 52 so that the EGR control valve opening is increased. Accordingly, an actual EGR rate is increased. Meanwhile, when the EGR rate deviation has a negative value, that is, when an actual EGR rate is higher than a target EGR rate, the EGR control valve actuator operates the EGR control valve 52 so that the EGR control valve opening is reduced. Accordingly, an actual EGR rate is reduced.

Next, the setting of the target supercharging pressure and the target EGR rate will be described.

Figure 3:
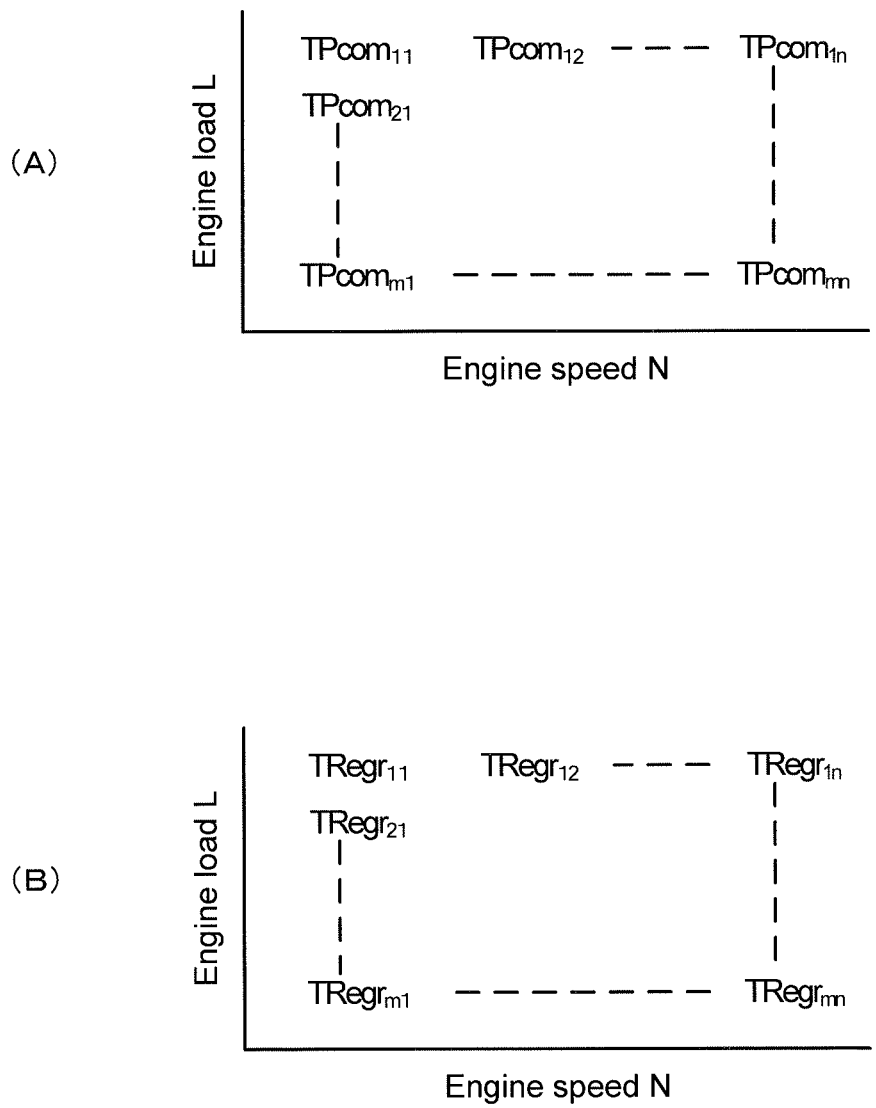
FIG. 3(A) is a view illustrating a map that is used to determine a target supercharging pressure.
FIG. 3(B) is a view illustrating a map that is used to determine a target EGR rate.

As a supercharging pressure, there is an optimal supercharging pressure corresponding to the operating states of the internal combustion engine 10 (hereinafter, this is referred to as "engine operating states"). Further, in this embodiment, engine speed and an engine load are employed as the engine operating states, optimal supercharging pressures are obtained in advance by experiments or the like according to the engine speed and the engine load, and these obtained supercharging pressures are stored in the electronic control device 60 as a target supercharging pressure TPcom in the form of a map of a function of engine speed N and an engine load L as illustrated in FIG. 3(A). Furthermore, the target supercharging pressure TPcom is determined from the map of FIG. 3(A) based on engine speed N and an engine load L.

Moreover, as an EGR rate, there is also an optimal EGR rate according to the engine operating states. Further, in this embodiment, engine speed and an engine load are employed as the engine operating states, optimal EGR rates are obtained in advance by experiments or the like according to the engine speed and the engine load, and these obtained EGR rates are stored in the electronic control device 60 as a target EGR rate TRegr in the form of a map of a function of engine speed N and an engine load L as illustrated in FIG. 3(B). Furthermore, a target supercharging pressure TRegr is determined from the map of FIG. 3(B) based on engine speed N and an engine load L.

Meanwhile, when a deviation TPcom-Pcom of an actual intake pressure Pcom from the target supercharging pressure TPcom, which is determined in this way, (that is, a supercharging pressure deviation) is converted into a vane control signal according to the supercharging pressure deviation conversion rule as described above and the operating state of the vanes 35d is controlled according to the vane control signal by the vane actuator 35e, a supercharging pressure is finally controlled to the target supercharging pressure. However, if the target supercharging pressure TPcom determined from the map of FIG. 3(A) is used in the control of a supercharging pressure as it is, some inconveniences are caused.

That is, for example, when an actual supercharging pressure is lower than the target supercharging pressure, a control signal (that is, a vane control signal), which allows the vane actuator 35e to operate (that is, rotate) the vanes 35d so that the vane opening is reduced according to the deviation of the actual supercharging pressure from the target supercharging pressure (that is, the supercharging pressure deviation) as described above, is generated by the electronic control device 60. Further, the generated vane control signal is given to the vane actuator 35e from the electronic control device 60, and the vane actuator 35e operates the vanes 35d according to the given vane control signal.

Meanwhile, at this time, in a certain engine operating state including an EGR rate and the like, a supercharging pressure may significantly exceed the target supercharging pressure while a supercharging pressure is controlled to the target supercharging pressure. In particular, when an actual supercharging pressure is significantly lower than the target supercharging pressure, the vane actuator 35e operates the vanes 35d to a large extent. For this reason, a possibility that a supercharging pressure may significantly exceed the target supercharging pressure is further increased. However, it is necessary to prevent the supercharging pressure from significantly exceeding the target supercharging pressure as described above. In short, when a supercharging pressure is controlled to a target supercharging pressure, the supercharging pressure should be in an allowable range even though the supercharging pressure exceeds the target supercharging pressure.

Further, for example, the oxygen concentration in the gas sucked into the combustion chambers should be maintained at a certain predetermined concentration or more in order to avoid the occurrence of an accidental fire in the combustion chambers. Furthermore, the oxygen concentration in the gas sucked into the combustion chambers is changed depending on an EGR rate, and this EGR rate is changed depending on a supercharging pressure. Accordingly, when a supercharging pressure is controlled to a target supercharging pressure, the supercharging pressure should be controlled so that the concentration in the gas sucked into the combustion chambers is maintained at a predetermined concentration or more.

As described above, the control of a supercharging pressure has a constraint on the supercharging pressure itself that is a parameter to be controlled.

Moreover, an operable range of the vanes 35d (that is, the rotatable range of the vanes 35d) has a limit due to the structure thereof. For this reason, if the operating state of the vanes 35d reaches the limit of the operable range of the vanes even though the vane actuator 35e operates the vanes 35d to reduce the vane opening, the vane actuator 35e cannot operate the vanes 35d over the limit of the operable range. If the vane actuator 35e nevertheless operates the vanes 35d, the failure of the vanes 35 is apt to be caused. Further, the operation of the vanes 35d should be limited to a range, which is narrower than the operable range of the vanes, in order to more reliably avoid the failure of the vanes 35d. In short, when a supercharging pressure is controlled to a target supercharging pressure, the operation of the vanes 35d should be limited to an allowable range that is determined from various viewpoints. As described above, the control of a supercharging pressure also has a constraint on the operating state of the vanes 35d that is an object to be controlled.

In addition, an operable range of the vane actuator 35e also has a limit due to the structure thereof. For this reason, if the vane actuator 35e reaches the limit of the operable range of the vane actuator even though the vane actuator 35e operates the vanes 35d to reduce the vane opening, the vane actuator 35e cannot operate the vanes 35d over the limit of the operable range. If the vane actuator 35e nevertheless operates the vanes 35d, the failure of the vane actuator 35e is apt to be caused. Further, the operation of the vane actuator 35e should be limited to a range, which is narrower than the operable range of the vane actuator 35e, in order to more reliably avoid the failure of the vane actuator 35e. In short, when a supercharging pressure is controlled to a target supercharging pressure, the operation of the vane actuator 35e should also be limited to an allowable range that is determined from various viewpoints. As described above, the control of a supercharging pressure also has a constraint on the operating state of the vane actuator 35e that is a means for controlling the operation of the vanes 35d.

In addition, as the vane operation amount (that is, an operation amount to be input to the vanes 35d from the vane actuator 35e), there is an appropriate operation amount when the performance of the vane actuator 35e and the performance of the vanes 35d are considered. In short, when a supercharging pressure is controlled to a target supercharging pressure, the vane operation amount should also be limited to an allowable range that is determined from various viewpoints. As described above, the control of a supercharging pressure also has a constraint on a vane operation amount.

Of course, the above-mentioned description is also applied equally to a case where the vane actuator 35e operates the vanes 35d to control a supercharging pressure to the target supercharging pressure when an actual supercharging pressure is higher than the target supercharging pressure.

As described above, the control of a supercharging pressure has a constraint on a supercharging pressure itself that makes the supercharging pressure be in an allowable range, a constraint on the operating state of the vanes 35d that limits the operation of the vanes 35d to an allowable range, a constraint on the operating state of the vane actuator 35e that limits the operation of the vane actuator 35e to an allowable range, and a constraint on an vane operation amount that limits the vane operation amount to an allowable range. Accordingly, when it is expected that these constraints are not satisfied in a case where the target supercharging pressure TPcom determined from the map of FIG. 3(A) is used in the control of a supercharging pressure as it is, the target supercharging pressure TPcom determined from the map of FIG. 3(A) is corrected so that these constraints are satisfied and the corrected target supercharging pressure should be used in the control of a supercharging pressure.

Further, this is also applied equally to the control of an EGR rate. That is, if a deviation TRegr-Regr of actual EGR rate Regr from a target EGR rate TRegr determined from the map of FIG. 3(B) (that is, an EGR rate deviation) is converted into an EGR control valve control signal according to the EGR rate deviation conversion rule as described above and the operating state of the EGR control valve 52 is controlled according to this EGR control valve control signal by the EGR control valve actuator, an EGR rate is finally controlled to the target EGR rate. However, if the target EGR rate TRegr determined from the map of FIG. 3(B) as described above is used in the control of an EGR rate as it is, some inconveniences are caused.

That is, for example, when an actual EGR rate is smaller than the target EGR rate, a signal (that is, an EGR control valve control signal), which allows the EGR control valve actuator to operate the EGR control valve 52 so that the EGR control valve opening is increased according to a deviation of an actual EGR rate from the target EGR rate (that is, an EGR rate deviation) as described above, is generated by the electronic control device 60. Further, this generated EGR control valve control signal is given to the EGR control valve actuator from the electronic control device 60, and the EGR control valve actuator operates the EGR control valve 52 according to the given EGR control valve control signal.

Meanwhile, at this time, in a certain engine operating state including a supercharging pressure and the like, an EGR rate may significantly exceed the target EGR rate while an EGR rate is controlled to the target EGR rate. In particular, when an actual EGR rate is significantly smaller than the target EGR rate, the EGR control valve actuator operates the EGR control valve 52 to a large extent. For this reason, a possibility that an EGR rate may significantly exceed the target EGR rate is further increased. However, it is necessary to prevent the EGR rate from significantly exceeding the target EGR rate as described above. In short, when an EGR rate is controlled to the target supercharging pressure, the EGR rate should be in an allowable range even though the EGR rate exceeds the target EGR rate.

Further, for example, the oxygen concentration in the gas sucked into the combustion chambers should be maintained at a certain predetermined concentration or more in order to avoid the occurrence of an accidental fire in the combustion chambers. Furthermore, the oxygen concentration in the gas sucked into the combustion chambers is changed depending on an EGR rate. Accordingly, when an EGR rate is controlled to a target EGR rate, the EGR rate should be controlled so that the concentration in the gas sucked into the combustion chambers is maintained at a predetermined concentration or more.

As described above, the control of an EGR rate has a constraint on the EGR rate itself that is a parameter to be controlled.

Moreover, an operable range of the EGR control valve 52 has a limit due to the structure thereof. For this reason, if the operating state of the EGR control valve 52 reaches the limit of the operable range of the EGR control valve even though the EGR control valve actuator operates the EGR control valve 52 to increase the EGR control valve opening, the EGR control valve actuator cannot operate the EGR control valve 52 over the limit of the operable range. If the EGR control valve actuator nevertheless operates the GR control valve 52, the failure of the EGR control valve 52 is apt to be caused. Further, the operation of the EGR control valve 52 should be limited to a range, which is narrower than the operable range of the EGR control valve, in order to more reliably avoid the failure of the EGR control valve 52. In short, when an EGR rate is controlled to a target EGR rate, the operation of the EGR control valve 52 should be limited to an allowable range that is determined from various viewpoints. As described above, the control of an EGR rate also has a constraint on the operating state of the EGR control valve 52 that is an object to be controlled.

In addition, an operable range of the EGR control valve actuator also has a limit due to the structure thereof. For this reason, if the EGR control valve actuator reaches the limit of the operable range of the EGR control valve actuator even though the EGR control valve actuator operates the EGR control valve 52 to increase the EGR control valve opening, the EGR control valve actuator cannot operate the EGR control valve 52 over the limit of the operable range. If the EGR control valve actuator nevertheless operates the EGR control valve 52, the failure of the EGR control valve actuator is apt to be caused. Further, the operation of the EGR control valve actuator should be limited to a range, which is narrower than the operable range of the EGR control valve actuator, in order to more reliably avoid the failure of the EGR control valve actuator. In short, when an EGR rate is controlled to a target EGR rate, the operation of the EGR control valve actuator should also be limited to an allowable range that is determined from various viewpoints. As described above, the control of an EGR rate also has a constraint on the operating state of the EGR control valve actuator that is a means for controlling the operation of the EGR control valve 52.

In addition, as the EGR control valve-operation amount (that is, an operation amount to be input to the EGR control valve 52 from the EGR control valve actuator), there is an appropriate operation amount when the performance of the EGR control valve actuator and the performance of the EGR control valve 52 are considered. In short, when an EGR rate is controlled to a target EGR rate, the EGR control valve-operation amount should also be limited to an allowable range that is determined from various viewpoints. As described above, the control of an EGR rate also has a constraint on an EGR control valve-operation amount.

Of course, the above-mentioned description is also applied equally to a case where the EGR control valve actuator operates the EGR control valve 52 to control an EGR rate to the target EGR rate when an actual EGR rate is higher than the target EGR rate.

As described above, the control of an EGR rate has a constraint on the EGR rate itself that makes the EGR rate be in an allowable range, a constraint on the operating state of the EGR control valve 52 that limits the operation of the EGR control valve 52 to an allowable range, a constraint on the operating state of the EGR control valve actuator that limits the operation of the EGR control valve actuator to an allowable range, and a constraint on an EGR control valve-operation amount that limits the EGR control valve-operation amount to an allowable range. Accordingly, when it is expected that these constraints are not satisfied in a case where the target EGR rate TRegr determined from the map of FIG. 3(B) is used in the control of an EGR rate as it is, the target EGR rate TRegr determined from the map of FIG. 3(B) is corrected so that these constraints are satisfied and the corrected target EGR rate should be used in the control of an EGR rate.

In addition, if a vane opening is changed even though an EGR control valve opening is constant, a supercharging pressure is changed. Accordingly, not a little EGR gas amount is changed in this case, so that an EGR rate is changed. That is, the control of a supercharging pressure affects an EGR rate. Meanwhile, if an EGR control valve opening is changed even though a vane opening amount is constant, an EGR gas amount is also changed. Accordingly, a pressure in the intake branch pipe 31 is changed in this case, so that a supercharging pressure is changed. That is, the control of an EGR rate affects a supercharging pressure.

As described above, the control of a supercharging pressure and the control of an EGR rate interfere with each other. Accordingly, when a supercharging pressure is controlled to a target supercharging pressure, a supercharging pressure should be controlled while the constraint on an EGR rate, the constraint on the operating state of the EGR control valve 52, the constraint on the operating state of the EGR control valve actuator, and the constraint condition related with the EGR control valve-operation amount, which have been described above, are satisfied. Meanwhile, when an EGR rate is controlled to a target EGR rate, an EGR rate should be controlled while the constraint on a supercharging pressure, the constraint on the operating state of the vanes 35d, the constraint on the operating state of the vane actuator 35e, and the constraint condition on the vane operation amount, which have been described above, are satisfied. That is, when the control of a supercharging pressure and the control of an EGR rate are performed, a supercharging pressure and an EGR rate should be controlled while the all constraints having been described above are satisfied at the same time.

Meanwhile, in the control device of this embodiment, the target supercharging pressure determined from the map of FIG. 3(A) is corrected and the target EGR rate determined from the map of FIG. 3(B) is corrected so that all of the constraint on a supercharging pressure, the constraint on the operating state of the vanes 35d, the constraint on the operating state of the vane actuator 35e, the constraint on a vane operation amount, the constraint on an EGR rate, the constraint on the operating state of the EGR control valve 52, the constraint on the operating state of the EGR control valve actuator, and the constraint on an EGR control valve-operation amount are satisfied. Then, the corrected target supercharging pressure is used in the control of a supercharging pressure, and the corrected target EGR rate is used in the control of an EGR rate.

More specifically, in the control device of this embodiment, the target supercharging pressure TPcom is determined from the map of FIG. 3(A) based on engine speed N and an engine load L and the target EGR rate TRegr is determined from the map of FIG. 3(B) based on engine speed N and an engine load L. Further, an actual supercharging pressure, the operating state of the vanes 35d, the operating state of the vane actuator 35e, a vane operation amount, an actual EGR rate, the operating state of the EGR control valve 52, the operating state of the EGR control valve actuator, and an EGR control valve-operation amount when the vanes 35d and the EGR control valve 52 will be operated as described above are predicted based on the target supercharging pressure TPcom and the target EGR rate TRegr before the vanes 35d and the EGR control valve 52 are actually operated as described above based on the target supercharging pressure TPcom and the target EGR rate TRegr (hereinafter, this prediction is referred to as "prediction calculation").

Further, it is determined whether or not the predicted supercharging pressure, the predicted operating state of the vanes 35d, the predicted operating state of the vane actuator 35e, the predicted vane operation amount, the predicted actual EGR rate, the predicted operating state of the EGR control valve 52, the predicted operating state of the EGR control valve actuator, and the predicted EGR control valve-operation amount satisfy the constraint on a supercharging pressure, the constraint on the operating state of the vanes 35d, the constraint on the operating state of the vane actuator 35e, the constraint on the vane operation amount, the constraint on an EGR rate, the constraint on the operating state of the EGR control valve 52, the constraint on the operating state of the EGR control valve actuator, and the constraint on an EGR control valve-operation amount.

That is, it is determined whether or not a constraint condition that the predicted supercharging pressure is in an allowable range is satisfied, it is determined whether or not a constraint condition that the predicted operating state of the vanes 35d is in an allowable range is satisfied, it is determined whether or not a constraint condition that the predicted operating state of the vane actuator 35e is in an allowable range is satisfied, it is determined whether or not a constraint condition that the predicted vane operation amount is in an allowable range is satisfied, it is determined whether or not a constraint condition that the predicted EGR rate is in an allowable range is satisfied, it is determined whether or not a constraint condition that the predicted operating state of the EGR control valve 52 is in an allowable range is satisfied, it is determined whether or not a constraint condition that the predicted operating state of the EGR control valve actuator is in an allowable range is satisfied, and it is determined whether or not a constraint condition that the predicted EGR control valve-operation amount is in an allowable range is satisfied.

Further, if the constraint conditions are satisfied, the target supercharging pressure TPcom determined from the map of FIG. 3(A) is set as the target supercharging pressure for the control of a supercharging pressure as it is and the target EGR rate TRegr determined from the map of FIG. 3(B) is set as the target EGR rate for the control of an EGR rate as it is.

Furthermore, the vane actuator 35e operates the vanes 35d according to the vane control signal that is calculated as described above based on the target supercharging pressure set in this way, and the EGR control valve actuator operates the EGR control valve 52 according to the EGR control valve control signal that is calculated as described above based on the target EGR rate set in this way.

Meanwhile, if the constraint conditions are not satisfied, the target supercharging pressure TPcom determined from the map of FIG. 3(A) and the target EGR rate TRegr determined from the map of FIG. 3(B) are corrected according to predetermined rules.

Further, an actual supercharging pressure, the operating state of the vanes 35d, the operating state of the vane actuator 35e, a vane operation amount, an actual EGR rate, the operating state of the EGR control valve 52, the operating state of the EGR control valve actuator, and an EGR control valve-operation amount when the vanes 35d and the EGR control valve 52 will be actually operated are predicted again based on the corrected target supercharging pressure TPcom and the corrected target EGR rate TRegr. Furthermore, it is determined whether or not the supercharging pressure, the operating state of the vanes 35d, the operating state of the vane actuator 35e, the vane operation amount, the actual EGR rate, the operating state of the EGR control valve 52, the operating state of the EGR control valve actuator, and the EGR control valve-operation amount, which have been predicted, satisfy the constraint conditions.

Here, if the constraint conditions are satisfied, the corrected target supercharging pressure is set as the target supercharging pressure for the control of a supercharging pressure, the vane actuator 35e operates the vanes 35d according to the vane control signal calculated as described above based on this set target supercharging pressure, the corrected target EGR rate is set as the target EGR rate for the control of an EGR rate, and the EGR control valve actuator operates the EGR control valve 52 according to the EGR control valve control signal calculated as described above based on this set target EGR rate.

Meanwhile, if the constraint conditions are not satisfied even here, the corrected target supercharging pressure is further corrected according to the predetermined rule and the corrected target EGR rate is further corrected according to the predetermined rule. Further, an actual supercharging pressure, the operating state of the vanes 35d, the operating state of the vane actuator 35e, a vane operation amount, an actual EGR rate, the operating state of the EGR control valve 52, the operating state of the EGR control valve actuator, and an EGR control valve-operation amount when the vanes 35d and the EGR control valve 52 will be actually operated are predicted again based on the further corrected target supercharging pressure and the further corrected target EGR rate. Furthermore, it is determined whether or not the supercharging pressure, the operating state of the vanes 35d, the operating state of the vane actuator 35e, the vane operation amount, the actual EGR rate, the operating state of the EGR control valve 52, the operating state of the EGR control valve actuator, and the EGR control valve-operation amount, which have been predicted, satisfy the constraint conditions.

In the control device of this embodiment, the correction of a target supercharging pressure and an target EGR rate; the prediction of an actual supercharging pressure, the operating state of the vanes 35d, the operating state of the vane actuator 35e, a vane operation amount, an actual EGR rate, the operating state of the EGR control valve 52, the operating state of the EGR control valve actuator, and an EGR control valve-operation amount when the vanes 35d and the EGR control valve 52 will be operated, which is performed based on the corrected target supercharging pressure and the corrected target EGR rate; and the determination of whether or not the supercharging pressure, the operating state of the vanes 35d, the operating state of the vane actuator 35e, the vane operation amount, the actual EGR rate, the operating state of the EGR control valve 52, the operating state of the EGR control valve actuator, and the EGR control valve-operation amount, which have been predicted, satisfy the constraint conditions are repeated until it is determined that the constraint conditions are satisfied.

As described above, according to the control device of this embodiment, a supercharging pressure and an EGR rate are controlled in a state where a constraint condition related with a supercharging pressure, a constraint condition related with an EGR rate, a constraint condition related with the operating state of the vanes, a constraint condition related with the operating state of the EGR control valve, a constraint condition related with a vane operation amount, a constraint condition related with an EGR control valve-operation amount, a constraint condition related with the operating state of the vane actuator, and a constraint condition related with the operating state of the EGR control valve actuator are satisfied. For this reason, a supercharging pressure and an EGR rate are controlled in a state that is suitable for the control of a supercharging pressure, the control of an EGR rate, the control of the operation of the vanes, the control of the operation of the EGR control valve, the determination of a vane operation amount, the determination of an EGR control valve-operation amount, the control of the operation of the vane actuator, and the control of the operation of the EGR control valve actuator.

Further, according to the control device of this embodiment, since a supercharging pressure and an EGR rate are controlled so that the constraint conditions for a vane operation amount and an EGR control valve-operation amount are satisfied, an anti-windup effect is obtained. For this reason, it may be said that the control responsiveness of a supercharging pressure and an EGR rate is better while a supercharging pressure and an EGR rate are controlled to a target supercharging pressure and a target EGR rate, respectively (that is, a transient state).

Furthermore, according to the control device of this embodiment, a supercharging pressure and an EGR rate are controlled in a state where the constraint conditions for the vanes and the EGR control valve and the constraint conditions for the vane actuator and the EGR control valve actuator are satisfied. For this reason, it may be said that the stability and robustness of the control of a supercharging pressure and an EGR rate are high.

Moreover, according to the control device of this embodiment, a supercharging pressure and an EGR rate are controlled while all the above-mentioned constraint conditions are satisfied. Accordingly, while a supercharging pressure and an EGR rate are controlled to a target supercharging pressure and a target EGR rate, respectively, a case where a supercharging pressure exceeds or is lower than a target supercharging pressure to an unallowable extent is prevented, the failure of the vanes 35d is prevented, the failure of the vane actuator 35e is prevented, a case where an EGR rate exceeds or is lower than a target EGR rate to an unallowable extent is prevented, the failure of the EGR control valve 52 is prevented, and the failure of the EGR control valve actuator is prevented. That is, a supercharging pressure and an EGR rate are controlled in a suitable state.

Meanwhile, the above-mentioned idea related with the control of a supercharging pressure and an EGR rate may be applied to not only a case where the control of a supercharging pressure and the control of an EGR rate are performed at the same time but also a case where the control of a plurality of parameters to be controlled in the internal combustion engine 10 is performed at the same time. That is, for example, the amount of air sucked into the combustion chambers (hereinafter, the amount of this air is referred to as "intake air volume") may be controlled by the throttle valve 33 in the internal combustion engine 10, but the above-mentioned idea can also be applied to a case where the control of the intake air volume, the control of a supercharging pressure, and the control of an EGR rate are performed at the same time. Further, for example, if the internal combustion engine 10 includes another EGR device, which introduces exhaust gas to the intake pipe 32 on the upstream of the compressor 35a of the supercharger 35 from the exhaust pipe 42 on the downstream of the exhaust turbine 35b of the supercharger 35, in addition to the EGR device 50 of the above-mentioned embodiment, the above-mentioned idea can also be applied to a case where the control of the amount of the exhaust gas introduced into the intake pipe 32 by this another EGR device and the control of the amount of the exhaust gas introduced into the intake branch pipe 31 by the EGR device 50 of the above-mentioned embodiment are performed at the same time.

Meanwhile, in the above-mentioned embodiment, the vanes and the EGR control valve are objects to be controlled in the internal combustion engine. Furthermore, the idea of the above-mentioned embodiment can also be applied to a case where other objects to be controlled other than the vanes and the EGR control valve (that is, components of the internal combustion engine) are controlled. Accordingly, broadly, it may be said that the above-mentioned embodiment is to control the objects to be controlled, such as the vane and the EGR control valve.

Moreover, in the above-mentioned embodiment, a supercharging pressure and an EGR rate are control amounts to be controlled in the internal combustion engine. Further, the idea of the above-mentioned embodiment can also be applied to a case where other control amounts other than a supercharging pressure and an EGR rate are controlled. Accordingly, broadly, it may be said that the above-mentioned embodiment is to control the control amounts, such as a supercharging pressure and an EGR rate.

Furthermore, in the above-mentioned embodiment, the electronic control device determines a target supercharging pressure and a target EGR rate as an initial target value of a supercharging pressure and an initial target value of an EGR rate from the maps of FIGS. 3(A) and 3(B). Accordingly, it may be said that the electronic control device functions as an initial-target-value determining means.

Moreover, in the above-mentioned embodiment, the electronic control device corrects the target supercharging pressure and the target EGR rate determined from the maps of FIGS. 3(A) and 3(B) and outputs the corrected target supercharging pressure and the corrected target EGR rate as the corrected-target-values of a supercharging pressure and an EGR rate. Accordingly, it may be said that the electronic control device functions as a corrected-target-value outputting means.

Further, in the above-mentioned embodiment, the electronic control device generates the vane control signal that allows the vane actuator to operate the vanes according to the deviation of an actual supercharging pressure from the target supercharging pressure (that is, the supercharging pressure deviation) and generates the EGR control valve control signal that allows the EGR control valve actuator to operate the EGR control valve according to the deviation of an actual EGR rate from the target EGR rate (that is, the EGR rate deviation). Furthermore, the vane actuator and the EGR control valve actuator control the operations of the vanes and the EGR control valve according to the vane control signal and the EGR control valve control signal. That is, the vane actuator and the EGR control valve actuator give operation amounts to the vanes and the EGR control valve according to the vane control signal and the EGR control valve control signal. Accordingly, it may be said that the electronic control device functions as an operation amount determining means that determines operation amounts to be input to the vanes and the EGR control valve according to the target supercharging pressure and the target EGR rate.

Of course, in the above-mentioned embodiment, the electronic control device generates the vane control signal that allows the vane actuator to operate the vanes according to the deviation of an actual supercharging pressure from the target supercharging pressure (that is, the supercharging pressure deviation) and generates the EGR control valve control signal that allows the EGR control valve actuator to operate the EGR control valve according to the deviation of an actual EGR rate from the target EGR rate (that is, the EGR rate deviation). Accordingly, it may be said that the electronic control device functions as a control signal generating means.

Moreover, in the above-mentioned embodiment, the electronic control device performs a control process where a target supercharging pressure is input as a control-target-value for the control of a supercharging pressure, a vane operation amount to be input to the vanes is determined according to the input target supercharging pressure, an target EGR rate is input as a control-target-value for the control of an EGR rate, and an EGR control valve-operation amount to be input to the EGR control valve is determined according to the input target EGR rate. Accordingly, it may be said that the electronic control device functions as a control process performing means for performing the control process.

Further, in the above-mentioned embodiment, the electronic control device determines whether or not the constraint conditions are satisfied when the vane operation amount, which is determined while the target supercharging pressure determined from the map of FIG. 3(A) is used as the target supercharging pressure in the control of an actual supercharging pressure, is input to the vanes and the EGR control valve-operation amount, which is determined while the target EGR rate determined from the map of FIG. 3(B) is used as the target EGR rate in the control of an actual EGR rate, is input to the EGR control valve. Furthermore, in the above-mentioned embodiment, the electronic control device determines whether or not the constraint conditions are satisfied when the vane operation amount, which is determined while the corrected target supercharging pressure is used as the target supercharging pressure in the control of an actual supercharging pressure, is input to the vanes and the EGR control valve-operation amount, which is determined while the corrected target EGR rate is used as the target EGR rate in the control of an actual EGR rate, is input to the EGR control valve. Accordingly, it may be said that the electronic control device functions as a determining means for determining whether or not the constraint conditions are satisfied.

Moreover, in the above-mentioned embodiment, the electronic control device inputs the target supercharging pressure and the target EGR rate to the control process as a target value in the control of an actual supercharging pressure and a target value in the control of an actual EGR rate if it is determined that the constraint conditions are satisfied when a supercharging pressure and an EGR rate are controlled according to the vane operation amount (or the vane control signal) and the EGR control valve-operation amount (or the EGR control valve control signal) determined based on the target supercharging pressure and the target EGR rate determined as initial target values from the maps of FIGS. 3(A) and 3(B).

Accordingly, it may be said that the electronic control device functions as an initial target value input means.

Further, in the above-mentioned embodiment, the electronic control device inputs the corrected target supercharging pressure and the corrected target EGR rate to the control process as a target value in the control of an actual supercharging pressure and a target value in the control of an actual EGR rate if it is determined that the constraint conditions are satisfied based on the corrected target supercharging pressure and the corrected target EGR rate. Accordingly, it may be said that the electronic control device functions as a corrected-target-value input means.

Furthermore, in the above-mentioned embodiment, the vane actuator and the EGR control valve actuator control the operations of the vanes and the EGR control valve, respectively. Accordingly, the vane actuator and the EGR control valve are an operation-controlling means for controlling the operations of the vanes and the EGR control valve, respectively. Moreover, the idea of the above-mentioned embodiment can also be applied to a case where the operations of objects to be controlled are controlled by other actuators other than the vane actuator and the EGR control valve. Accordingly, broadly, it may be said that the above-mentioned embodiment is to control the operations of the objects to be controlled by the operation-controlling means, such as the vane actuator and the EGR control valve actuator.

Further, in the above-mentioned embodiment, the target supercharging pressure and the target EGR rate are corrected so that all of a constraint condition related with a supercharging pressure, a constraint condition related with an EGR rate, a constraint condition related with the operating state of the vanes, a constraint condition related with the operating state of the EGR control valve, a constraint condition related with a vane operation amount, the constraint condition related with an EGR control valve-operation amount, a constraint condition related with the operating state of the vane actuator, and a constraint condition related with the operating state of the EGR control valve actuator are satisfied. Furthermore, the idea of the above-mentioned embodiment can also be applied to a case where components of the internal combustion engine other than the vanes and the EGR control valve are used as objects to be controlled, parameters other than a supercharging pressure and an EGR rate are used as control amounts of the objects to be controlled, and actuators other than the vane actuator and the EGR control valve actuator are used as an operation-controlling means. Accordingly, broadly, it may be said that the above-mentioned embodiment is to correct the target values of control amounts so that all of constraint conditions for control amounts, constraint conditions for the operating states of objects to be controlled, constraint conditions for operation amounts to be input to the objects to be controlled, and constraint conditions for the operating states of the operation-controlling means are satisfied.

Moreover, in the above-mentioned embodiment, the target supercharging pressure and the target EGR rate are corrected so that all the control conditions are satisfied. However, in the above-mentioned embodiment, the target supercharging pressure and the target EGR rate may be corrected so that at least one of the constraint condition related with a supercharging pressure, the constraint condition related with the operating state of the vanes, the constraint condition related with a vane operation amount, and the constraint condition related with the operating state of the vane actuator and at least one of the constraint condition related with an EGR rate, the constraint condition related with the operating state of the EGR control valve, the constraint condition related with an EGR control valve-operation amount, and the constraint condition related with the operating state of the EGR control valve actuator are satisfied. Further, the idea of the above-mentioned embodiment can also be applied to a case where components of the internal combustion engine other than the vanes and the EGR control valve are used as objects to be controlled, parameters other than a supercharging pressure and an EGR rate are used as control amounts of the objects to be controlled, and actuators other than the vane actuator and the EGR control valve actuator are used as an operation-controlling means. Accordingly, broadly, it may be said that the above-mentioned embodiment is to correct a target value of a first control amount and a target value of a second control amount so that at least one of a constraint condition related with a control amount of a first object to be controlled of the internal combustion engine, a constraint condition related with the operating state of the first object to be controlled, a constraint condition related with an operation amount to be input to the first object to be controlled, and a constraint condition related with the operating state of a first operation-controlling means for controlling the operation of the first object to be controlled and at least one of a constraint condition related with a control amount of a second object to be controlled of the internal combustion engine, a constraint condition related with the operating state of the second object to be controlled, a constraint condition related with an operation amount to be input to the second object to be controlled, and a constraint condition related with the operating state of a second operation-controlling means for controlling the operation of the second object to be controlled are satisfied.

Meanwhile, in the above-mentioned embodiment, the constraint condition related with a supercharging pressure is that a supercharging pressure is in an allowable range. However, if there is a constraint condition to be applied to a supercharging pressure other than the constraint condition that a supercharging pressure is in an allowable range when the control of a supercharging pressure, the control of an EGR rate, the control of the operation of the vanes, the control of the operation of the EGR control valve, the determination of a vane operation amount, the determination of an EGR control valve-operation amount, the control of the operation of the vane actuator, and the control of the operation of the EGR control valve actuator (hereinafter, these controls and determinations are referred to as "various controls related with control amounts of the objects to be controlled") are considered, the constraint condition to be applied may be employed instead of or in addition to the constraint condition that a supercharging pressure is in an allowable range.

Likewise, in the above-mentioned embodiment, the constraint condition related with an EGR rate is that an EGR rate is in an allowable range. However, if there is a constraint condition to be applied to an EGR rate other than the constraint condition that an EGR rate is in an allowable range when various controls related with control amounts of the objects to be controlled are considered, the constraint condition to be applied may be employed instead of or in addition to the constraint condition that an EGR rate is in an allowable range.

Likewise, in the above-mentioned embodiment, the constraint condition related with the operating state of the vanes is that the operating state of the vanes is in an allowable range. However, if there is a constraint condition to be applied to the operating state of the vanes other than the constraint condition that the operating state of the vanes is in an allowable range when various controls related with control amounts of the objects to be controlled are considered, the constraint condition to be applied may be employed instead of or in addition to the constraint condition that the operating state of the vanes is in an allowable range. Accordingly, broadly, a constraint condition related with the vanes may be employed in the above-mentioned embodiment.

Likewise, in the above-mentioned embodiment, the constraint condition related with the operating state of the EGR control valve is that the operating state of the EGR control valve is in an allowable range. However, if there is a constraint condition to be applied to the operating state of the EGR control valve other than the constraint condition that the operating state of the EGR control valve is in an allowable range when various controls related with control amounts of the objects to be controlled are considered, the constraint condition to be applied may be employed instead of or in addition to the constraint condition that the operating state of the EGR control valve is in an allowable range. Accordingly, broadly, a constraint condition related with the EGR control valve may be employed in the above-mentioned embodiment.

Moreover, when the target supercharging pressure and the target EGR rate are corrected, the constraint condition related with the operating state of the vanes and the constraint condition related with the operating state of the EGR control valve are considered in the above-mentioned embodiment. However, if there are a constraint on the vanes and a constraint condition related with the EGR control valve that are to be considered other than the constraint condition related with the operating state of the vanes and the constraint condition related with the operating state of the EGR control valve, these constraint conditions may be considered in the above-mentioned embodiment when the target supercharging pressure and the target EGR rate are corrected. Further, the idea of the above-mentioned embodiment can also be applied to a case where components of the internal combustion engine other than the vanes and the EGR control valve are used as objects to be controlled. Accordingly, broadly, it may be said that the above-mentioned embodiment is to correct target values of the control amounts of the first and second objects to be controlled so that a constraint condition related with the first object to be controlled in the internal combustion engine and a constraint condition related with the second object to be controlled in the internal combustion engine are satisfied.

Likewise, in the above-mentioned embodiment, the constraint condition related with the operating state of the vane actuator is that the operating state of the vane actuator is in an allowable range. However, if there is a constraint condition to be applied to the operating state of the vane actuator other than the constraint condition that the operating state of the vane actuator is in an allowable range when various controls related with control amounts of the objects to be controlled are considered, the constraint condition to be applied may be employed instead of or in addition to the constraint condition that the operating state of the vane actuator is in an allowable range. Accordingly, broadly, a constraint condition related with the vane actuator may be employed in the above-mentioned embodiment.

Likewise, in the above-mentioned embodiment, the constraint condition related with the operating state of the EGR control valve actuator is that the operating state of the EGR control valve actuator is in an allowable range. However, if there is a constraint condition to be applied to the operating state of the EGR control valve actuator other than the constraint condition that the operating state of the EGR control valve actuator is in an allowable range when various controls related with control amounts of the objects to be controlled are considered, the constraint condition to be applied may be employed instead of or in addition to the constraint condition that the operating state of the EGR control valve actuator is in an allowable range. Accordingly, broadly, a constraint condition related with the EGR control valve actuator may be employed in the above-mentioned embodiment.

Moreover, when the target supercharging pressure and the target EGR rate are corrected, the constraint condition related with the operating state of the vane actuator and the constraint condition related with the operating state of the EGR control valve actuator are considered in the above-mentioned embodiment. However, if there are a constraint condition related with the vane actuator and a constraint condition related with the EGR control valve actuator that are to be considered other than the constraint on the operating state of the vane actuator and the constraint on the operating state of the EGR control valve actuator, these constraint conditions may be considered in the above-mentioned embodiment when the target supercharging pressure and the target EGR rate are corrected. Further, the idea of the above-mentioned embodiment can also be applied to a case where actuators other than the vane actuator and the EGR control valve actuator are used as an operation-controlling means. Accordingly, broadly, it may be said that the above-mentioned embodiment is to correct target values of the control amounts of the first and second objects to be controlled so that a constraint condition related with a first operation-controlling means for controlling the operation of the first object to be controlled of the internal combustion engine and a constraint condition related with a second operation-controlling means for controlling the operation of the second object to be controlled of the internal combustion engine are satisfied.

Likewise, in the above-mentioned embodiment, the constraint condition related with a vane operation amount is that a vane operation amount is in an allowable range. However, if there is a constraint condition to be applied to a vane operation amount other than the constraint condition that a vane operation amount is in an allowable range when various controls related with control amounts of the objects to be controlled are considered, the constraint condition to be applied may be employed instead of or in addition to the constraint condition that a vane operation amount is in an allowable range.

Likewise, in the above-mentioned embodiment, the constraint condition related with an EGR control valve-operation amount is that an EGR control valve-operation amount is in an allowable range. However, if there is a constraint condition to be applied to an EGR control valve-operation amount other than the constraint condition that an EGR control valve-operation amount is in an allowable range when various controls related with control amounts of the objects to be controlled are considered, the constraint condition to be applied may be employed instead of or in addition to the constraint condition that an EGR control valve-operation amount is in an allowable range.

Further, in the above-mentioned embodiment, the constraint conditions are constraint conditions that are related with a supercharging pressure, an EGR rate, the vanes, the EGR control valve, a vane operation amount, an EGR control valve-operation amount, the vane actuator, and the EGR control valve actuator. However, if there are constraint conditions to be applied other than these constraint conditions, the constraint conditions to be applied may be employed instead of or in addition to the constraint conditions. Accordingly, broadly, constraint conditions for the internal combustion engine may be employed in the above-mentioned embodiment.

Furthermore, in the control device of the above-mentioned embodiment, the corrected target supercharging pressure and the corrected target EGR rate, which are used in the control of an actual supercharging pressure and an actual EGR rate, may be a supercharging pressure and an EGR rate where all the constraint conditions are satisfied when a supercharging pressure and an EGR rate are actually controlled based on at least the target supercharging pressure and the target EGR rate. However, the target supercharging pressure and the target EGR rate determined from the maps of FIGS. 3(A) and 3(B) are values optimal for an engine operating state. Accordingly, there is a possibility that a state where the corrected target supercharging pressure and the corrected target EGR rate used in the control of an actual supercharging pressure and an actual EGR rate are significantly different from the target supercharging pressure and the target EGR rate determined from the maps of FIGS. 3(A) and 3(B) may cause a large variation of output torque (that is, torque shock) or the deterioration of drivability. For this reason, this is not preferable for an engine operating state. Accordingly, if there are a plurality of corrected target supercharging pressure and corrected target EGR rates where all the constraint conditions are satisfied, it is preferable that a target supercharging pressure and a target EGR rate, which are closest to the target supercharging pressure and the target EGR rate determined from the maps of FIGS. 3(A) and 3(B), among these target supercharging pressures and target EGR rates be employed in the control device of the above-mentioned embodiment.

Moreover, in the above-mentioned embodiment, it may also be said that the vanes are a pressure control valve for controlling the degree of increase in the pressure of the air sucked into the combustion chambers. Further, in the above-mentioned embodiment, it may be said that the EGR control valve is an exhaust gas amount control valve for controlling the amount of exhaust gas introduced into an intake passage of the internal combustion engine.

Meanwhile, as described above, in the prediction calculation of the first embodiment, for example, the target supercharging pressure TPcom is determined from the map of FIG. 3(A) based on engine speed N and an engine load L and the target EGR rate TRegr is determined from the map of FIG. 3(B) based on engine speed N and an engine load L. Then, an actual supercharging pressure, the operating state of the vanes 35$d$, the operating state of the vane actuator 35$e$, a vane operation amount, an actual EGR rate, the operating state of the EGR control valve 52, the operating state of the EGR control valve actuator, and an EGR control valve-operation amount when the vanes 35$d$ and the EGR control valve 52 will be operated are predicted based on the target supercharging pressure and the target EGR rate TRegr. That is, when being broadly expressed, a state of the object to be controlled (hereinafter, the state of the object to be controlled is referred to as a "controlled-object-state") is predicted in the prediction calculation of the first embodiment. Further, a controlled-object-state in the future until after a predetermined period from the present time point (hereinafter, this time is referred to as a "prediction length") is predicted as a future controlled-object-state. Furthermore, until a target value of a control amount of an object to be controlled, which allows a predicted future controlled-object-state to become an optimal state, is determined, prediction calculation is performed while the target value of the control amount of the object to be controlled is corrected. Moreover, the target value of the control amount, which allows the predicted future controlled-object-state to become an optimal state, is set as a target value of an actual control amount and the object to be controlled is controlled according to this set target value.

Meanwhile, it is preferable that the future controlled-object-state calculated in the prediction calculation be a controlled-object-state in the future as far as possible. Considering only this, it is preferable that the prediction length in the prediction calculation be as long as possible. However, as the prediction length becomes long, the time required for the calculation of a future controlled-object-state also becomes long. Further, as the time required for the calculation of a future controlled-object-state becomes longer, the time required for the finding of a target value of a control amount, which allows a future controlled-object-state to become an optimal state, also becomes longer. Furthermore, if this time is long, the timing where a target value of a control amount is set is delayed. As a result, the control of an actual object to be controlled is delayed. Moreover, in this case, even though a target value of a control amount, which allows a future controlled-object-state to become an optimal state, is found out and an object to be controlled is controlled according to this target value, there is actually a high possibility that a future controlled-object-state may not become an optimal state. That is, as the prediction length in the prediction calculation, there is a prediction length optimal for the setting of a target value of a control amount that actually allows a future controlled-object-state to become an optimal state. In the first embodiment, this optimal prediction length is set as a limited prediction length in the prediction calculation (hereinafter, this prediction length is referred to as a "set prediction length").

Since a future controlled-object-state in the future after a limited prediction length is predicted (that is, a limited predetermined period) in the prediction calculation of a future controlled-object-state as described above, the following effects are obtained. That is, since a future controlled-object-state is predicted in the future after a limited prediction length in the prediction calculation, the future controlled-object-state to be predicted is limited within a limited time. Accordingly, a calculation load of the electronic control device when prediction calculation is performed is suppressed to a relatively low level. For this reason, it is possible to quickly and accurately predict a future controlled-object-state. That is, even though the future controlled-object-state obtained by the prediction calculation is a future controlled-object-state in the future after a limited prediction length, it is possible to set a target value of a control amount that actually allows a future controlled-object-state to become an optimal state. That is, it is possible to obtain an effect of quickly and accurately predicting a future controlled-object-state, which can set a target value of a control amount actually allowing a future controlled-object-state to become an optimal state, by predicting a future controlled-object-state, which corresponds to a limited prediction length, in the prediction calculation of a future controlled-object-state.

Meanwhile, in the first embodiment, prediction calculation is performed using one model (or one model group formed of a plurality of models) that represents states relating to an object to be controlled (that is, supercharging pressure, the operating state of the vanes 35$d$, the operating state of the vane actuator 35$e$, a vane operation amount, an actual EGR rate, the operating state of the EGR control valve 52, the operating state of the EGR control valve actuator, and an EGR control valve-operation amount).

Meanwhile, the calculation load of the electronic control device (hereinafter, the calculation load of the electronic control device is referred to as a "device-calculation load") caused by prediction calculation is further increased as the prediction length in the prediction calculation becomes longer. Accordingly, the device-calculation load may be exceedingly increased according to a prediction length. Further, if the device-calculation load exceeds a certain predetermined value, for example, the accuracy of the result of the calculation performed by the electronic control device (for example, the accuracy of the calculation result of the prediction calculation) or the accuracy of the control performed by the electronic control device (for example, the accuracy of the control of an object to be controlled) may become lower than allowable accuracy.

Meanwhile, in the first embodiment, the following prediction calculation continuation/end control may be performed during the prediction calculation. A device-calculation load monitor, which detects a device-calculation load, is provided in this embodiment (hereinafter, referred to as a "second embodiment"). Meanwhile, a device-calculation load, which does not allow the accuracy of the result of the calculation performed by the electronic control device or the accuracy of the control performed by the electronic control device to become lower than allowable accuracy, is preset as an allowable calculation load value. Further, in this embodiment, the following prediction calculation continuation/end control is performed during the prediction calculation. That is, when a device-calculation load detected by the device-calculation load monitor (hereinafter, this device-calculation load is referred to as a "device-calculation load detection value") exceeds the allowable calculation load value, the prediction calculation is continued while the set prediction length is shortened by a predetermined period. Meanwhile, when the device-calculation load detection value is equal to or smaller than the allowable calculation load value during the prediction calculation, the prediction calculation is continued while the set prediction length is maintained as it is.

According to this, the following effect is obtained. That is, the set prediction length is to define the predicted range of a future controlled-object-state. Further, in this embodiment, the set prediction length is shortened when a device-calculation load exceeds the allowable calculation load value during the prediction calculation. That is, the predicted range of a future controlled-object-state narrows. For this reason, a device-calculation load is reduced, so that the significant excess of the device-calculation load over the allowable calculation load value is suppressed. Accordingly, according to this embodiment, the accuracy of the prediction calculation performed by the electronic control device is maintained high and the accuracy of calculation other than the prediction calculation performed by the electronic control device or the accuracy of the control performed by the electronic control device is also maintained high.

Meanwhile, in the second embodiment, the set prediction length may be shortened according to the device-calculation load detection value instead of being shortened by a predetermined period when the device-calculation load detection value exceeds the allowable calculation load value during the prediction calculation. That is, in a prediction calculation continuation/end control of this embodiment (hereinafter, referred to as a "third embodiment"), when the device-calculation load detection value exceeds the allowable calculation load value during the prediction calculation, the prediction calculation is continued while the set prediction length is shortened by a longer time as the device-calculation load detection value is larger. Meanwhile, when the device-calculation load detection value is equal to or smaller than the allowable calculation load value during the prediction calculation, the prediction calculation is continued while the set prediction length is maintained as it is.

According to this, as in the second embodiment, the predicted range of a future controlled-object-state narrows when the device-calculation load exceeds the allowable calculation load value during the prediction calculation. For this reason, as in the second embodiment, the significant excess of the device-calculation load over the allowable calculation load value is suppressed. Here, in the third embodiment, the set prediction length is shortened by a longer time as the device-calculation load is larger. That is, as the device-calculation load is increased, the device-calculation load is reduced. For this reason, the significant excess of the device-calculation load over the allowable calculation load value is more reliably suppressed. Accordingly, according to the third embodiment, the accuracy of the prediction calculation performed by the electronic control device is maintained higher and the accuracy of calculation other than the prediction calculation performed by the electronic control device or the accuracy of the control performed by the electronic control device is also more reliably maintained high.

Meanwhile, as described above, in the prediction calculation continuation/end control of the second embodiment, the set prediction length is shortened by a longer time as the device-calculation load detection value is larger when the device-calculation load detection value exceeds the allowable calculation load value during the prediction calculation. Here, it is preferable that the shortened set prediction length be a prediction length that does not allow the device-calculation load to exceed the allowable calculation load value when a future controlled-object-state in the future after the shortened set prediction length is predicted.

Meanwhile, in the second and third embodiments, the prediction calculation may be ended instead of the shortening of the set prediction length when the device-calculation load detection value exceeds the allowable calculation load value during the prediction calculation. That is, in a prediction calculation continuation/end control of this embodiment (hereinafter, referred to as a "fourth embodiment"), the prediction calculation is ended when the device-calculation load exceeds the allowable calculation load value during the prediction calculation. Meanwhile, when the device-calculation load detection value is equal to or smaller than the allowable calculation load value during the prediction calculation, the prediction calculation is continued while a predetermined prediction length is maintained as it is.

According to this, the following effect is obtained. That is, in this embodiment, the prediction calculation is ended when the device-calculation load exceeds the allowable calculation load value during the prediction calculation. For this reason, the device-calculation load is reduced. Accordingly, the reduction of the accuracy of calculation other than the prediction calculation performed by the electronic control device or the accuracy of the control performed by the electronic control device is suppressed.

Meanwhile, in the prediction calculation, a future controlled-object-state in the future after the set prediction length is calculated as described below. That is, first, a future controlled-object-state in the future after a predetermined period is calculated when an object to be controlled is controlled according to a target value of a certain control amount (this predetermined period is a time shorter than the set prediction length) based on the present controlled-object-state. Then, a future controlled-object-state in the future after a further predetermined period is calculated based on the calculated future controlled-object-state. That is, a future controlled-object-state in the future after a further predetermined period is calculated based on a future controlled-object-state that has been just calculated. After that, calculation (that is, the calculation of a future controlled-object-state in the future after a further predetermined period based on a future controlled-object-state that has been just calculated) is repeated until a future controlled-object-state in the future after a set prediction amount is calculated. In this way, a future controlled-object-state in the future after the set prediction length is calculated.

Meanwhile, the set prediction length in the prediction calculation is a prediction length optimal for the setting of a target value of a control amount that actually allows a future controlled-object-state to become an optimal state. Accordingly, a future controlled-object-state, which is obtained in a case where prediction calculation is ended when the device-calculation load detection value exceeds the allowable calculation load value during the prediction calculation, is a future controlled-object-state in the future after a time shorter than the set prediction length (hereinafter, this time is referred to as an "elapsed prediction length"). Accordingly, if the prediction calculation is ended when the elapsed prediction length is short, only a near future controlled-object-state is obtained by the prediction calculation. For this reason, it is impossible to set a target value of an optimal control amount. Accordingly, it is not preferable that the prediction calculation be ended when the elapsed prediction length is short.

Further, in the fourth embodiment, the elapsed prediction length may be used in addition to the device-calculation load when it is determined whether or not the prediction calculation is ended. That is, in this embodiment (hereinafter, referred to as a "fifth embodiment"), an elapsed prediction length where an allowable future controlled-object-state is obtained when the prediction calculation is ended is preset as an allowable prediction length. Further, in a prediction calculation continuation/end control of this embodiment, when the elapsed prediction length is shorter than the allowable prediction length even though the device-calculation load detection value exceeds the allowable calculation load value during the prediction calculation, the prediction calculation is continued while the set prediction length is shortened by a predetermined period (or by a longer time as the device-calculation load detection value is larger). Meanwhile, if the elapsed prediction length is equal to or longer than the allowable prediction length when the device-calculation load detection value exceeds the allowable calculation load value during the prediction calculation, the prediction calculation is ended.

According to this, the following effect is obtained. That is, if the prediction calculation is ended when the predicted range of a future controlled-object-state in the prediction calculation is excessively narrow, there is a case where a sufficient future controlled-object-state is not obtained as a target value setting parameter that is used to set a target value of a control amount of an object to be controlled (hereinafter, this parameter is referred to as a "target value setting parameter"). Accordingly, when the predicted range of a future controlled-object-state in the prediction calculation is excessively narrow, there is a case where the prediction calculation should be continued even though the device-calculation load is larger than the allowable calculation load value. In this embodiment, the prediction calculation is continued even though the device-calculation load exceeds the allowable calculation load value when the elapsed prediction length is shorter than the allowable prediction length and the predicted range of a future controlled-object-state in the prediction calculation is excessively narrow. Accordingly, in this case, a sufficient future controlled-object-state is obtained as a target value setting parameter.

Moreover, in this embodiment, when the prediction calculation is continued although the device-calculation load exceeds the allowable calculation load value, the prediction calculation is continued while the set prediction length is shortened. For this reason, the device-calculation load is reduced. Accordingly, according to this embodiment, the significant excess of the device-calculation load over the allowable calculation load value is suppressed even though the prediction calculation is continued.

Further, in this embodiment, when the device-calculation load exceeds the allowable calculation load during the prediction calculation, the elapsed prediction length is equal to or longer than the allowable prediction length. Further, when a sufficient future controlled-object-state is obtained as a target value setting parameter even though the prediction calculation is ended at that time, the prediction calculation is ended. Accordingly, the device-calculation load is reduced. Therefore, according to this embodiment, the reduction of the accuracy of calculation other than the prediction calculation performed by the electronic control device or the accuracy of the control performed by the electronic control device is suppressed.

Meanwhile, in the prediction calculation continuation/end control of this embodiment, when the device-calculation load detection value is equal to or smaller than the allowable calculation load value during the prediction calculation, the prediction calculation is continued while the set prediction length is maintained as it is regardless of the elapsed prediction length.

Meanwhile, when the device-calculation load is equal to or smaller than the allowable calculation load value, the set prediction length is made long in the range where the device-calculation load is maintained at the allowable calculation load value or less. As a result, even though the device-calculation load is increased, the deterioration of the accuracy of the result of the calculation performed by the electronic control device or the accuracy of the control performed by the electronic control device, which is caused by the increase of the device-calculation load, does not occur. Accordingly, if it is preferable that the set prediction length be made long to obtain a target value of an optimal control amount when the device-calculation load is equal to or smaller than the allowable calculation load value, it is preferable that the set prediction length be made long.

Further, in the second to fifth embodiments, when the device-calculation load detection value is equal to smaller than the allowable calculation load value during the prediction calculation, the set prediction length may be increased by a predetermined period in the range where the device-calculation load is maintained at the allowable calculation load value or less on condition that it is preferable that the set prediction length be made long to obtain a target value of an optimal control amount.

According to this, a more suitable future controlled-object-state is obtained.

Meanwhile, in the second to fourth embodiments, a future device-calculation load may be used instead of the device-calculation load detection value (that is, the present device-calculation load) to determine whether or not the prediction calculation is continued while the set prediction length is shortened or whether or not the prediction calculation is ended. In a prediction calculation continuation/end control of this embodiment (hereinafter, referred to as a "sixth embodiment"), a future device-calculation load is predicted during the prediction calculation based on the device-calculation load detection value. Further, when this predicted future device-calculation load exceeds the allowable calculation load value, the prediction calculation is continued while the set prediction length is shortened by a predetermined period (or a longer time as the predicted future device-calculation load is larger) or the prediction calculation is ended. Meanwhile, when the predicted future device-calculation load is equal to or smaller than the allowable calculation load value, the prediction calculation is continued while the set prediction length is maintained as it is.

According to this, the following effect is obtained. That is, when it is predicted that a future device-calculation load will exceeds the allowable calculation load value, the prediction calculation is continued while the set prediction length is shortened or the prediction calculation is ended. For this reason, when the prediction calculation is continued while the set prediction length is shortened, the present device-calculation load is reduced. Accordingly, the accuracy of the prediction calculation performed by the electronic control device is maintained high and the accuracy of calculation other than the prediction calculation performed by the electronic control device or the accuracy of the control performed by the electronic control device is also maintained high. Further, since the present device-calculation load is significantly reduced when the prediction calculation is ended, the accuracy of calculation other than the prediction calculation performed by the electronic control device or the accuracy of the control performed by the electronic control device is maintained high. Meanwhile, in this embodiment, when it is predicted that a future device-calculation load will be equal to or smaller than the allowable calculation load value, the prediction calculation is continued while the set prediction length is maintained as it is. Accordingly, in this case, an intended future controlled-object-state is obtained as a target value setting parameter at the time of the end of the prediction calculation.

Further, in the fifth embodiment, a future device-calculation load may be used instead of the device-calculation load detection value to determine whether or not the prediction calculation is continued while the set prediction length is shortened or whether or not the prediction calculation is ended. In a prediction calculation continuation/end control of this embodiment (hereinafter, referred to as a "seventh embodiment"), a future device-calculation load is predicted during the prediction calculation based on the device-calculation load detection value. Further, if the elapsed prediction length is equal to or longer than the allowable prediction length when this predicted future device-calculation load exceeds the allowable calculation load value, the prediction calculation is ended. Meanwhile, when the elapsed prediction length is shorter than the allowable prediction length even though the predicted future device-calculation load exceeds the allowable calculation load value, the prediction calculation is continued while the set prediction length is shortened by a predetermined period (or by a longer time as the predicted future device-calculation load is larger).

According to this, the same effect as the effect obtained from the fifth and sixth embodiments is obtained.

Meanwhile, in the prediction calculation continuation/end control of this embodiment, when the predicted future device-calculation load is equal to or larger than the allowable calculation load value during the prediction calculation, the prediction calculation is continued while the set scheduled amount is maintained as it is, regardless of the elapsed prediction length.

Meanwhile, when an engine load (that is, a load of the internal combustion engine) is high, for example, the number of times of combustion per unit time is large. For this reason, the number of times of calculation for the determination of a target amount of injected fuel or the like is also increased, so that the device-calculation load is high. That is, the device-calculation load tends to become high when an engine load is large. That is, it is possible to estimate that the device-calculation load is high if an engine load is high.

Furthermore, in the second to fourth embodiments and the sixth embodiment, the present engine load may be used instead of the device-calculation load detection value or a future device-calculation load to determine whether or not the prediction calculation is continued while the set prediction length is shortened or whether or not the prediction calculation is ended. In this embodiment (hereinafter, referred to as an "eighth embodiment"), an engine load where the device-calculation load becomes the allowable calculation load value is preset as an allowable engine load value. Moreover, in a prediction calculation continuation/end control of this embodiment, when the present engine load exceeds the allowable engine load value (that is, when it is estimated that the present device-calculation load exceeds the allowable calculation load value) during the prediction calculation, the prediction calculation is continued while the set prediction length is shortened by a predetermined period (or by a longer time as the present engine load is higher) or the prediction calculation is ended. Meanwhile, when the present engine load is equal to or smaller than the allowable engine load value during the prediction calculation, the prediction calculation is continued while the set prediction length is maintained as it is.

According to this, since it is possible to perform the prediction calculation continuation/end control using the present engine load without using the device-calculation load detection value, it is not necessary to use the calculation load monitor that is used to detect a device-calculation load. Further, in this embodiment, the present engine load is a parameter representing the present device-calculation load. Accordingly, according to this embodiment, the same effect as the effect obtained from the second to fourth embodiments is also obtained.

Furthermore, in the fifth and seventh embodiments, the present engine load may be used instead of the device-calculation load detection value or a future device-calculation load to determine whether or not the prediction calculation is continued while the set prediction length is shortened or whether or not the prediction calculation is ended. In a prediction calculation continuation/end control of this embodiment (hereinafter, referred to as a "ninth embodiment"), the prediction calculation is ended if the elapsed prediction length is equal to or longer than the allowable prediction length when the present engine load exceeds the allowable engine load value (that is, when it is estimated that the present device-calculation load exceeds the allowable calculation load value) during the prediction calculation. Meanwhile, when the elapsed prediction length is shorter than the allowable prediction length even though the present engine load exceeds the allowable engine load value during the prediction calculation, the prediction calculation is continued while the set prediction length is shortened by a predetermined period (or by a longer time as the present engine load is higher).

According to this, since it is possible to perform the prediction calculation continuation/end control using the present engine load without using the device-calculation load detection value, it is not necessary to use the calculation load monitor that is used to detect a device-calculation load. Further, in this embodiment, the present engine load is a parameter representing the present device-calculation load. Accordingly, according to this embodiment, the same effect as the effect obtained from the fourth embodiment is also obtained.

Meanwhile, in the prediction calculation continuation/end control of this embodiment, when the present engine load is equal to or smaller than the allowable engine load value during the prediction calculation, the prediction calculation is continued while the set prediction length is maintained as it is, regardless of the elapsed prediction length.

Meanwhile, in the eighth embodiment, a future engine load may be used instead of the present engine load to determine whether or not the prediction calculation is continued while the set prediction length is shortened or whether or not the prediction calculation is ended. In this embodiment (hereinafter, referred to as a "tenth embodiment"), a future engine load is predicted during the prediction calculation. Further, in a prediction calculation continuation/end control of this embodiment, when the predicted future engine load exceeds an allowable engine load (that is, when it is estimated that a future device-calculation load exceeds the allowable calculation load value), the prediction calculation is continued while the set prediction length is shortened by a predetermined period (or by a longer time as the predicted future engine load is higher) or the prediction calculation is ended. Meanwhile, when the predicted future engine load is equal to or smaller than the allowable engine load during the prediction calculation, the prediction calculation is continued while the set prediction length is maintained as it is.

According to this, since it is possible to perform the prediction calculation continuation/end control using a future engine load without using the device-calculation load detection value, it is not necessary to use the calculation load monitor that is used to detect a device-calculation load. Further, in this embodiment, a future engine load is a parameter representing a future device-calculation load. Accordingly, according to this embodiment, the same effect as the effect obtained from the sixth embodiment is also obtained.

Meanwhile, a future engine load may be predicted based on the present engine load, and may be predicted based on other parameters related with the internal combustion engine.

Meanwhile, in the ninth embodiment, a future engine load may be used instead of the present engine load to determine whether or not the prediction calculation is continued while the set prediction length is shortened or whether or not the prediction calculation is ended. In this embodiment (hereinafter, referred to as a "tenth embodiment"), a future engine load is predicted during the prediction calculation. In this embodiment (hereinafter, referred to as an "eleventh embodiment"), a future engine load is predicted during the prediction calculation. Further, in a prediction calculation continuation/end control of this embodiment, the prediction calculation is ended if the elapsed prediction length is equal to longer than the allowable prediction length when the predicted future engine load exceeds the allowable engine load value (that is, when it is estimated that a future device-calculation load exceeds the allowable calculation load value). Meanwhile, when the elapsed prediction length is shorter than the allowable prediction length even though a future engine load exceeds the allowable engine load value during the prediction calculation, the prediction calculation is continued while the set prediction length is shortened by a predetermined period (or by a longer time as the predicted future engine load is higher).

According to this, the same effect as the effect obtained from the fifth and tenth embodiments is obtained.

Meanwhile, in the prediction calculation continuation/end control of this embodiment, when a future engine load is equal to or smaller than the allowable engine load during the prediction calculation, the prediction calculation is continued while the set prediction length is maintained as it is, regardless of the elapsed prediction length.

Accordingly, considering the second to fourth embodiments, the sixth embodiment, the eighth embodiment, and the tenth embodiment, broadly, it may be said that the present invention is to continue the prediction calculation while shortening the set prediction length or is to end the prediction calculation when the present device-calculation load exceeds the allowable calculation load value (or when it is estimated that the present device-calculation load exceeds the allowable calculation load value, or when it is predicted that a future device-calculation load will exceed the allowable calculation load value) during the prediction calculation and is to continue the prediction calculation while maintaining the set prediction length as it is when the present device-calculation load is equal to smaller than the allowable calculation load value (or when the present device-calculation load is equal to or smaller than the allowable calculation load value, or when a future device-calculation load is equal to or smaller than the allowable calculation load value) during the prediction calculation.

Likewise, considering the fifth, seventh, ninth, and eleventh embodiments, broadly, it may be said that the present invention is to end the prediction calculation if the elapsed prediction length is equal to or longer than the allowable prediction length when the present device-calculation load exceeds the allowable calculation load value (or when it is estimated that the present device-calculation load exceeds the allowable calculation load value, or when it is predicted that a future device-calculation load will exceed the allowable calculation load value) during the prediction calculation, is to continue the prediction calculation while shortening the set prediction length when the elapsed prediction length is shorter than the allowable prediction length even though the present device-calculation load exceeds the allowable calculation load value (or even though it is estimated that the present device-calculation load exceeds the allowable calculation load value, or even though it is predicted that a future device-calculation load will exceed the allowable calculation load value) during the prediction calculation, and is to continue the prediction calculation while maintaining the set prediction length as it is when the present device-calculation load is equal to smaller than the allowable calculation load value (or when the present device-calculation load is equal to or smaller than the allowable calculation load value, or when a future device-calculation load is equal to or smaller than the allowable calculation load value) during the prediction calculation.

Meanwhile, when the term of a "device-calculation load" is used in this specification, the present device-calculation load, a future device-calculation load, the estimated values of the present device-calculation load, and the estimated value of a future device-calculation load are included in this "device-calculation load".

Meanwhile, in the prediction calculation of the second embodiment, a different model may be used for each controlled-object-state instead of one model. In this embodiment (hereinafter, referred to as a "twelfth embodiment"), an optimal model is prepared in advance for each of the states of the internal combustion engine that include controlled-object-states. Further, an optimal model is selected according to the state of the internal combustion engine, and the prediction calculation is performed using the selected model. According to this, an optimal model is selected at the start time point of prediction calculation according to the state of the internal combustion engine corresponding to that time point and the prediction calculation is started using the selected model. Further, even when the state of the internal combustion engine is changed during one time of the prediction calculation (hereinafter, this time is referred to as "the time of the change of an engine state"), an optimal model is newly selected according to the state of the internal combustion engine corresponding to that time point (hereinafter, this state is referred to as "the changed engine state") and the prediction calculation is continued using the selected model.

As described above, in the twelfth embodiment, calculation for newly selecting an optimal model (hereinafter, this calculation is referred to as "model selecting calculation") is performed at the time of the change of an engine state according to the changed controlled-object-state. Further, the device-calculation load is increase by this model selecting calculation, so that the device-calculation load may exceed the allowable calculation load value. Meanwhile, if an elapsed prediction length corresponding to the time of the change of an engine state is equal to or longer than the allowable prediction length, an allowable future controlled-object-state is obtained even though the prediction calculation is ended at that time.

Meanwhile, in the twelfth embodiment, the prediction calculation may be ended at the time of the change of an engine state (that is, the time where the model selecting calculation is performed) according to an elapsed prediction length corresponding to that time point. In a prediction calculation continuation/end control of this embodiment (hereinafter, referred to as a "twelfth embodiment"), when an elapsed prediction length corresponding to the time of the change of an engine state is equal to or longer than the allowable prediction length at the time of the change of an engine state, the prediction calculation is ended regardless of the device-calculation load detection value (in this case, the model selecting calculation is not performed). Meanwhile, when an elapsed prediction length corresponding to the time of the change of an engine state is shorter than the allowable prediction length at the time of the change of an engine state, the prediction calculation is continued (in this case, the model selecting calculation is performed).

According to this, the following effect is obtained. That is, when the prediction calculation is continued at the time of the change of an engine state, the model selecting calculation is performed. Further, a calculation load of this model selecting calculation is relatively high. Accordingly, when the model selecting calculation is performed, a device-calculation load is increased with a relatively great amount. Accordingly, in order to suppress the relatively great increase of the device-calculation load, the prediction calculation should be ended if a sufficient future controlled-object-state is obtained as a target value setting parameter even though the prediction calculation is ended. Here, in this embodiment, an elapsed prediction length corresponding to the time of the change of an engine state is equal to or longer than the allowable prediction length at the time of the change of an engine state. Accordingly, when a sufficient future controlled-object-state is obtained as a target value setting parameter even though the prediction calculation is ended, prediction control is ended. Therefore, the relatively great increase of a device-calculation load is suppressed.

Meanwhile, in the prediction calculation continuation/end control of this embodiment, one of the prediction calculation continuation/end controls of the second to eleventh embodiments is performed while a controlled-object-state is not changed during the prediction calculation.

Further, the prediction calculation is continued in the prediction calculation continuation/end control of this embodiment. As a result, when the model selecting calculation is performed, one of the prediction calculation continuation/end controls of the second to eleventh embodiments may be performed and the model selecting calculation may be continued regardless of the present device-calculation load detection value (or an elapsed prediction length at that time point, a future device-calculation load, the present engine load, or a future engine load).

Meanwhile, in the twelfth embodiment, the device-calculation load detection value may be used in addition to the elapsed prediction length as described below when it is determined whether or not the prediction calculation is ended at the time of the change of an engine state. In this embodiment (hereinafter, referred to as a "thirteenth embodiment), a device-calculation load where the device-calculation load does not exceed allowable calculation load value is preset as a safe calculation load value even though the model selecting calculation is performed at the time of the change of an engine state. Further, in a prediction calculation continuation/end control of this embodiment, if the device-calculation load detection value is equal to or smaller than the safe calculation load value when an elapsed prediction length corresponding to the time of the change of an engine state is shorter than the allowable prediction length at the time of the change of an engine state, the prediction calculation is continued while the set prediction length is maintained as it is (in this case, the model selecting calculation is performed). Meanwhile, if the device-calculation load detection value is larger than the safe calculation load value when an elapsed prediction length corresponding to the time of the change of an engine state is shorter than the allowable prediction length at the time of the change of an engine state, the prediction calculation is ended (in this case, the model selecting calculation is not performed). Of course, when an elapsed prediction length corresponding to the time of the change of an engine state is equal to or longer than the allowable prediction length at the time of the change of an engine state, the prediction calculation is ended regardless of the device-calculation load detection value (in this case, the model selecting calculation is not performed).

According to this, the following effect is obtained. That is, as described with reference to the twelfth embodiment, in order to suppress the relatively great increase of the device-calculation load, the prediction calculation should be ended if a sufficient future controlled-object-state is obtained as a target value setting parameter even though the prediction calculation is ended. However, when a possibility that the device-calculation load may exceed the allowable calculation load value is low even though the prediction calculation is continued at the time of the change of an engine state and the model selecting calculation is performed, the prediction calculation should be continued to obtain a sufficient future controlled-object-state. Here, in this embodiment, the device-calculation load is equal to or smaller than the safe calculation load value when an elapsed prediction length corresponding to the time of the change of an engine state is shorter than the allowable prediction length at the time of the change of an engine state, and the prediction calculation is continued when a possibility that the device-calculation load may exceed the allowable calculation load value is low even though the model selecting calculation is performed. Accordingly, after that, when the prediction calculation is ended, a more sufficient future controlled-object-state is obtained as a parameter that is used to set a target value of a control amount of an object to be controlled. Meanwhile, in this embodiment, the device-calculation load is larger than the safe calculation load value when an elapsed prediction length corresponding to the time of the change of an engine state is shorter than the allowable prediction length at the time of the change of an engine state, and the prediction calculation is ended if a possibility that the device-calculation load may exceed the allowable calculation load value is high when the model selecting calculation is performed. Accordingly, the excess of the device-calculation load over the allowable calculation load value is suppressed.

Meanwhile, the prediction calculation is continued in the prediction calculation continuation/end control of this embodiment. As a result, while the model selecting calculation is performed, one of the prediction calculation continuation/end controls of the second to eleventh embodiments is performed or the model selecting calculation is continued regardless of the present device-calculation load detection value (or an elapsed prediction length at that time point, a future device-calculation load, the present engine load, or a future engine load).

Further, in the prediction calculation continuation/end control of this embodiment, one of the prediction calculation continuation/end controls of the second to eleventh embodiments is performed while a controlled-object-state is not changed during the prediction calculation.

Meanwhile, in the twelfth embodiment, the device-calculation load detection value may be used in addition to the elapsed prediction length as described below when it is determined whether or not the prediction calculation is ended at the time of the change of an engine state. In this embodiment (hereinafter, referred to as a "fourteenth embodiment"), a safe calculation load value is preset as in the thirteenth embodiment. Further, in a prediction calculation continuation/end control of this embodiment, if the device-calculation load detection value is larger than the safe calculation detection value when an elapsed prediction length corresponding to the time of the change of an engine state is shorter than the allowable prediction length at the time of the change of an engine state, the prediction calculation is continued while the set prediction length is shortened by a predetermined period (or by a longer time as the device-calculation load detection value is larger) (in this case, the model selecting calculation is performed). Meanwhile, if the device-calculation load detection value is equal to or smaller than the safe calculation load value when an elapsed prediction length corresponding to the time of the change of an engine state is shorter than the allowable prediction length at the time of the change of an engine state, the prediction calculation is continued while the set prediction length is maintained as it is (in this case, the model selecting calculation is performed). Of course, when an elapsed prediction length corresponding to the time of the change of an engine state is equal to or longer than the allowable prediction length at the time of the change of an engine state, the prediction calculation is ended regardless of the device-calculation load detection value (in this case, the model selecting calculation is not performed).

According to this, the following effect is obtained. That is, in this embodiment, if the device-calculation load is larger than the safe calculation load value when an elapsed prediction length corresponding to the time of the change of an engine state is shorter than the allowable prediction length at the time of the change of an engine state, the prediction calculation is continued while the set prediction length is shortened. Since the set prediction length is shortened as described above, the device-calculation load is reduced. Accordingly, even though the prediction calculation is continued and the model selecting calculation is performed, a possibility that the device-calculation load may exceed the allowable calculation load value is reduced. Further, since the prediction calculation is continued, a further future controlled-object-state is obtained by the prediction calculation. Accordingly, according to this embodiment, a more sufficient future controlled-object-state is obtained as a parameter that is used to set a target value of a control amount of an object to be controlled. Furthermore, in this embodiment, as in the thirteenth embodiment, the device-calculation load is equal to or smaller than the safe calculation load value when an elapsed prediction length corresponding to the time of the change of an engine state is shorter than the allowable prediction length at the time of the change of an engine state, and the prediction calculation is continued when a possibility that the device-calculation load may exceed the allowable calculation load value is low even though the model selecting calculation is performed. Accordingly, according to this embodiment, as in the thirteenth embodiment, a more sufficient future controlled-object-state is obtained as a parameter that is used to set a target value of a control amount of an object to be controlled, when the prediction calculation is ended.

Meanwhile, the prediction calculation is continued in the prediction calculation continuation/end control of this embodiment. As a result, while the model selecting calculation is performed, one of the prediction calculation continuation/end controls of the second to eleventh embodiments is performed or the model selecting calculation is continued regardless of the present device-calculation load detection value (or an elapsed prediction length at that time point, a future device-calculation load, the present engine load, or a future engine load).

Further, in the prediction calculation continuation/end control of this embodiment, one of the prediction calculation continuation/end controls of the second to eleventh embodiments is performed while a controlled-object-state is not changed during the prediction calculation.

Meanwhile, in the thirteenth embodiment, only the device-calculation load detection value may be used without the use of the elapsed prediction length when it is determined whether or not the prediction calculation is ended at the time of the change of an engine state. In a prediction calculation continuation/end control of this embodiment (hereinafter, referred to as a "fifteenth embodiment"), the prediction calculation is ended when the device-calculation load detection value is larger than the safe calculation load value at the time of the change of an engine state (in this case, the model selecting calculation is not performed). Meanwhile, when the device-calculation load detection value is smaller than the safe calculation load value at the time of the change of an engine state, the prediction calculation is continued while the set prediction length is maintained as it is (in this case, the model selecting calculation is performed).

According to this, the following effect is obtained. That is, as described with reference to the twelfth embodiment, the device-calculation load is increased with a relatively great amount when the prediction calculation is continued at the time of the change of an engine state and the model selecting calculation is performed. Further, in this case, the device-calculation load may exceed the allowable calculation load value. Accordingly, there is a case where the prediction calculation should be ended at the time of the change of an engine state in order to reliably suppress the excess of the device-calculation load over the allowable calculation load value. Here, in this embodiment, the device-calculation load is larger than the safe calculation load value at the time of the change of an engine state, and the prediction calculation is ended when a possibility that the device-calculation load may exceed the allowable calculation load value is high if the model selecting calculation is performed. Accordingly, according to this embodiment, the excess of the device-calculation load over the allowable calculation load value is suppressed at the time of the change of an engine state. Meanwhile, in this embodiment, the device-calculation load is equal to or smaller than the safe calculation load value at the time of the change of an engine state, and the prediction calculation is continued while the set prediction length is maintained as it is when a possibility that the device-calculation load may exceed the allowable calculation load value is low even though the model selecting calculation is performed. Accordingly, according to this embodiment, a sufficient future controlled-object-state is obtained as a target value setting parameter at the time of the end of the prediction calculation.

Meanwhile, in the prediction calculation continuation/end control of this embodiment, one of the prediction calculation continuation/end controls of the second to eleventh embodiments is performed while a controlled-object-state is not changed during the prediction calculation.

Meanwhile, in the fourteenth embodiment, only the device-calculation load detection value may be used without the use of the elapsed prediction length when it is determined whether or not the prediction calculation is ended at the time of the change of an engine state. In a prediction calculation continuation/end control of this embodiment (hereinafter, referred to as a "sixteenth embodiment"), the prediction calculation is continued while the set prediction length is shortened by a predetermined period (or by a longer time as the device-calculation load detection value is larger) when the device-calculation load detection value is larger than the safe calculation load value at the time of the change of an engine state (in this case, the model selecting calculation is performed). Meanwhile, when the device-calculation load detection value is smaller than the safe calculation load value at the time of the change of an engine state, the prediction calculation is continued while the set prediction length is maintained as it is (in this case, the model selecting calculation is performed).

According to this, the following effect is obtained. That is, as described with reference to the fifteenth embodiment, the device-calculation load may exceed the allowable calculation load value when the prediction calculation is continued at the time of the change of an engine state and the model selecting calculation is performed. Accordingly, there is a case where the device-calculation load should be reduced at the time of the change of an engine state in order to reliably suppress the excess of the device-calculation load over the allowable calculation load. Here, in this embodiment, the device-calculation load is larger than the safe calculation load value at the time of the change of an engine state, and the prediction calculation is continued while the set prediction length is shortened when a possibility that the device-calculation load may exceed the allowable calculation load value is high if the model selecting calculation is performed. According to this, the device-calculation load is reduced. Accordingly, according to this embodiment, the excess of the device-calculation load over the allowable calculation load is reliably suppressed at the time of the change of an engine state. Meanwhile, in this embodiment, the device-calculation load is equal to or smaller than the safe calculation load value at the time of the change of an engine state, and the prediction calculation is continued while the set prediction length is maintained as it is when a possibility that the device-calculation load may exceed the allowable calculation load is low even though the model selecting calculation is performed. Accordingly, according to this embodiment, a sufficient future controlled-object-state is obtained as a target value setting parameter at the time of the end of the prediction calculation.

Meanwhile, the prediction calculation is continued in the prediction calculation continuation/end control of this embodiment. As a result, while the model selecting calculation is performed, one of the prediction calculation continuation/end controls of the second to eleventh embodiments is performed or the model selecting calculation is continued regardless of the present device-calculation load detection value (or an elapsed prediction length at that time point, a future device-calculation load, the present engine load, or a future engine load).

Further, in the prediction calculation continuation/end control of this embodiment, one of the prediction calculation continuation/end controls of the second to eleventh embodiments is performed while a controlled-object-state is not changed during the prediction calculation.

Meanwhile, in the thirteenth embodiment, a future device-calculation load may be used instead of the device-calculation load detection value (that is, the present device-calculation load) when it is determined whether or not the prediction calculation is ended at the time of the change of an engine state. In this embodiment (hereinafter, referred to as a "seventeenth embodiment"), a future device-calculation load is predicted during the prediction calculation based on the device-calculation load detection value. Further, in a prediction calculation continuation/end control of this embodiment, the prediction calculation is ended when the predicted future device-calculation load is larger than the safe calculation load value even though an elapsed prediction length corresponding to the time of the change of an engine state is shorter than the allowable prediction length at the time of the change of an engine state (in this case, the model selecting calculation is not performed). Meanwhile, if the predicted future device-calculation load is equal to or smaller than the safe calculation load value when an elapsed prediction length corresponding to the time of the change of an engine state is shorter than the allowable prediction length at the time of the change of an engine state, the prediction calculation is continued while the set prediction length is maintained as it is (in this case, the model selecting calculation is performed). Of course, when an elapsed prediction length corresponding to the time of the change of an engine state is equal to or longer than the allowable prediction length at the time of the change of an engine state, the prediction calculation is ended regardless of the predicted future device-calculation load detection value (in this case, the model selecting calculation is not performed).

According to this, the following effect is obtained. That is, when the prediction calculation is continued at the time of the change of an engine state and the model selecting calculation is performed, the device-calculation load is increased with a relatively great amount. Accordingly, there is a case where the prediction calculation should be ended at the time of the change of an engine state in order to reliably suppress the excess of the device-calculation load over the allowable calculation load in the future. Here, in this embodiment, a future device-calculation load is larger than the safe calculation load value even though an elapsed prediction length corresponding to the time of the change of an engine state is shorter than the allowable prediction length at the time of the change of an engine state. Accordingly, when a possibility that the device-calculation load may exceed the allowable calculation load value in the future is high if the model selecting calculation is performed, the prediction calculation is ended. Therefore, the excess of the device-calculation load over the allowable calculation load is reliably suppressed in this case. Meanwhile, in this embodiment, a future device-calculation load is equal to or smaller than the safe calculation load value when an elapsed prediction length corresponding to the time of the change of an engine state is shorter than the allowable prediction length at the time of the change of an engine state. Accordingly, when a possibility that the device-calculation load may exceed the allowable calculation load value in the future is low even though the model selecting calculation is performed, the prediction calculation is continued. Therefore, in this case, a sufficient future controlled-object-state is obtained as a target value setting parameter at the time of the end of the prediction calculation. Further, in this embodiment, an elapsed prediction length corresponding to the time of the change of an engine state is equal to or longer than the allowable prediction length at the time of the change of an engine state, and the prediction calculation is ended when a sufficient future controlled-object-state is obtained even though the prediction calculation is ended at that time point. Accordingly, in this case, a sufficient future controlled-object-state is obtained and the excess of the device-calculation load over the allowable calculation load value is suppressed.

Meanwhile, the prediction calculation is continued in the prediction calculation continuation/end control of this embodiment. As a result, while the model selecting calculation is performed, one of the prediction calculation continuation/end controls of the second to eleventh embodiments is performed or the model selecting calculation is continued regardless of the present device-calculation load detection value (or an elapsed prediction length at that time point, a future device-calculation load, the present engine load, or a future engine load).

Further, in the prediction calculation continuation/end control of this embodiment, one of the prediction calculation continuation/end controls of the second to eleventh embodiments is performed while a controlled-object-state is not changed during the prediction calculation.

Meanwhile, in the fourteenth embodiment, a future device-calculation load may be used instead of the device-calculation load detection value (that is, the present device-calculation load) when it is determined whether or not the prediction calculation is ended at the time of the change of an engine state. In this embodiment (hereinafter, referred to as an "eighteenth embodiment"), a future device-calculation load is predicted as in the fourteenth embodiment. Further, in a prediction calculation continuation/end control of this embodiment, if the predicted future device-calculation load is larger than the safe calculation detection value when an elapsed prediction length corresponding to the time of the change of an engine state is shorter than the allowable prediction length at the time of the change of an engine state, the prediction calculation is continued while the set prediction length is shortened by a predetermined period (or by a longer time as the predicted future device-calculation load is larger) (in this case, the model selecting calculation is performed). Meanwhile, if the predicted future device-calculation load is equal to or smaller than the safe calculation load value when an elapsed prediction length corresponding to the time of the change of an engine state is shorter than the allowable prediction length at the time of the change of an engine state, the prediction calculation is continued while the set prediction length is maintained as it is (in this case, the model selecting calculation is performed). Of course, when an elapsed prediction length corresponding to the time of the change of an engine state is equal to or longer than the allowable prediction length at the time of the change of an engine state, the prediction calculation is ended regardless of the predicted future device-calculation load (in this case, the model selecting calculation is not performed).

According to this, the following effect is obtained. That is, in this embodiment, a future device-calculation load is larger than the safe calculation load value when an elapsed prediction length corresponding to the time of the change of an engine state is shorter than the allowable prediction length at the time of the change of an engine state. Accordingly, when a possibility that the device-calculation load may exceed the allowable calculation load value in the future is high if the model selecting calculation is performed, the prediction calculation is continued while the set scheduled length is shortened. Therefore, since the set scheduled length is shortened in this case, the excess of the device-calculation load over the allowable calculation load value is suppressed in the future. Moreover, since the prediction calculation is continued, a sufficient future controlled-object-state is obtained as a target value setting parameter at the time of the end of the prediction calculation. Meanwhile, a future device-calculation load is equal to or smaller than the safe calculation load value when an elapsed prediction length corresponding to the time of the change of an engine state is shorter than the allowable prediction length at the time of the change of an engine state. Accordingly, when a possibility that the device-calculation load may exceed the allowable calculation load value in the future is low even though the model selecting calculation is performed, the prediction calculation is continued while the set scheduled length is maintained as it is. Therefore, since the prediction calculation is continued while the set scheduled length is relative long in this case, a more sufficient future controlled-object-state is obtained as a target value setting parameter at the time of the end of the prediction calculation. Moreover, in this embodiment, an elapsed prediction length corresponding to the time of the change of an engine state is equal to or longer than the allowable prediction length at the time of the change of an engine state. Accordingly, when a sufficient future controlled-object-state is obtained as a target value setting parameter even though the prediction calculation is ended at that time point, the prediction calculation is ended. Therefore, in this case, a sufficient future controlled-object-state is obtained as a target value setting parameter and the excess of the device-calculation load over the allowable calculation load is suppressed.

Meanwhile, the prediction calculation is continued in the prediction calculation continuation/end control of this embodiment. As a result, while the model selecting calculation is performed, one of the prediction calculation continuation/end controls of the second to eleventh embodiments is performed or the model selecting calculation is continued regardless of the present device-calculation load detection value (or an elapsed prediction length at that time point, a future device-calculation load, the present engine load, or a future engine load).

Further, in the prediction calculation continuation/end control of this embodiment, one of the prediction calculation continuation/end controls of the second to eleventh embodiments is performed while a controlled-object-state is not changed during the prediction calculation.

Meanwhile, in the thirteenth embodiment, an engine load may be used instead of the device-calculation load detection value as described below when it is determined whether or not the prediction calculation is ended at the time of the change of an engine state. In this embodiment (hereinafter, referred to as a "nineteenth embodiment"), an engine load where the device-calculation load becomes a safe calculation load is preset as a safe engine load. Further, in a prediction calculation continuation/end control of this embodiment, if an engine load is larger than the safe engine load (that is, if it is estimated that the device-calculation load is larger than the safe calculation load) when an elapsed prediction length corresponding to the time of the change of an engine state is shorter than the allowable prediction length at the time of the change of an engine state, the prediction calculation is ended (in this case, the model selecting calculation is not performed). Meanwhile, if an engine load is equal to or smaller than the safe engine load when an elapsed prediction length corresponding to the time of the change of an engine state is shorter than the allowable prediction length at the time of the change of an engine state, the prediction calculation is continued while the set prediction length is maintained as it is (in this case, the model selecting calculation is performed). Of course, when an elapsed prediction length corresponding to the time of the change of an engine state is equal to or longer than the allowable prediction length at the time of the change of an engine state, the prediction calculation is ended regardless of an engine load (in this case, the model selecting calculation is not performed).

According to this, since it is possible to perform the prediction calculation continuation/end control using the present engine load without using the device-calculation load detection value, it is not necessary to use the calculation load monitor that is used to detect a device-calculation load. Further, in this embodiment, the present engine load is a parameter representing the present device-calculation load. Accordingly, according to this embodiment, the same effect as the effect obtained from the thirteenth embodiment is also obtained.

Meanwhile, the prediction calculation is continued in the prediction calculation continuation/end control of this embodiment. As a result, while the model selecting calculation is performed, one of the prediction calculation continuation/end controls of the second to eleventh embodiments is performed or the model selecting calculation is continued regardless of the present device-calculation load detection value (or an elapsed prediction length at that time point, a future device-calculation load, the present engine load, or a future engine load).

Further, in the prediction calculation continuation/end control of this embodiment, one of the prediction calculation continuation/end controls of the second to eleventh embodiments is performed while a controlled-object-state is not changed during the prediction calculation.

Meanwhile, in the fourteenth embodiment, an engine load may be used instead of the device-calculation load detection value as described below when it is determined whether or not the prediction calculation is ended at the time of the change of an engine state. In this embodiment (hereinafter, referred to as a "twentieth embodiment"), an engine load where the device-calculation load becomes a safe calculation load is preset as a safe engine load. Moreover, in a prediction calculation continuation/end control of this embodiment, if an engine load is larger than the safe engine load (that is, if it is estimated that the device-calculation load is larger than the safe calculation load) when an elapsed prediction length corresponding to the time of the change of an engine state is shorter than the allowable prediction length at the time of the change of an engine state, the prediction calculation is continued while the set prediction length is shortened by a predetermined period (or by a longer time as an engine load is larger) (in this case, the model selecting calculation is performed). Meanwhile, if an engine load is equal to or smaller than the safe engine load when an elapsed prediction length corresponding to the time of the change of an engine state is shorter than the allowable prediction length at the time of the change of an engine state, the prediction calculation is continued while the set prediction length is maintained as it is (in this case, the model selecting calculation is performed). Of course, when an elapsed prediction length corresponding to the time of the change of an engine state is equal to or longer than the allowable prediction length at the time of the change of an engine state, the prediction calculation is ended regardless of an engine load (in this case, the model selecting calculation is not performed).

According to this, since it is possible to perform the prediction calculation continuation/end control using the present engine load without using the device-calculation load detection value, it is not necessary to use the calculation load monitor that is used to detect a device-calculation load. Further, in this embodiment, the present engine load is a parameter representing the present device-calculation load. Accordingly, according to this embodiment, the same effect as the effect obtained from the fourteenth embodiment is also obtained.

Meanwhile, the prediction calculation is continued in the prediction calculation continuation/end control of this embodiment. As a result, while the model selecting calculation is performed, one of the prediction calculation continuation/end controls of the second to eleventh embodiments is performed or the model selecting calculation is continued regardless of the present device-calculation load detection value (or an elapsed prediction length at that time point, a future device-calculation load, the present engine load, or a future engine load).

Moreover, in the prediction calculation continuation/end control of this embodiment, one of the prediction calculation continuation/end controls of the second to eleventh embodiments is performed while a controlled-object-state is not changed during the prediction calculation.

Meanwhile, in the nineteenth embodiment, a future engine load may be used instead of the present engine load when it is determined whether or not the prediction calculation is ended at the time of the change of an engine state. In this embodiment (hereinafter, referred to as a "twenty-first embodiment"), a future engine load is preset during the prediction calculation. Further, in a prediction calculation continuation/end control of this embodiment, if the predicted future engine load is larger than the safe engine load (that is, if it is estimated that a future device-calculation load is larger than the safe calculation load) when an elapsed prediction length corresponding to the time of the change of an engine state is shorter than the allowable prediction length at the time of the change of an engine state, the prediction calculation is ended (in this case, the model selecting calculation is not performed). Meanwhile, if the predicted future engine load is equal to or smaller than the safe engine load when an elapsed prediction length corresponding to the time of the change of an engine state is shorter than the allowable prediction length at the time of the change of an engine state, the prediction calculation is continued while the set prediction length is maintained as it is (in this case, the model selecting calculation is performed). Of course, when an elapsed prediction length corresponding to the time of the change of an engine state is equal to or longer than the allowable prediction length at the time of the change of an engine state, the prediction calculation is ended regardless of the predicted future engine load (in this case, the model selecting calculation is not performed).

According to this, since it is possible to perform the prediction calculation continuation/end control using the future engine load without using the device-calculation load detection value, it is not necessary to use the calculation load monitor that is used to detect a device-calculation load. Further, in this embodiment, the future engine load is a parameter representing a future device-calculation load. Accordingly, according to this embodiment, the same effect as the effect obtained from the thirteenth embodiment is also obtained.

Meanwhile, the prediction calculation is continued in the prediction calculation continuation/end control of this embodiment. As a result, while the model selecting calculation is performed, one of the prediction calculation continuation/end controls of the second to eleventh embodiments is performed or the model selecting calculation is continued regardless of the present device-calculation load detection value (or an elapsed prediction length at that time point, a future device-calculation load, the present engine load, or a future engine load).

Moreover, in the prediction calculation continuation/end control of this embodiment, one of the prediction calculation continuation/end controls of the second to eleventh embodiments is performed while a controlled-object-state is not changed during the prediction calculation.

Meanwhile, in the twentieth embodiment, a future engine load may be used instead of the present engine load when it is determined whether or not the prediction calculation is ended at the time of the change of an engine state. In this embodiment (hereinafter, referred to as a "twenty-second embodiment"), a future engine load is preset during the prediction calculation. Further, in a prediction calculation continuation/end control of this embodiment, if the predicted future engine load is larger than the safe engine load (that is, if it is estimated that a future device-calculation load is larger than the safe calculation load) when an elapsed prediction length corresponding to the time of the change of an engine state is shorter than the allowable prediction length at the time of the change of an engine state, the prediction calculation is continued while the set prediction length is shortened by a predetermined period (or by a longer time as the predicted future engine load is larger) (in this case, the model selecting calculation is performed). Meanwhile, if the predicted future engine load is equal to or smaller than the safe engine load when an elapsed prediction length corresponding to the time of the change of an engine state is shorter than the allowable prediction length at the time of the change of an engine state, the prediction calculation is continued while the set prediction length is maintained as it is (in this case, the model selecting calculation is performed). Of course, when an elapsed prediction length corresponding to the time of the change of an engine state is equal to or longer than the allowable prediction length at the time of the change of an engine state, the prediction calculation is ended regardless of the predicted future engine load (in this case, the model selecting calculation is not performed).

According to this, since it is possible to perform the prediction calculation continuation/end control using the future engine load without using the device-calculation load detection value, it is not necessary to use the calculation load monitor that is used to detect a device-calculation load. Further, in this embodiment, the future engine load is a parameter representing a future device-calculation load. Accordingly, according to this embodiment, the same effect as the effect obtained from the fourteenth embodiment is also obtained.

Meanwhile, the prediction calculation is continued in the prediction calculation continuation/end control of this embodiment. As a result, while the model selecting calculation is performed, one of the prediction calculation continuation/end controls of the second to eleventh embodiments is performed or the model selecting calculation is continued regardless of the present device-calculation load detection value (or an elapsed prediction length at that time point, a future device-calculation load, the present engine load, or a future engine load).

Moreover, in the prediction calculation continuation/end control of this embodiment, one of the prediction calculation continuation/end controls of the second to eleventh embodiments is performed while a controlled-object-state is not changed during the prediction calculation.

Next, there is introduced one specific example of a method of obtaining a target supercharging pressure and a target EGR rate that satisfy all the constraint conditions based on the target supercharging pressure and the target EGR rate determined from the maps of FIGS. 3(A) and 3(B) in the control device of the above-mentioned embodiment.

When a plurality of components of an internal combustion engine are used as objects to be controlled, the internal state of the internal combustion engine at the present time is represented by an internal state vector "x", and an operation amount, which is to be input to each object to be controlled to control a control amount of each object to be controlled to a target value, is represented by an operation amount vector "u", a state vector "x$^+$", which represents the internal state of the internal combustion engine where corresponding operation amounts have been input to the respective objects to be controlled, that is, the internal state of the internal combustion engine at the next time, can be represented using constant matrices (or coefficient matrices) Ai and Bi by a state equation of the following Expression (1).

$$x^+ = A_i x + B_i u$$

$$x \in X_i (i=1,2,\ldots,s) \tag{1}$$

Meanwhile, in the above Expression (1), "x" is included in a divided state space "Xi".

Further, a control amount vector "y", which represents a control amount output from each object to be controlled when a corresponding operation amount is input to each object to be controlled to control a control amount of each object to be controlled to a corresponding target value, can be represented using constant matrices (or coefficient matrices) Ci and Di by an output equation of the following Expression (2).

$$y = C_i x + D_i u \tag{2}$$

Here, a vector (hereinafter, this vector is referred to as a "constrained signal vector) "c", which represents a constraint on the internal state vector x, a constraint on the operation amount vector u, and a constraint on the control amount vector y, is defined as a vector that is represented by the following Expression (3).

$$c = \begin{bmatrix} u \\ y \\ x \end{bmatrix} \tag{3}$$

Meanwhile, when the constrained signal vector c is defined as in the above Expression (3), the constrained signal vector c is represented from the above Expressions (1) and (2) by the following Expression (4).

$$c = \begin{bmatrix} 0 \\ C_i \\ I \end{bmatrix} x + \begin{bmatrix} I \\ D_i \\ 0 \end{bmatrix} u \tag{4}$$

Here, a constant matrix (or coefficient matrix) Cc is defined as in the following Expression (5), and a constant matrix (or coefficient matrix) Dc is defined as in the following Expression (6).

$$C_c = \begin{bmatrix} 0 \\ C \\ I \end{bmatrix} \quad (5)$$

$$D_c = \begin{bmatrix} I \\ D \\ 0 \end{bmatrix} \quad (6)$$

Further, when the constant matrices Cc and Dc are defined as in the above Expressions (5) and (6), the above Expression (4) is represented by the following Expression (7).

$$c = C_c x + D_c u \quad (7)$$

As described above, a state space model related with the objects to be controlled is represented by the above Expressions (1), (2), and (7).

Here, a constraint on the internal state of each object to be controlled, which is represented by the internal state vector x, is represented by a bounded closed set "X"; a constraint on the operation amount to be input to each object to be controlled, which is represented by the operation amount vector u, is represented by a bounded closed set "U"; a constraint on the control amount output from each object to be controlled, which is represented by the control amount vector y, is represented by a bounded closed set "Y"; and a bounded closed set "C" is defined as a set that is represented by the following Expression (8). Meanwhile, the internal state vector x is a m-dimensional vector, the operation amount vector u is a n-dimensional vector, the control amount vector y is a p-dimensional vector, and the bounded closed set C belongs to a vector space $R^q$ when "q=m+n+p" is satisfied.

$$C = U \times X \times Y \times \subseteq R^q \quad (8)$$

Further, if the constrained signal vector c belongs to the bounded closed set C, the internal state vector x belongs to the bounded closed set X, the operation amount vector u belongs to the bounded closed set U, and the control amount vector y belongs to the bounded closed set Y. Accordingly, when the operation amount vector u (that is, each operation amount) is corrected so that the constrained signal vector c belongs to the bounded closed set C and the operation amount according to the corrected operation amount vector u is input to each object to be controlled, the control amount of each object to be controlled is controlled so that all of the constraint on the internal state of each object to be controlled, the constraint on the operation amount to be input to each object to be controlled, and the constraint on the control amount output from each object to be controlled are satisfied.

When internal state feedback, which uses the internal state observation of a plurality of components of the internal combustion engine including the vanes 35d, the vane actuator 35e, the EGR control valve 52, and the EGR control valve actuator, and a tracking error integral control based on a deviation of an actual supercharging pressure from a target supercharging pressure (that is, a supercharging pressure deviation) and a deviation of an actual EGR rate from a target EGR rate (that is, an EGR rate deviation) are performed on the premise of the above description, a target supercharging pressure and a target EGR rate, which are determined from the maps of FIGS. 3(A) and 3(B), respectively, are corrected as described below. As a result, a target supercharging pressure and a target EGR rate, which are to be used to determine the operation amounts to be input to the vanes 35d and the EGR control valve 52, respectively, are obtained.

That is, when a feedback gain relating to the internal state feedback is represented by "$K_{xi}$", a feedback gain relating to the tracking error integral control is represented by "$K_{vi}$", an internal state vector representing the internal states of a plurality of components of the internal combustion engine is represented by "x", an integrated tracking error value vector representing an integrated tracking error value in the tracking error integral control is represented by "v", and an operation amount vector representing an operation amount to be input to the vanes 35 from the vane actuator 35e and an operation amount to be input to the EGR control valve 52 from the EGR control valve actuator is represented by "u", the operation amount vector u is represented by the following expression (9).

$$u = K_{xi} x + K_{vi} v \quad (9)$$

Further, when a target value vector representing a target supercharging pressure and a target EGR rate is represented by "r", a control amount vector representing a supercharging pressure and an EGR rate, which are control amounts of objects to be controlled, is represented by "y", and a tracking error vector representing a deviation of an actual supercharging pressure from a target supercharging pressure (that is, a tracking error) and a deviation of an actual EGR rate from a target EGR rate (that is, a tracking error) is represented by "e", the tracking error vector e is represented by the following expression (10).

$$e = r - y \quad (10)$$

Furthermore, when an integrated tracking error value vector at the present time is represented by "v", an integrated tracking error value vector at the next time is represented by "$v^+$", the integrated tracking error value vector $v^+$ at the next time is represented by the following expression (11).

$$v^+ = v + e \quad (11)$$

Moreover, when the above expressions (10) and (11) are substituted in the above expressions (1), (2), and (7) and transformed, a state space model of a closed loop system of the following expressions (12) to (14) are obtained.

$$\begin{bmatrix} v^+ \\ x^+ \end{bmatrix} = \begin{bmatrix} -D_i K_{vi} & -(C_i + D_i K_{xi}) \\ B_i K_{vi} & A_i + B_i K_{xi} \end{bmatrix} \begin{bmatrix} v \\ x \end{bmatrix} + \begin{bmatrix} I \\ 0 \end{bmatrix} r \quad (12)$$

$$y = [D_i K_{vi} \quad C_i + D_i K_{xi}] \begin{bmatrix} v \\ x \end{bmatrix} \quad (13)$$

$$c = [D_{ci} K_{vi} \quad C_{ci} + D_{ci} K_{xi}] \begin{bmatrix} v \\ x \end{bmatrix} \quad (14)$$

Here, the above expression (12) is an expression for obtaining integrated tracking error values at the next time (these are represented by an integrated tracking error value vector $v^+$) and the internal states of the components of the internal combustion engine at the next time (these are represented by an internal state vector $x^+$) based on integrated tracking error values of a supercharging pressure and an EGR rate at the present time (these are represented by the integrated tracking error value vector v), the internal states of the components of the internal combustion engine at the present time (these are represented by the internal state vector x), and a target supercharging pressure and a target EGR rate at the present time (these are represented by the target value vector r).

Further, the above expression (13) is an expression for obtaining a supercharging pressure and an EGR rate that are control amounts of objects to be controlled (these are represented by the control amount vector y) based on the integrated tracking error values of a supercharging pressure and an EGR rate and the internal states of the components of the internal combustion engine.

Furthermore, the above expression (14) is an expression for obtaining the above-mentioned constrained signal vector c based on the integrated tracking error values of a supercharging pressure and an EGR rate and the internal states of the components of the internal combustion engine.

Meanwhile, "$\xi$", "$\Phi$", "$G$", "$H$", and "$Hc$" are defined as in the following expressions (15) to (19).

$$\xi = \begin{bmatrix} v \\ x \end{bmatrix} \quad (15)$$

$$\Phi_i = \begin{bmatrix} -D_i K_{vi} & -(C_i + D_i K_{xi}) \\ B_i K_{vi} & A_i + B_i K_{xi} \end{bmatrix} \quad (16)$$

$$G = \begin{bmatrix} I \\ 0 \end{bmatrix} \quad (17)$$

$$H_i = [D_i K_{vi} \quad C_i + D_i K_{xi}] \quad (18)$$

$$H_{ci} = [D_{ci} K_{vi} \quad C_{ci} + D_{ci} K_{xi}] \quad (19)$$

Further, when "$\xi$", "$\Phi$", "$G$", "$H$", and "$Hc$" are used, the above expressions (12) to (14) can be represented as in the following expressions (20) to (22).

$$\xi^+ = \Phi_i \xi + Gr \quad (20)$$

$$y = H_i \xi \quad (21)$$

$$c = H_{ci} \xi \quad (22)$$

Moreover, a target supercharging pressure and a target EGR rate, which are determined from the maps of FIGS. 3(A) and 3(B), respectively, in a case where a target supercharging pressure and a target EGR rate where a constraint condition ahead of h step (this "h" is the "set prediction length" in the above-mentioned embodiment) is satisfied are obtained, when a calculation cycle is referred to as a "step" and a target supercharging pressure and a target EGR rate are given as the target value vector r, that is, a target supercharging pressure and a target EGR rate, which are represented by the target value vector r obtained through the solving of an optimization problem illustrated in the following expression (23) for obtaining the minimum value of an absolute value of the deviation of the target value vector r, which represents a target supercharging pressure and a target EGR rate obtained at this time from an initial target value vector $r_0$, when an initial target value vector representing an initial target value is represented by "$r_0$", are a target supercharging pressure and a target EGR rate where a supercharging pressure and an EGR rate can be controlled while all constraints are satisfied.

minimize $\|r_0 - r\|$
subject to $$\xi_{k+j+1|k} = \Phi_i \xi_{k+j|k} + Gr \; j=0,1,\ldots,h-1$$

$$\xi_{k|k} = \xi_k$$

$$c_{k+j|k} = H_{ci} \xi_{k+j|k} \in C \quad (23)$$

That is, sequentially, if the target supercharging pressure and the target EGR rate, which are obtained through the solving of the optimization problem illustrated in the above expression (23), are used in the control of a supercharging pressure and an EGR rate, a supercharging pressure and an EGR rate are controlled while all constraints are satisfied.

Here, in the optimization problem illustrated in the above expression (23), "$c_{k+j|k}$" represents an estimated value of "c" at a time k+j when information needed at a time k has already been known, and "$\xi_{k+j|k}$" represents an estimated value of "$\xi$" at a time k+j when information needed at a time k has already been known.

Meanwhile, in the example introduced above, the target supercharging pressure and the target EGR rate, which are determined from the maps of FIGS. 3(A) and 3(B), respectively, are corrected using a state space model so that all constraint conditions are satisfied, and the corrected target supercharging pressure and the corrected target EGR rate are used in the control of an actual supercharging pressure and an actual EGR rate. Accordingly, in the example introduced above, it may be said that a supercharging pressure, an EGR rate, the operating state of the vanes, the operating state of the EGR control valve, a vane operation amount, an EGR control valve-operation amount, the operating state of the vane actuator, and the operating state of the EGR control valve actuator when an actual supercharging pressure and an EGR rate are controlled based on the target supercharging pressure and the target EGR rate that are determined from the maps of FIGS. 3(A) and 3(B), respectively, are predicted by the state space model; whether or not all constraint conditions are satisfied is determined based on the results of this prediction; a target supercharging pressure and a target EGR rate are corrected until it is determined that all constraint conditions are satisfied; and a target supercharging pressure and a target EGR rate when it is determined that all constraint conditions are satisfied are used in the control of an actual supercharging pressure and an actual EGR rate.

According to this, when a target supercharging pressure is changed or a target EGR rate is changed, an optimal target supercharging pressure or an optimal target EGR rate is sequentially calculated until a supercharging pressure or an EGR rate are controlled to a target supercharging pressure or a target EGR rate, respectively, (that is, a transient state) and a supercharging pressure or an EGR rate are controlled based on the calculated target supercharging pressure or the calculated target EGR rate. For this reason, the responsiveness of a supercharging pressure or an EGR rate in the transient state is good.

Particularly, according to this, since the operation amounts to be input to the vanes 35d and the EGR control valve 52 are also constrained, an anti-windup effect is obtained. For this reason, it may be said that the responsiveness of the control of a supercharging pressure and an EGR rate is better while a supercharging pressure and an EGR rate are controlled to a target supercharging pressure and a target EGR rate, respectively (that is, a transient state).

Further, in the above-mentioned embodiments and the example introduced above, a supercharging pressure and an EGR rate are controlled so that the constraints on the objects to be controlled, such as the vanes of the supercharger and the EGR control valve of the EGR device, and the constraints on the actuators controlling the operations of the objects to be controlled, such as the vane actuator and the EGR control valve actuator are satisfied. For this reason, it may be said that the stability and robustness of the control of a supercharging pressure and an EGR rate are high.

Furthermore, non-linear characteristics of the input to an object to be controlled and the output from an object to be controlled, the constraints on the input and output, and the constraint on the internal state of an object to be controlled can be positively described in the state space model described based on the above-mentioned idea. For this reason, it may be said that the stability and robustness of control are high in the control of a supercharging pressure and an EGR rate where the state space model is used.

Meanwhile, when the optimization problem of the above expression (24) is to be solved, an optimal solution may be obtained. However, when the time taken for one time of calculation is relatively short or a solution needs to be quickly obtained, an approximate solution may be obtained.

Moreover, the internal state feedback, which uses the internal state observation of the components of the internal combustion engine including the vanes, the vane actuator, the EGR control valve, and the EGR control valve actuator, has been performed in the example introduced above. However, when the internal state observation of the components of the internal combustion engine cannot be performed or cannot be accurately performed, output feedback based on values output from the objects to be controlled, such as a supercharging pressure and an EGR rate, may be used instead of the internal state feedback.

Meanwhile, embodiments of the present invention have been described as to the cases where the control device of the invention is applied to a compression self-ignition internal combustion engine, as examples. However, the present invention can also be applied to a spark-ignition internal combustion engine.

Figure 4:
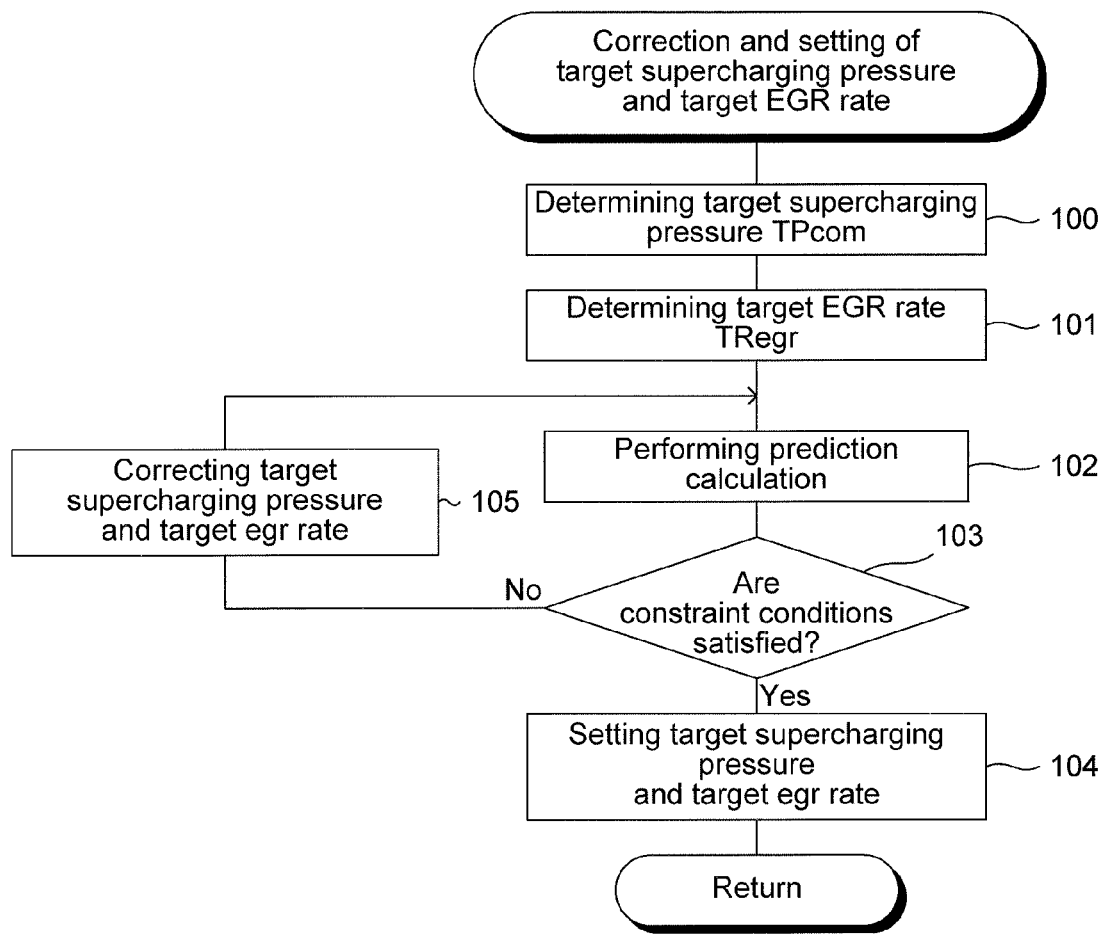
FIG. 4 is a view illustrating a flowchart for correcting a target supercharging pressure and a target EGR rate according to an embodiment of the present invention.

Next, there is introduced one example of a routine for setting a target supercharging pressure and a target EGR rate and correcting a target supercharging pressure and a target EGR rate according to the first embodiment in the above-mentioned example. This example is illustrated in FIG. 4. The routine of FIG. 4 is performed at predetermined period intervals.

When the routine of FIG. 4 is started, first, a target supercharging pressure TPcom is determined from the map of FIG. 3(A) based on engine speed N and an engine load L in step 100. Then, in step 101, a target EGR rate TRegr is determined from the map of FIG. 3(B) based on engine speed N and an engine load L.

After that, in step 102, prediction calculation is performed based on the target supercharging pressure determined in step 100 and the target EGR rate. That is, future controlled-object-states (that is, a supercharging pressure, the operating state of the vanes 35d, the operating state of the vane actuator 35e, a vane operation amount, the operating state of the EGR rate, EGR control valve 52, the operating state of the EGR control valve actuator, and an EGR control valve-operation amount) are predicted only for a set prediction length when the control of a supercharging pressure and an EGR rate is performed based on the target supercharging pressure determined in step 100 and the target EGR rate.

Next, it is determined in step 103 whether or not the future controlled-object-states predicted in step 102 satisfies all the above-mentioned constraint conditions. Here, if it is determined that the future controlled-object-states satisfy all the above-mentioned constraint conditions, the routine proceeds to step 104, the target supercharging pressure determined in step 100 is set to a target supercharging pressure used in the control of an actual supercharging pressure, the target EGR rate determined in step 101 is set to a target EGR rate used in the control of an actual EGR rate, and the routine is ended.

Meanwhile, if it is determined in step 103 that the future controlled-object-states predicted in step 102 do not satisfy at least one of the above-mentioned constraint conditions, the routine proceeds to step 105, the target supercharging pressure determined in step 100 and the target EGR rate determined in step 101 are corrected according to the above-mentioned manner, and the routine proceeds to step 102 again. Further, in this case, the prediction calculation is performed in step 102 based on the target supercharging pressure and the target EGR rate that are corrected in step 104. After that, it is determined in step 103 whether or not the future controlled-object-states predicted in step 102 satisfy all the above-mentioned constraint conditions. Here, if it is determined that the future controlled-object-states satisfy all the above-mentioned constraint conditions, the routine proceeds to step 103, the target supercharging pressure corrected in step 104 is set to a target supercharging pressure used in the control of an actual supercharging pressure, and the target EGR rate corrected in step 104 is set to a target EGR rate used in the control of an actual supercharging pressure.

Meanwhile, if it is determined in step 103 that the future controlled-object-states predicted in step 102 do not satisfy at least one of the above-mentioned constraint conditions, the routine proceeds to step 104 again, the target supercharging pressure and the target EGR rate corrected in step 104 at the last time are further corrected according to the above-mentioned manner, and the routine proceeds to step 102 again. That is, until it is determined in step 103 that the future controlled-object-states satisfy all the above-mentioned constraint conditions, steps 104, 102, and 103 are repeatedly performed.

Figure 5:
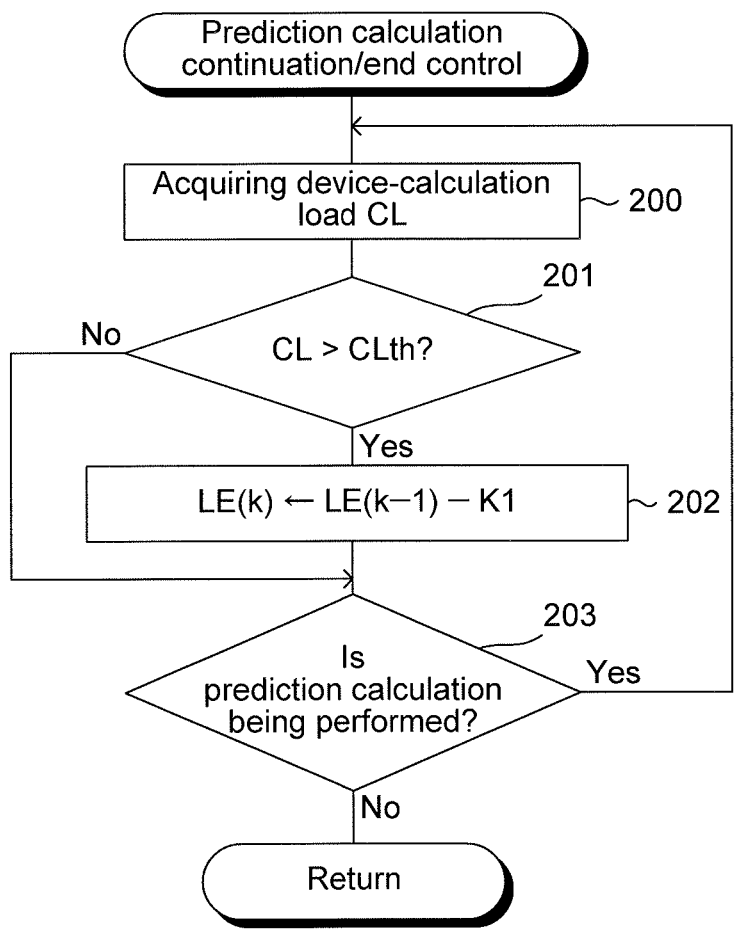
FIG. 5 is a view illustrating an example of a flowchart for performing a prediction calculation continuation/end control of a second embodiment.

Next, there is introduced one example of a routine for performing the prediction calculation continuation/end control of the second embodiment. This example is illustrated in FIG. 5. The routine of FIG. 5 is started when the prediction calculation (that is, step 102) of the routine of FIG. 4 is started, and is ended when prediction calculation is ended.

When the routine of FIG. 5 is started, a device-calculation load CL is acquired in step 200. Then, it is determined in step 201 whether or not the device-calculation load CL acquired in step 200 exceeds an allowable calculation load value CLth (CL>CLth). Here, if it is determined that "CL>CLth" is satisfied, the routine proceeds to step 202. Meanwhile, if it is determined that "CL≤CL" is satisfied, the routine proceeds to step 203.

If it is determined in step 201 that "CL>CLth" is satisfied and the routine proceeds to step 202, the present set prediction length LE(k−1) is shortened by a predetermined period K1 and input as a set prediction length LE(k) that is to be used in future (LE(k)←LE(k−1)−K1). Then, the routine proceeds to step 203.

It is determined in step 203 whether or not the prediction calculation is being performed. Here, if it is determined that the prediction calculation is being performed, the routine returns to step 200. Meanwhile, if it is determined that the prediction calculation is not being performed, the routine is ended as it is.

Figure 6:
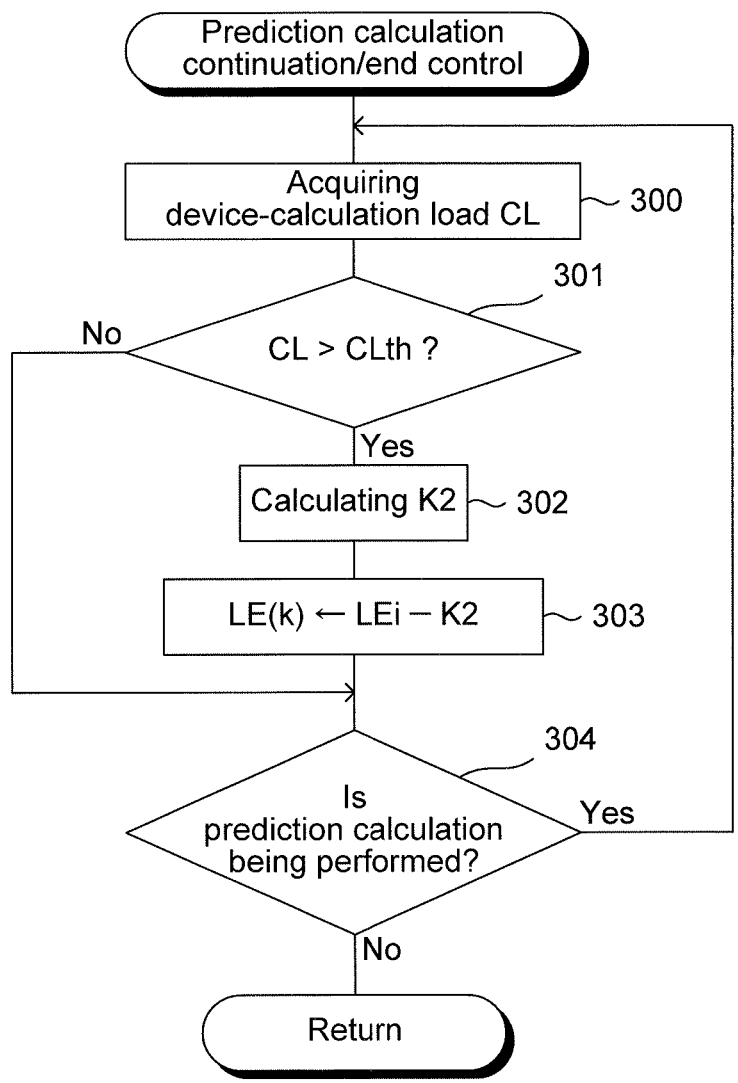
FIG. 6 is a view illustrating an example of a flowchart for performing a prediction calculation continuation/end control of a third embodiment.

Next, there is introduced one example of a routine for performing the prediction calculation continuation/end control of the third embodiment. This example is illustrated in FIG. 6. The routine of FIG. 6 is started when the prediction calculation (that is, step 102) of the routine of FIG. 4 is started, and is ended when prediction calculation is ended.

When the routine of FIG. 6 is started, a device-calculation load CL is acquired in step 300. Then, it is determined in step 301 whether or not the device-calculation load CL acquired in step 300 exceeds an allowable calculation load value CLth (CL>CLth). Here, if it is determined that "CL>CLth" is satisfied, the routine proceeds to step 302. Meanwhile, if it is determined that "CL≤CL" is satisfied, the routine proceeds to step 304.

If it is determined in step 301 that "CL>CLth" is satisfied and the routine proceeds to step 302, a coefficient K2 that is used in shortening an initial set prediction length LEi and is larger as the device-calculation load CL acquired in step 100 is larger is calculated. After that, in step 303, the initial set prediction length LEi is shortened by the coefficient K2 calculated in step 302 and input as a set prediction length LE(k) that is to be used in future (LE(k)←LEi−K2). Then, the routine proceeds to step 304.

It is determined in step 304 whether or not the prediction calculation is being performed. Here, if it is determined that the prediction calculation is being performed, the routine returns to step 300. Meanwhile, if it is determined that the prediction calculation is not being performed, the routine is ended as it is.

Figure 7:
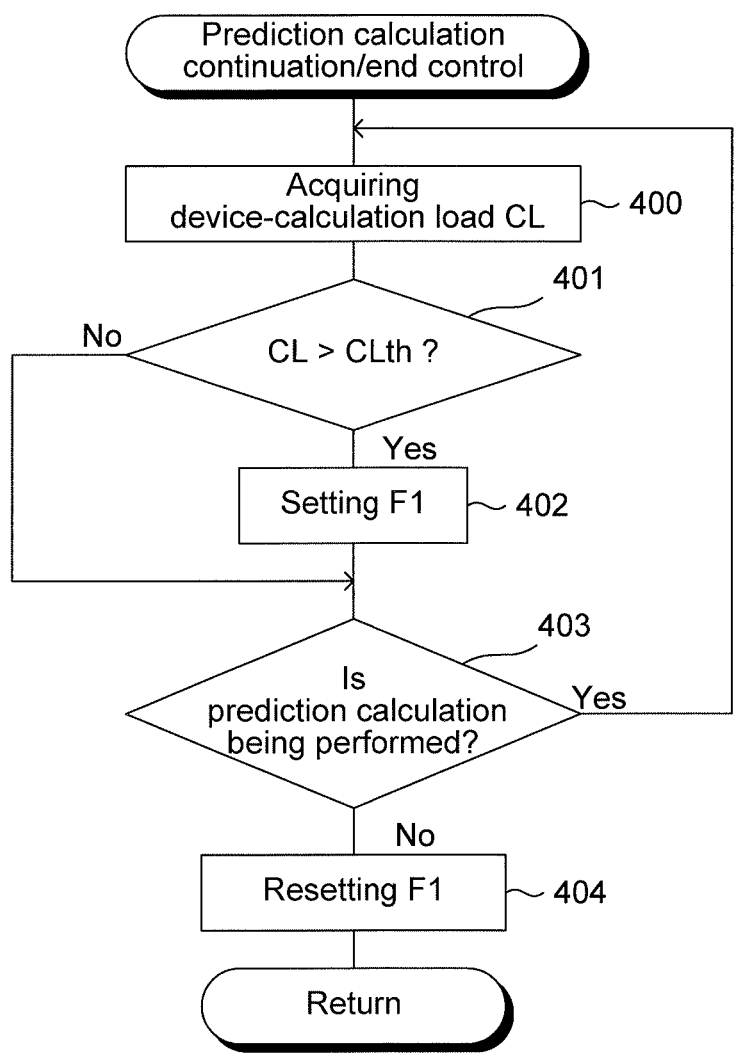
FIG. 7 is a view illustrating an example of a flowchart for performing a prediction calculation continuation/end control of a fourth embodiment.

Next, there is introduced one example of a routine for performing the prediction calculation continuation/end control of the fourth embodiment. This example is illustrated in FIG. 7. The routine of FIG. 7 is started when the prediction calculation (that is, step 102) of the routine of FIG. 4 is started, and is ended when prediction calculation is ended.

When the routine of FIG. 7 is started, a device-calculation load CL is acquired in step 400. Then, it is determined in step 401 whether or not the device-calculation load CL acquired in step 400 exceeds an allowable calculation load value CLth (CL>CLth). Here, if it is determined that "CL>CLth" is satisfied, the routine proceeds to step 402. Meanwhile, if it is determined that "CL≤CL" is satisfied, the routine proceeds to step 403.

If it is determined in step 401 that "CL>CLth" is satisfied and the routine proceeds to step 402, a prediction calculation end flag F1 is set and the routine proceeds to step 403. Here, when the prediction calculation end flag is set in step 402, the prediction calculation of step 102 of FIG. 4 is ended. Meanwhile, the prediction calculation of step 102 of FIG. 4 is continued while this prediction calculation end flag is reset.

It is determined in step 403 whether or not the prediction calculation is being performed. Here, if it is determined that the prediction calculation is being performed, the routine returns to step 400. Meanwhile, if it is determined that the prediction calculation is not being performed, the routine proceeds to step 404.

In step 404, the prediction calculation end flag F1 is reset and the routine is ended. That is, when step 102 of FIG. 4 is started next time, the prediction calculation end flag F1 has already been reset.

Figure 8:
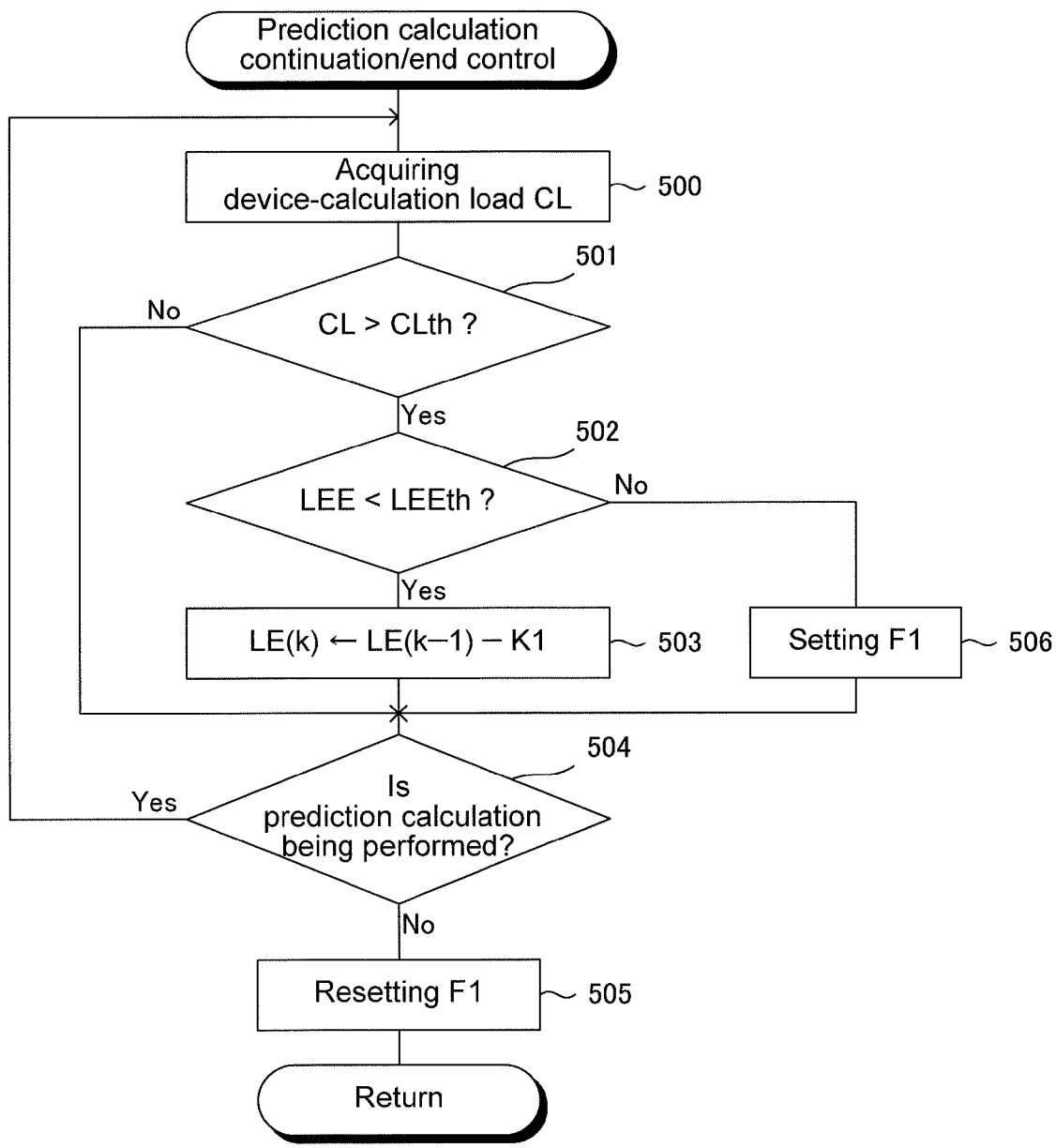
FIG. 8 is a view illustrating an example of a flowchart for performing a prediction calculation continuation/end control of a fifth embodiment.

Next, there is introduced one example of a routine for performing the prediction calculation continuation/end control of the fifth embodiment. This example is illustrated in FIG. 8. The routine of FIG. 8 is started when the prediction calculation (that is, step 102) of the routine of FIG. 4 is started, and is ended when prediction calculation is ended.

When the routine of FIG. 8 is started, a device-calculation load CL is acquired in step 500. Then, it is determined in step 501 whether or not the device-calculation load CL acquired in step 500 exceeds an allowable calculation load value CLth (CL>CLth). Here, if it is determined that "CL>CLth" is satisfied, the routine proceeds to step 502. Meanwhile, if it is determined that "CL≤CL" is satisfied, the routine proceeds to step 504.

If it is determined in step 501 that "CL>CLth" is satisfied and the routine proceeds to step 502, it is determined whether or not an elapsed prediction length LEE is shorter than an allowable prediction length LEEth (LEE<LEEth). Here, if it is determined that "LEE<LEEth" is satisfied, the routine proceeds to step 503. Meanwhile, if it is determined that "LEE≥LEEth" is satisfied, the routine proceeds to step 506.

If it is determined in step 501 that "CL>CLth" is satisfied, it is determined in step 503 that "LEE<LEEth" is satisfied, and the routine proceeds to step 503, the present set prediction length LE(k−1) is shortened by a predetermined period K1 and input as a set prediction length LE(k) that is to be used in future (LE(k)←LE(k−1)−K1). Then, the routine proceeds to step 504.

Meanwhile, if it is determined in step 501 that "CL>CLth" is satisfied, it is determined in step 503 that "LEE≥LEEth" is satisfied, and the routine proceeds to step 506, a prediction calculation end flag F1 is set and the routine proceeds to step 504. Here, when the prediction calculation end flag is set in step 506, the prediction calculation of step 102 of FIG. 4 is ended. Meanwhile, the prediction calculation of step 102 of FIG. 4 is continued while this prediction calculation end flag is reset.

It is determined in step 504 whether or not the prediction calculation is being performed. Here, if it is determined that the prediction calculation is being performed, the routine returns to step 500. Meanwhile, if it is determined that the prediction calculation is not being performed, the routine proceeds to step 505.

In step 505, the prediction calculation flow rate flag F1 is reset and the routine is ended. That is, when step 102 of FIG. 4 is started next time, the prediction calculation end flag F1 has already been reset.

Figure 9:
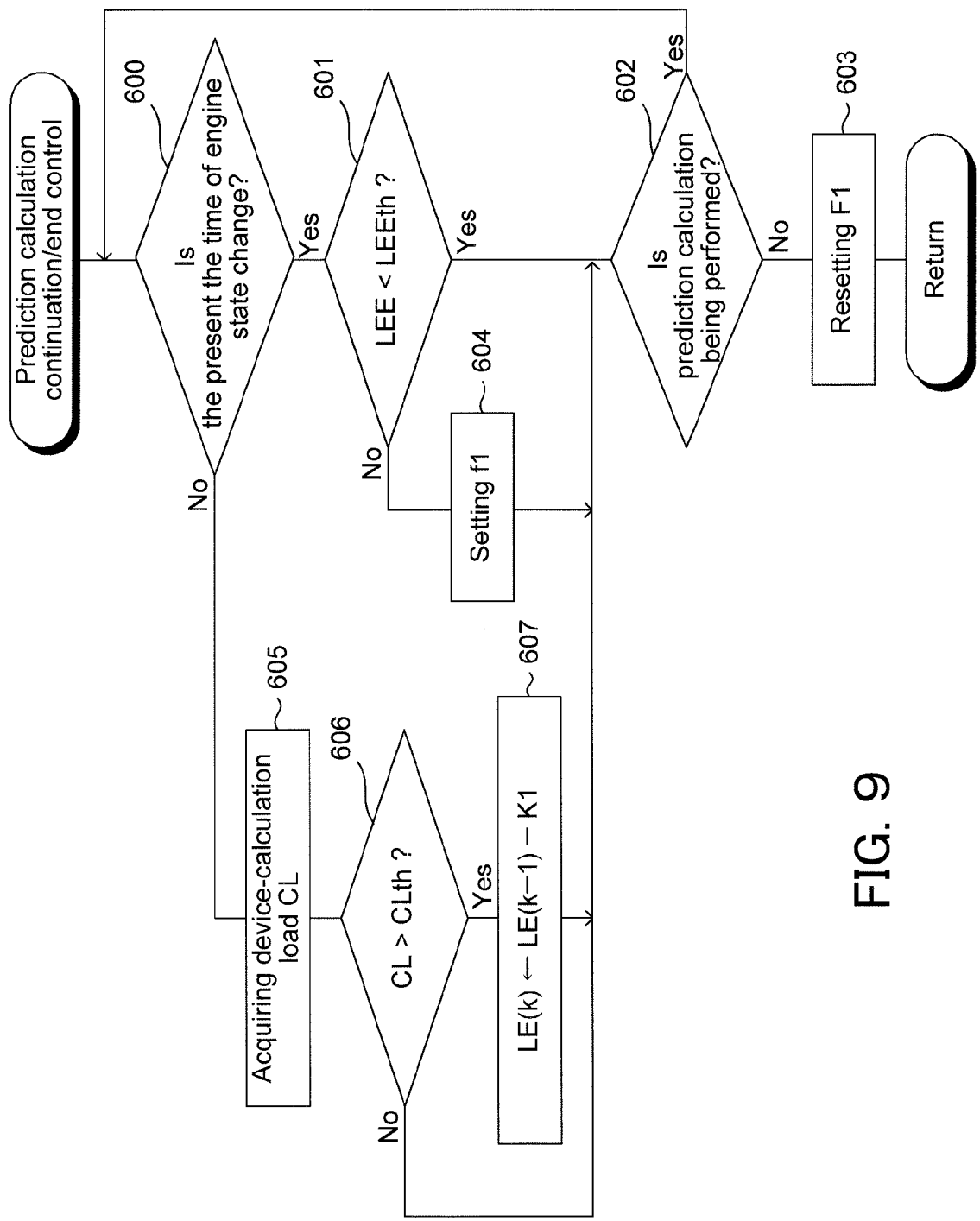
FIG. 9 is a view illustrating an example of a flowchart for performing a prediction calculation continuation/end control of a twelfth embodiment.

Next, there is introduced one example of a routine for performing the prediction calculation continuation/end control of the twelfth embodiment. This example is illustrated in FIG. 9. The routine of FIG. 9 is started when the prediction calculation (that is, step 102) of the routine of FIG. 4 is started, and is ended when prediction calculation is ended.

When the routine of FIG. 9 is started, it is determined in step 600 whether or not the present is the time of the change of an engine state. Here, if it is determined that the present is the time of the change of an engine state, the routine proceeds to step 601. Meanwhile, if it is determined that the present is not the time of the change of an engine state, the routine proceeds to step 605.

If it is determined in step 600 that the present is the time of the change of an engine state and the routine proceeds to step 601, it is determined whether or not an elapsed prediction length LEE is shorter than an allowable prediction length LEEth (LEE<LEEth). Here, if it is determined that "LEE<LEEth" is satisfied, the routine proceeds to step 602. Meanwhile, if it is determined that "LEE≥LEEth" is satisfied, the routine proceeds to step 604.

If it is determined in step 600 that the present is the time of the change of an engine state, it is determined in step 601 that "LEE≥LEEth" is satisfied, and the routine proceeds to step 604, a prediction calculation end flag F1 is set and the routine proceeds to step 602. Here, when the prediction calculation end flag is set in step 604, the prediction calculation of step 102 of FIG. 4 is ended. Meanwhile, the prediction calculation of step 102 of FIG. 4 is continued while this prediction calculation end flag is reset.

If it is determined in step 600 that the present is not the time of the change of an engine state and the routine proceeds to step 605, a device-calculation load CL is acquired. Then, it is determined in step 606 whether or not the device-calculation load CL acquired in step 605 is larger than an allowable calculation load value CLth (CL>CLth). Here, if it is determined that "CL>CLth" is satisfied, the routine proceeds to step 607. Meanwhile, if it is determined that "CL≤CLth" is satisfied, the routine proceeds to step 602.

If it is determined in step 606 that "CL>CLth" is satisfied and the routine proceeds to step 607, the present set prediction length LE(k−1) is shortened by a predetermined period K1 and input as a set prediction length LE(k) that is to be used in future (LE(k)←LE(k−1)−K1). Then, the routine proceeds to step 602.

It is determined in step 602 whether or not the prediction calculation is being performed. Here, if it is determined that the prediction calculation is being performed, the routine returns to step 600. Meanwhile, if it is determined that the prediction calculation is not being performed, the routine proceeds to step 603.

In step 603, the prediction calculation end flag F1 is reset and the routine is ended. That is, when step 102 of FIG. 4 is started next time, the prediction calculation end flag F1 has already been reset.

Figure 10:
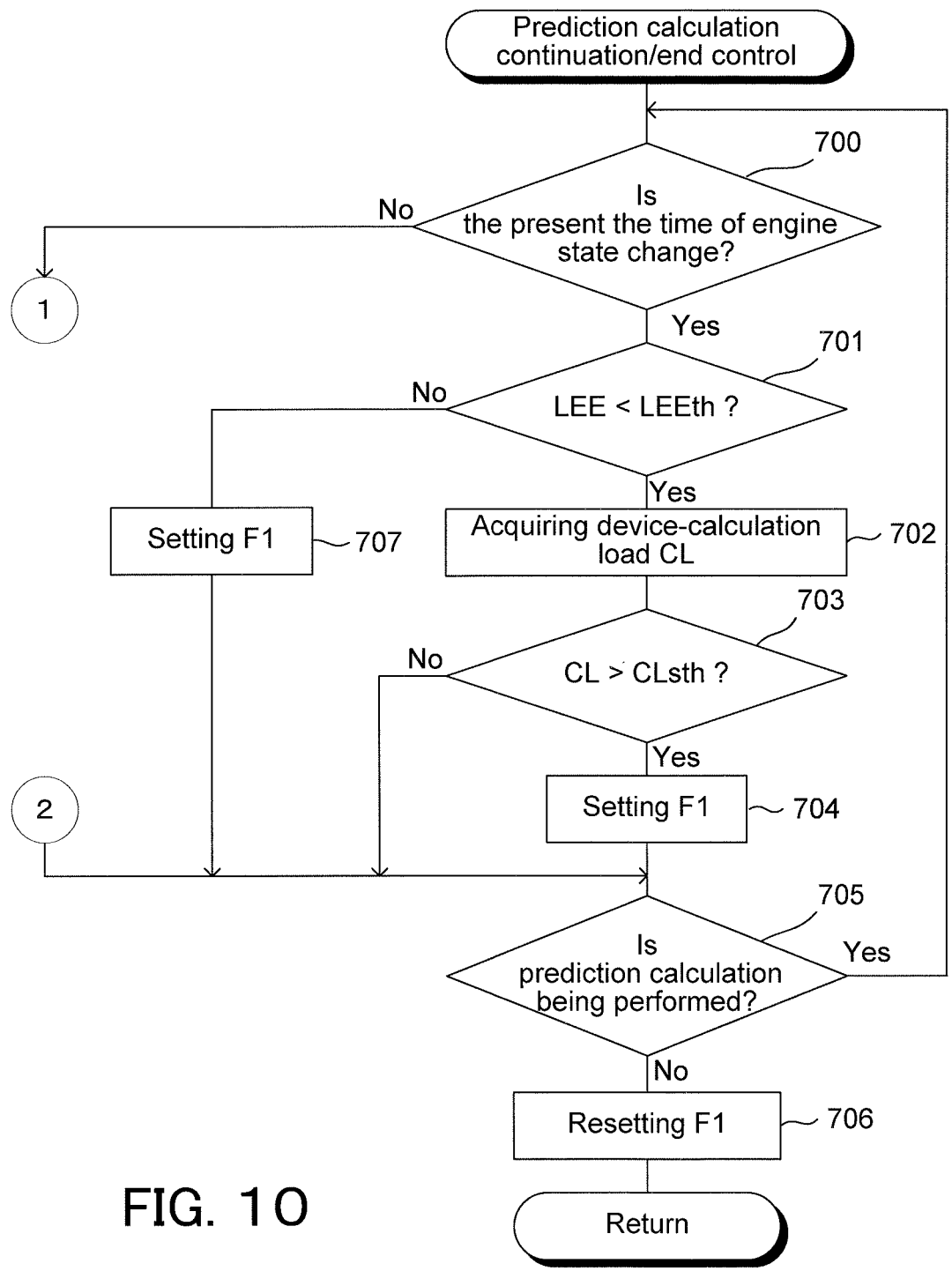
FIG. 10 is a view illustrating an example of a flowchart for performing a prediction calculation continuation/end control of a thirteenth embodiment.
Figure 11:
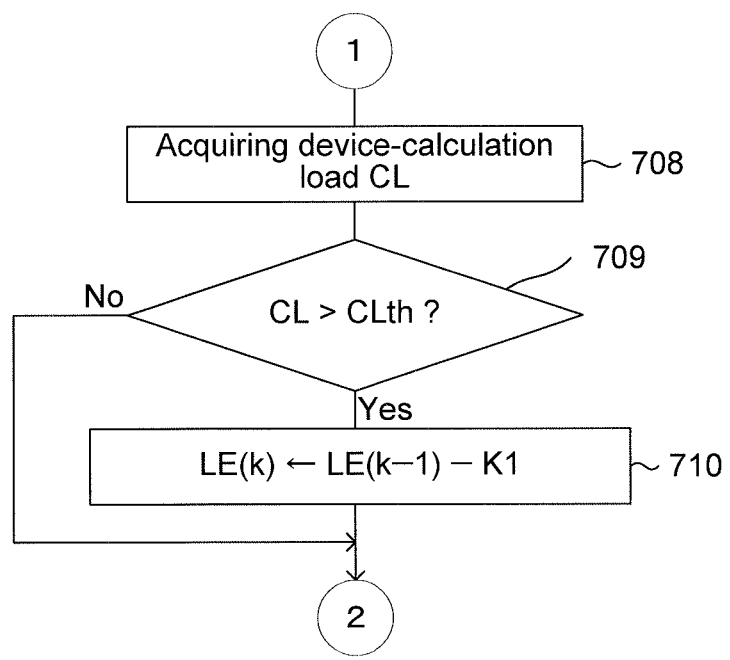
FIG. 11 is a view illustrating an example of a flowchart for performing a prediction calculation continuation/end control of the thirteenth embodiment.

Next, there is introduced one example of a routine for performing the prediction calculation continuation/end control of the thirteenth embodiment. This example is illustrated in FIGS. 10 and 11. The routine of FIGS. 10 and 11 is started when the prediction calculation (that is, step 102) of the routine of FIG. 4 is started, and is ended when prediction calculation is ended.

When the routine of FIGS. 10 and 11 is started, it is determined in step 700 of FIG. 10 whether or not the present is the time of the change of an engine state. Here, if it is determined that the present is the time of the change of an engine state, the routine proceeds to step 701. Meanwhile, if it is determined that the present is not the time of the change of an engine state, the routine proceeds to step 708 of FIG. 11.

If it is determined in step 700 that the present is the time of the change of an engine state and the routine proceeds to step 701, it is determined whether or not an elapsed prediction length LEE is shorter than an allowable prediction length LEEth (LEE<LEEth). Here, if it is determined that "LEE<LEEth" is satisfied, the routine proceeds to step 702. Meanwhile, if it is determined that "LEE≥LEEth" is satisfied, the routine proceeds to step 707.

If it is determined in step 700 that the present is the time of the change of an engine state, it is determined in step 701 that "LEE≥LEEth" is satisfied, and the routine proceeds to step 702, a device-calculation load CL is acquired. Then, it is determined in step 703 whether or not the device-calculation load CL acquired in step 702 is larger than a safe calculation load CLsth (CL>CLsth). Here, if it is determined that "CL>CLsth" is satisfied, the routine proceeds to step 704. Meanwhile, if it is determined that "CL≤CLsth" is satisfied, the routine proceeds to step 705.

If it is determined in step 700 that the present is the time of the change of an engine state, it is determined in step 701 that "LEE<LEEth" is satisfied, it is determined in step 703 that "CL>CLsth" is satisfied, and the routine proceeds to step 704, a prediction calculation end flag F1 is set and the routine proceeds to step 705. Here, when the prediction calculation end flag is set in step 704, the prediction calculation of step 102 of FIG. 4 is ended. Meanwhile, the prediction calculation of step 102 of FIG. 4 is continued while this prediction calculation end flag is reset.

If it is determined in step 700 that the present is the time of the change of an engine state, it is determined in step 701 that "LEE≥LEEth" is satisfied, and the routine proceeds to step 707, a prediction calculation end flag F1 is set and the routine proceeds to step 705.

If it is determined in step 700 that the present is not the time of the change of an engine state and the routine proceeds to step 708 of FIG. 11, a device-calculation load CL is acquired. Then, it is determined in step 709 whether or not the device-calculation load CL acquired in step 708 is larger than an allowable calculation load value CLth (CL>CLth). Here, if it is determined that "CL>CLth" is satisfied, the routine proceeds to step 710. Meanwhile, if it is determined that "CL≤CLth" is satisfied, the routine proceeds to step 705 of FIG. 10.

If it is determined in step 709 that "CL>CLth" is satisfied and the routine proceeds to step 710, the present set prediction length LE(k−1) is shortened by a predetermined period K1 and input as a set prediction length LE(k) that is to be used in future (LE(k)←LE(k−1)−K1). Then, the routine proceeds to step 705.

It is determined in step 705 whether or not the prediction calculation is being performed. Here, if it is determined that the prediction calculation is being performed, the routine returns to step 700. Meanwhile, if it is determined that the prediction calculation is not being performed, the routine proceeds to step 706.

In step 706, the prediction calculation end flag F1 is reset and the routine is ended. That is, when step 102 of FIG. 4 is started next time, the prediction calculation end flag F1 has already been reset.

Figure 12:
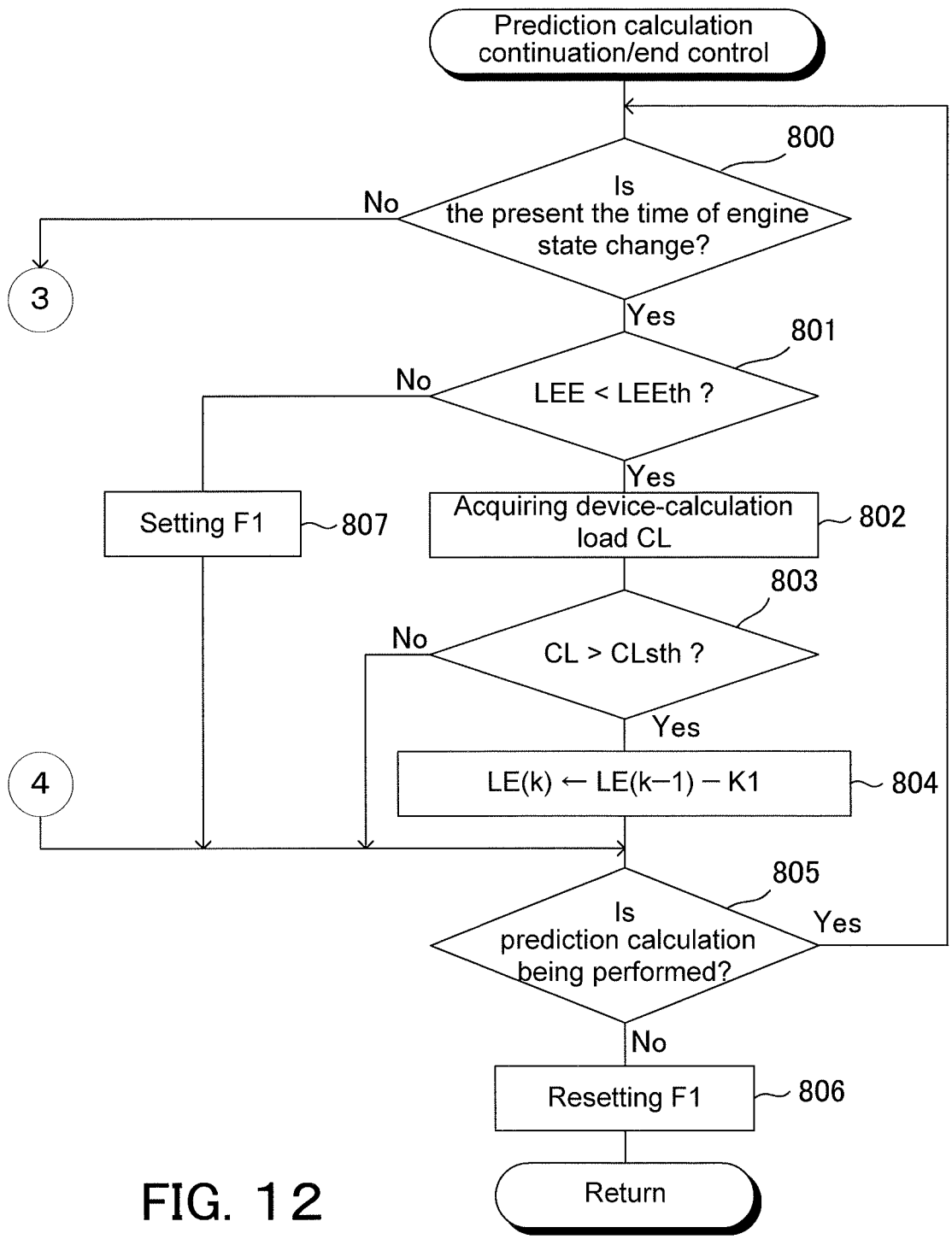
FIG. 12 is a view illustrating an example of a flowchart for performing a prediction calculation continuation/end control of a fourteenth embodiment.
Figure 13:
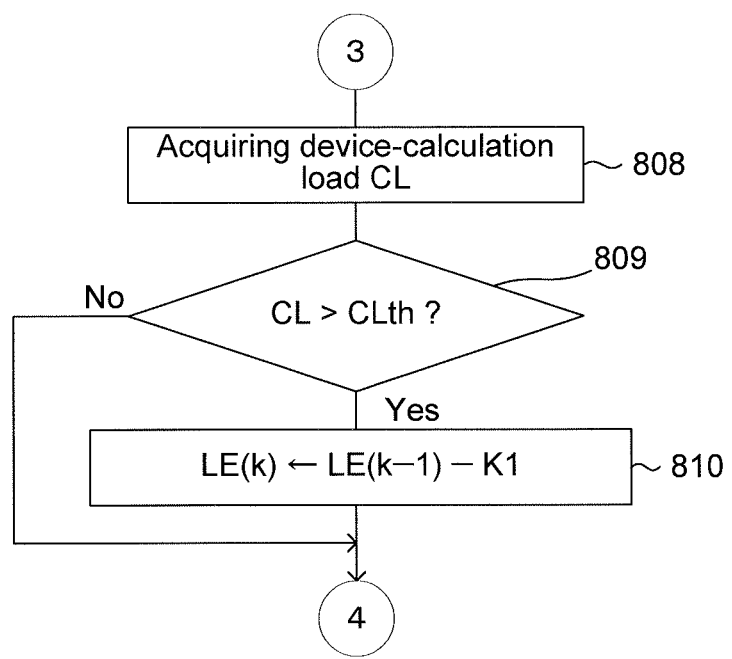
FIG. 13 is a view illustrating an example of a flowchart for performing a prediction calculation continuation/end control of the fourteenth embodiment.

Next, there is introduced one example of a routine for performing the prediction calculation continuation/end control of the fourteenth embodiment. This example is illustrated in FIGS. 12 and 13. The routine of FIGS. 12 and 13 is started when the prediction calculation (that is, step 102) of the routine of FIG. 4 is started, and is ended when prediction calculation is ended. Meanwhile, since steps 800 to 803 and steps 805 to 810 of the routine of FIGS. 12 and 13 are the same as steps 700 to 703 and steps 705 to 710 of the routine of FIGS. 10 and 11, respectively, the descriptions of these steps will be not provided.

In the routine of FIGS. 12 and 13, if it is determined in step 800 that the present is the time of the change of an engine state, it is determined in step 801 that "LEE<LEEth" is satisfied, it is determined in step 803 that "CL>CLsth" is satisfied, and the routine proceeds to step 804, the present set prediction length LE(k−1) is shortened by a predetermined period K1 and input as a set prediction length LE(k) that is to be used in future (LE(k)←LE(k−1)−K1). Then, the routine proceeds to step 805.

Figure 14:
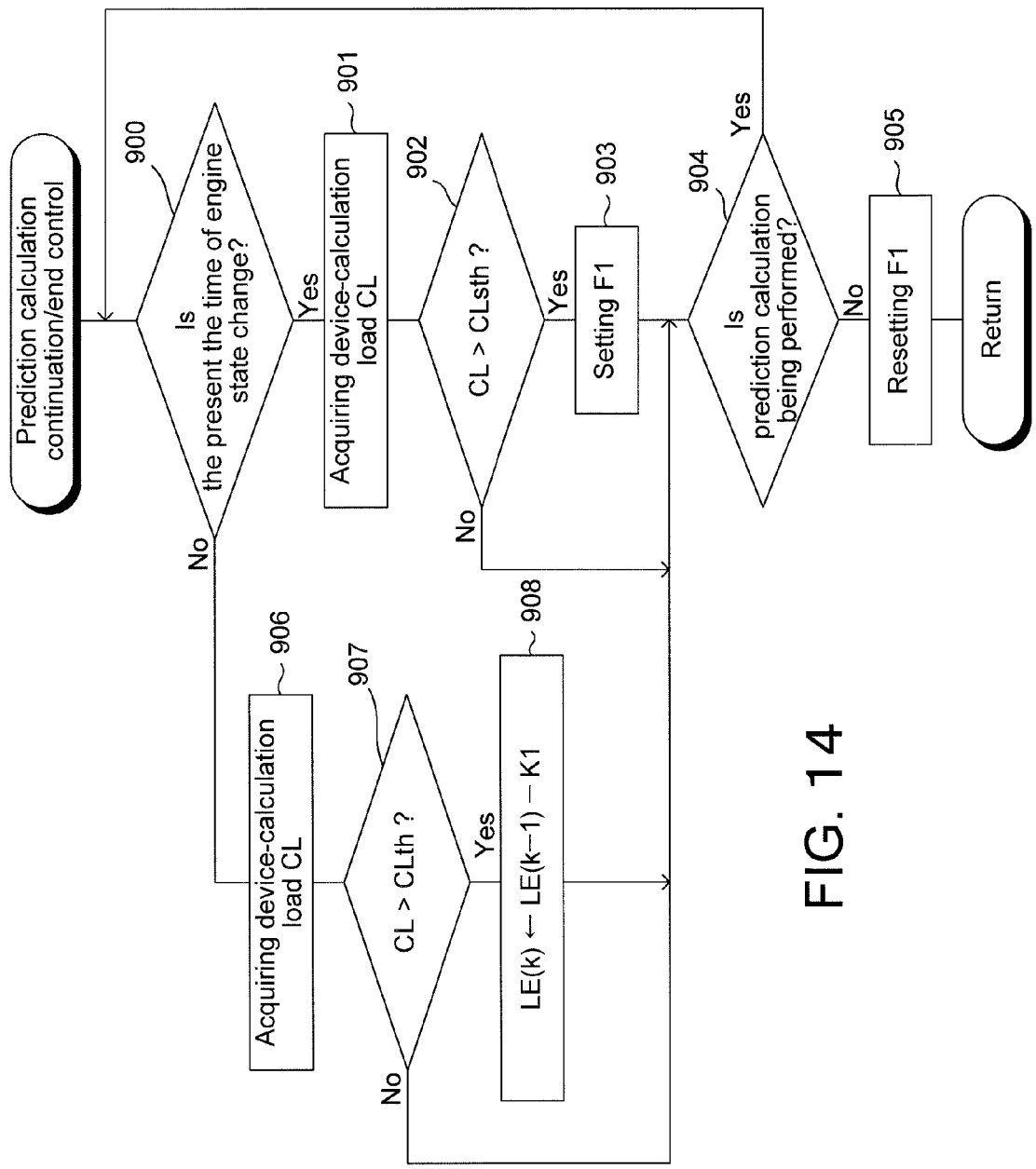
FIG. 14 is a view illustrating an example of a flowchart for performing a prediction calculation continuation/end control of a fifteenth embodiment.

Next, there is introduced one example of a routine for performing the prediction calculation continuation/end control of the fifteenth embodiment. This example is illustrated in FIG. 14. The routine of FIG. 14 is started when the prediction calculation (that is, step 102) of the routine of FIG. 4 is started, and is ended when prediction calculation is ended.

When the routine of FIG. 14 is started, it is determined in step 900 whether or not the present is the time of the change of an engine state. Here, if it is determined that the present is the time of the change of an engine state, the routine proceeds to step 901. Meanwhile, if it is determined that the present is not the time of the change of an engine state, the routine proceeds to step 906.

If it is determined in step 900 that the present is the time of the change of an engine state and the routine proceeds to step 901, a device-calculation load CL is acquired. Then, it is determined in step 902 whether or not the device-calculation load CL acquired in step 901 is larger than a safe calculation load CLsth (CL>CLsth). Here, if it is determined that "CL>CLsth" is satisfied, the routine proceeds to step 903. Meanwhile, if it is determined that "CL≤CLsth" is satisfied, the routine proceeds to step 904.

If it is determined in step 900 that the present is the time of the change of an engine state, it is determined in step 902 that "LEE<LEEth" is satisfied, and the routine proceeds to step 903, a prediction calculation end flag F1 is set and the routine proceeds to step 904. Here, when the prediction calculation end flag is set in step 903, the prediction calculation of step 102 of FIG. 4 is ended. Meanwhile, the prediction calculation of step 102 of FIG. 4 is continued while this prediction calculation end flag is reset.

If it is determined in step 900 that the present is not the time of the change of an engine state and the routine proceeds to step 906, a device-calculation load CL is acquired. Then, it is determined in step 907 whether or not the device-calculation load CL acquired in step 906 is larger than an allowable calculation load value CLth (CL>CLth). Here, if it is determined that "CL>CLth" is satisfied, the routine proceeds to step 908. Meanwhile, if it is determined that "CL≤CLth" is satisfied, the routine proceeds to step 904.

If it is determined in step 907 that "CL>CLth" is satisfied and the routine proceeds to step 908, the present set prediction length LE(k−1) is shortened by a predetermined period K1 and input as a set prediction length LE(k) that is to be used in future (LE(k)←LE(k−1)−K1). Then, the routine proceeds to step 904.

It is determined in step 904 whether or not the prediction calculation is being performed. Here, if it is determined that the prediction calculation is being performed, the routine returns to step 900. Meanwhile, if it is determined that the prediction calculation is not being performed, the routine proceeds to step 905.

In step 905, the prediction calculation end flag F1 is reset and the routine is ended. That is, when step 102 of FIG. 4 is started next time, the prediction calculation end flag F1 has already been reset.

Figure 15:
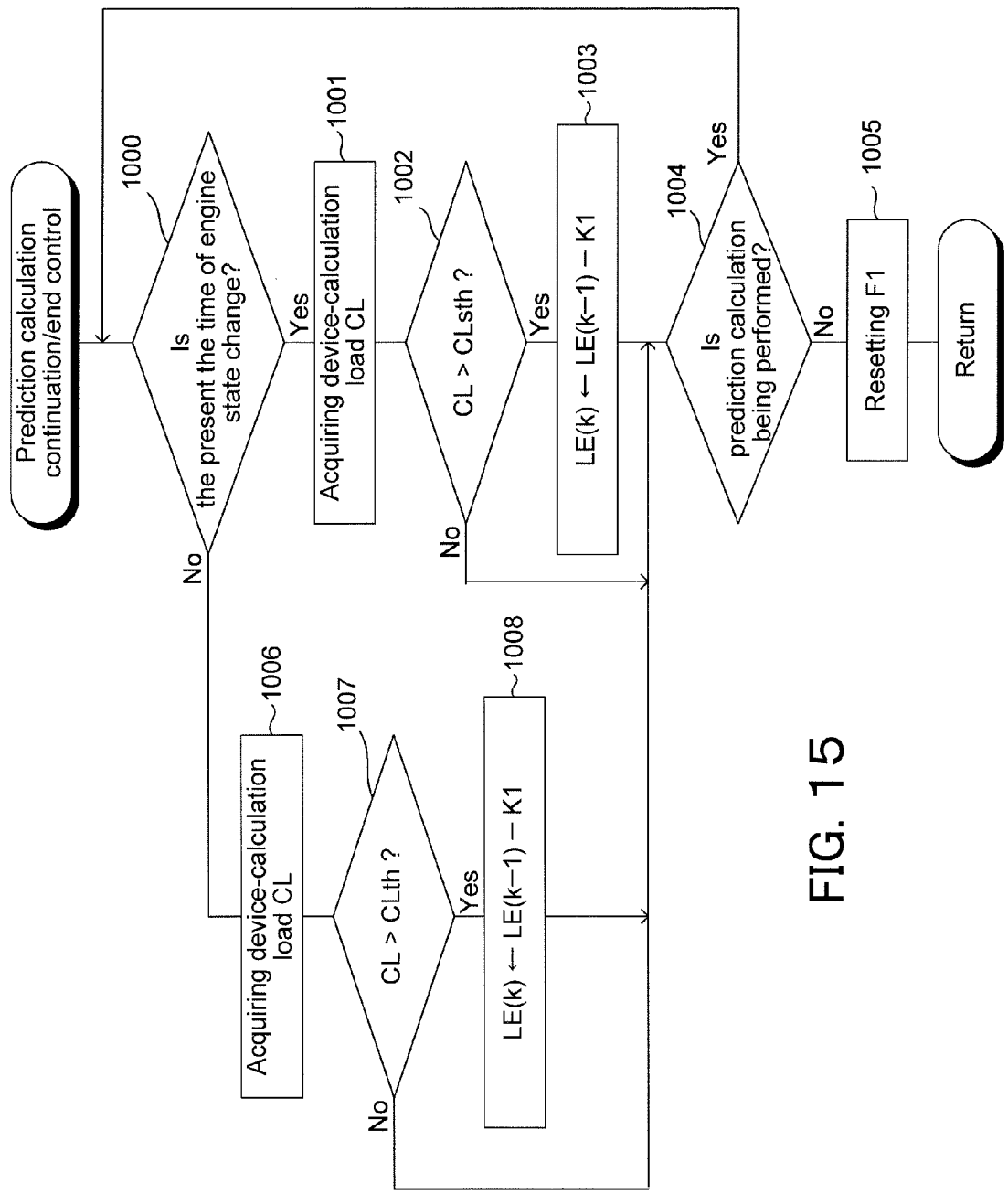
FIG. 15 is a view illustrating an example of a flowchart for performing a prediction calculation continuation/end control of a sixteenth embodiment.

Next, there is introduced one example of a routine for performing the prediction calculation continuation/end control of the sixteenth embodiment. This example is illustrated in FIG. 15. The routine of FIG. 15 is started when the prediction calculation (that is, step 102) of the routine of FIG. 4 is started, and is ended when prediction calculation is ended. Meanwhile, since steps 1000 to 1002 and steps 1004 to 1008 of the routine of FIG. 15 are the same as steps 900 to 902 and steps 904 to 908 of the routine of FIG. 14, respectively, the descriptions of these steps will be not provided.

In the routine of FIG. 15, if it is determined in step 1000 that the present is the time of the change of an engine state, it is determined in step 1002 that "CL>CLsth" is satisfied, and the routine proceeds to step 1003, the present set prediction length LE(k−1) is shortened by a predetermined period K1 and input as a set prediction length LE(k) that is to be used in future (LE(k)←LE(k−1)−K1). Then, the routine proceeds to step 1004.

REFERENCE SIGNS LIST 10, internal combustion engine; 35, supercharger; 35d, vane; 35e, vane actuator; 50, EGR device; 52, EGR control valve; 72, intake pressure sensor.

The invention claimed is:

1. A control device for internal combustion engine, the control device being configured to:
   determine: a target value of a control amount of a first object to be controlled in the internal combustion engine as a first initial-target-value; and a target value of a control amount of a second object to be controlled in the internal combustion engine as a second initial-target-value;
   determine: an operation amount to be input to the first object as a first operation amount depending on a first control-target-value, the first control-target-value being a target value for controlling the control amount of the first object; and an operation amount to be input to the second object as a second operation amount depending on a second control-target-value, the second control-target-value being a target value for controlling the control amount of the second object;
   control an operation of the first object according to the first operation amount; and
   control an operation of the second object according to the second operation amount,
   the control amounts of the respective objects being controlled due to the control device controlling the operations of the respective corresponding objects,
   the control device being further configured to:
   correct the first initial-target-value and the second initial-target-value according to a predetermined rule and output the corrected initial-target-values respectively as first corrected-target-value and second corrected-target-value;
   perform prediction calculation to predict future states of the first object and the second object as future controlled-object-states through calculation upon the control amount of the first object and the control amount of the second object being controlled according to the first operation amount and the second operation amounts determined by employing the first initial-target-value and the second initial-target-value respectively as the first control-target-value and the second control-target-value; and
   determine whether or not the future controlled-object-states satisfying a constraint condition for the internal combustion engine,
   in the case of determining as the future controlled-object-states satisfying the constraint condition, then the first initial-target-value and second initial-target-value being employed as the first control-target-value and second control-target-value,
   in the case of determining as the future controlled-object-states not satisfying the constraint conditions, then the first initial-target-value and second initial-target-value being corrected according to the predetermined rule; the corrected initial-target-values being output respectively as the first corrected-target-value and the second corrected-target-value; the future states of the first object and the second object being predicted again as future controlled-object-states upon the control amount of the first object and the control amount of the second object being controlled according to the first operation amount and the second operation amount determined by employing the first initial-target-value and the second initial-target-value respectively as the first control-target-value and the second control-target-value; the determination of whether or not the future controlled-object-states satisfying the constraint condition being carried out again; and then the first corrected-target-value and second corrected-target-value being employed as the first control-target-value and second control-target-value upon determining as the future controlled-object-states predicted again satisfying the constraint condition,
   in the case of determining as the future controlled-object-states predicted again not satisfying the constraint condition, then the corrections of the first corrected-target-value and the second corrected-target-value, the prediction calculation based on the first corrected-target-value and the second corrected-target-value corrected by the correction, and the determination based on the future controlled-object-states predicted by the prediction calculation being repeated until determined as the future controlled-object-states satisfying the constraint condition, the control device being further configured to predict states of the objects in the future after a limited predetermined period through calculation, the prediction calculation being continued after the limited predetermined period being shortened upon a calculation load of the control device being larger than an allowable load value in view of calculation capacity of the control device.

2. The control device for internal combustion engine according to claim 1, the control device being further configured to perform a model selecting calculation to select a state space model suitable for the present state of the internal combustion engine from a plurality of state space models prepared according to states of the internal combustion engine, wherein the control device predicting the future controlled-object-states by using the state space model, in the case of states of the internal combustion engine being changed during the prediction calculation and future controlled-object-states having already been predicted at that time point being future controlled-object-states in the future after an allowable period from the present time point or in the future later of the allowable period, then the prediction calculation being ended, and in the case of states of the internal combustion engine being changed during the prediction calculation and future controlled-object-states having already been predicted at that time point being future controlled-object-states in the future before the allowable period from the present time point, then the prediction calculation performed being continued.

3. The control device for internal combustion engine according to claim 1, the control device being further configured to perform a model selecting calculation to select a state space model suitable for the present state of the internal combustion engine from a plurality of state space models prepared according to states of the internal combustion engine, wherein the control device predicting the future controlled-object-states by using the state space model, in the case of states of the internal combustion engine being changed during the prediction calculation performed and future controlled-object-states having already been predicted at that time point being future controlled-object-states in the future after an allowable period from the present time point or in the future later of the allowable period, then the prediction calculation being ended regardless of the calculation load of the control device, in the case of states of the internal combustion engine being changed during the prediction calculation, future controlled-object-states having already been predicted at that time point being future controlled-object-states in the future before the allowable period from the present time point, and the calculation load of the control device being larger than an allowable load value in view of a calculation load of the model selecting calculation, then the prediction calculation being ended, and in the case of states of the internal combustion engine being changed during the prediction calculation, future controlled-object-states having already been predicted at that time point being future controlled-object-states in the future before the allowable period from the present time point, and the calculation load of the control device being equal to or smaller than the allowable load value in view of the calculation load of the model selecting calculation, then the prediction calculation being continued.

4. The control device for internal combustion engine according to claim 1, the control device being further configured to perform a model selecting calculation to select a state space model suitable for the present state of the internal combustion engine from a plurality of state space models prepared according to states of the internal combustion engine, wherein the control device predicting the future controlled-object-states by using the state space model, in the case of states of the internal combustion engine being changed during the prediction calculation and future controlled-object-states having already been predicted at that time point being future controlled-object-states in the future after an allowable period from the present time point or in the future later of the allowable period, then the prediction calculation being ended regardless of the calculation load of the control device, in the case of states of the internal combustion engine being changed during the prediction calculation, future controlled-object-states having already been predicted at that time point being future controlled-object-states in the future before the allowable period from the present time point, and the calculation load of the control device being larger than an allowable load value in view of a calculation load of the model selecting calculation, then the prediction calculation being continued after the limited predetermined period being shortened, and in the case of states of the internal combustion engine being changed during the prediction calculation, future controlled-object-states having already been predicted at that time point being future controlled-object-states in the future before the allowable period from the present time point, and the calculation load of the control device being equal to or smaller than the allowable load value in view of a calculation load of the model selecting calculation, then the prediction calculation being continued after the limited predetermined period being maintained at the value thereof at that time point.

5. The control device for internal combustion engine according to claim 1, the control device being further configured to perform a model selecting calculation to select a state space model suitable for the present state of the internal combustion engine from a plurality of state space models prepared according to states of the internal combustion engine, wherein the control device predicting the future controlled-object-states by using the state space model, in the case of states of the internal combustion engine being changed during the prediction calculation and the calculation load of the control device being larger than an allowable load value in view of a calculation load of the model selecting calculation, then the prediction calculation being ended, and in the case of states of the internal combustion engine being changed during the prediction calculation and the calculation load of the control device being equal to or smaller than the allowable load value in view of a calculation load of the model selecting calculation, then the prediction calculation being continued.

6. The control device for internal combustion engine according to claim 1, the control device being further configured to perform a model selecting calculation to select a state space model suitable for the present state of the internal combustion engine from a plurality of state space models prepared according to states of the internal combustion engine, wherein the control device predicting the future controlled-object-states by using the state space model, in the case of states of the internal combustion engine being changed during the prediction calculation and the calculation load of the control device being larger than an allowable load value in view of a calculation load of the model selecting calculation, then the prediction calculation being continued after the limited predetermined period being shortened, and in the case of states of the internal combustion engine being changed during the prediction calculation and the calculation load of the control device being equal to or smaller than the allowable load value in view of a calculation load of the model selecting calculation, then the prediction calculation being continued after the limited predetermined period being maintained at the value thereof at that time point.

7. A control device for internal combustion engine, the control device being configured to:

determine: a target value of a control amount of a first object to be controlled in the internal combustion engine as a first initial-target-value; and a target value of a control amount of a second object to be controlled in the internal combustion engine as a second initial-target-value;

determine: an operation amount to be input to the first object as a first operation amount depending on a first control-target-value, the first control-target-value being a target value for controlling the control amount of the first object; and an operation amount to be input to the second object as a second operation amount depending on a second control-target-value, the second control-target-value being a target value for controlling the control amount of the second object;

control an operation of the first object according to the first operation amount; and control an operation of the second object according to the second operation amount, the control amounts of the respective objects being controlled due to the control device controlling the operations of the respective corresponding objects, the control device being further configured to:

correct the first initial-target-value and the second initial-target-value according to a predetermined rule and output the corrected initial-target-values respectively as first corrected-target-value and second corrected-target-value;

perform prediction calculation to predict future states of the first object and the second object as future controlled-object-states through calculation upon the control amount of the first object and the control amount of the second object being controlled according to the first operation amount and the second operation amount determined by employing the first initial-target-value and the second initial-target-value respectively as the first control-target-value and the second control-target-value; and perform whether or not the future controlled-object-states satisfying a constraint condition for the internal combustion engine, in the case of determining as the future controlled-object-states satisfying the constraint condition, then the first initial-target-value and second initial-target-value being employed as the first control-target-value and second control-target-value, in the case of determining as the future controlled-object-states not satisfying the constraint conditions, then the first initial-target-value and second initial-target-value being corrected according to the predetermined rule; the corrected initial-target-values being output respectively as the first corrected-target-value and the second corrected-target-value; the future states of the first object and the second object being predicted again as future controlled-object-states upon the control amount of the first object and the control amount of the second object being controlled according to the first operation amount and the second operation amount determined by employing the first initial-target-value and the second initial-target-value respectively as the first control-target-value and the second control-target-value; the determination of whether or not the future controlled-object-states satisfying the constraint condition being carried out again; and then the first corrected-target-value and second corrected-target-value being employed as the first control-target-value and second control-target-value upon determining as the future controlled-object-states predicted again satisfying the constraint condition, in the case of determining as the future controlled-object-states predicted again not satisfying the constraint condition, then the corrections of the first corrected-target-value and the second corrected-target-value, the prediction calculation based on the first corrected-target-value and the second corrected-target-value corrected by the correction, and the determination based on the future controlled-object-states predicted by the prediction calculation being repeated until determined as the future controlled-object-states satisfying the constraint condition, the control device being further configured to perform a model selecting calculation to select a state space model suitable for the present state of the internal combustion engine from a plurality of state space models prepared according to states of the internal combustion engine, the control device predicting the future controlled-object-states by using the state space model, in the case of states of the internal combustion engine being changed during the prediction calculation and future controlled-object-states having already been predicted at that time point being future controlled-object-states in the future after an allowable period from the present time point or in the future later of the allowable period, then the prediction calculation being ended, and in the case of states of the internal combustion engine being changed during the prediction calculation and future controlled-object-states having already been predicted at that time point being future controlled-object-states in the future before the allowable period from the present time point, then the prediction calculation being continued.

8. A control device for internal combustion engine, the control device being configured to:

determine: a target value of a control amount of a first object to be controlled in the internal combustion engine as a first initial-target-value; and a target value of a control amount of a second object to be controlled in the internal combustion engine as a second initial-target-value;

determine: an operation amount to be input to the first object as a first operation amount depending on a first control-target-value, the first control-target-value being a target value for controlling the control amount of the first object; and an operation amount to be input to the second object as a second operation amount depending on a second control-target-value, the second control-target-value being a target value for controlling the control amount of the second object;

control an operation of the first object according to the first operation amount; and control an operation of the second object according to the second operation amount, the control amounts of the respective objects being controlled due to the control device controlling the operations of the respective corresponding objects, the control device being further configured to:

correct the first initial-target-value and the second initial-target-value according to a predetermined rule and output the corrected initial-target-values respectively as first corrected-target-value and second corrected-target-value;

perform prediction calculation to predict future states of the first object and the second object as future controlled-object-states through calculation upon the control amount of the first object and the control amount of the second object being controlled according to the first operation amount and the second operation amount determined by employing the first initial-target-value and the second initial-target-value respectively as the first control-target-value and the second control-target-value; and perform whether or not the future controlled-object-states satisfying a constraint condition for the internal combustion engine, in the case of determining as the future controlled-object-states satisfying the constraint condition, then the first initial-target-value and second initial-target-value being employed as the first control-target-value and second control-target-value, in the case of determining as the future controlled-object-states not satisfying the constraint conditions, then the first initial-target-value and second initial-target-value being corrected according to the predetermined rule; the corrected initial-target-values being output respectively as the first corrected-target-value and the second corrected-target-value; the future states of the first object and the second object being predicted again as future controlled-object-states upon the control amount of the first object and the control amount of the second object being controlled according to the first operation amount and the second operation amount determined by employing the first initial-target-value and the second initial-target-value respectively as the first control-target-value and the second control-target-value; the determination of whether or not the future controlled-object-states satisfying the constraint condition being carried out again; and then the first corrected-target-value and second corrected-target-value being employed as the first control-target-value and second control-target-value upon determining as the future controlled-object-states predicted again satisfying the constraint condition, in the case of determining as the future controlled-object-states predicted again not satisfying the constraint condition, then the corrections of the first corrected-target-value and the second corrected-target-value, the prediction calculation based on the first corrected-target-value and the second corrected-target-value corrected by the correction, and the determination based on the future controlled-object-states predicted by the prediction calculation being repeated until determined as the future controlled-object-states satisfying the constraint condition, the control device being further configured to perform a model selecting calculation to select a state space model suitable for the present state of the internal combustion engine from a plurality of state space models prepared according to states of the internal combustion engine, the control device predicting the future controlled-object-states by using the state space model, in the case of states of the internal combustion engine being changed during the prediction calculation and future controlled-object-states having already been predicted at that time point being future controlled-object-states in the future after an allowable period from the present time point or in the future later of the allowable period, then the prediction calculation being ended regardless of the calculation load of the control device, in the case of states of the internal combustion engine being changed during the prediction calculation, future controlled-object-states having already been predicted at that time point being future controlled-object-states in the future before the allowable period from the present time point, and the calculation load of the control device being larger than an allowable load value in view of a calculation load of the model selecting calculation, then the prediction calculation being ended, and in the case of states of the internal combustion engine being changed during the prediction calculation, future controlled-object-states having already been predicted at that time point being future controlled-object-states in the future before the allowable period from the present time point, and the calculation load of the control device being equal to or smaller than the allowable load value in view of the calculation load of the model selecting calculation, then the prediction calculation being continued.

\* \* \* \* \*